(12) United States Patent
Waterford et al.

(10) Patent No.: US 12,409,350 B2
(45) Date of Patent: *Sep. 9, 2025

(54) FACEMASK WITH FILTER INSERT FOR PROTECTION AGAINST AIRBORNE PATHOGENS

(71) Applicant: OCTO SAFETY DEVICES, LLC, Miami, FL (US)

(72) Inventors: Steve Waterford, Deerfield Beach, FL (US); Robert Hudson Lynn, Oakville, CA (US)

(73) Assignee: Octo Safety Devices, LLC, Miami, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/507,343

(22) Filed: Nov. 13, 2023

(65) Prior Publication Data

US 2024/0082608 A1    Mar. 14, 2024

Related U.S. Application Data

(63) Continuation of application No. 17/882,665, filed on Aug. 8, 2022, now Pat. No. 11,833,372, which is a
(Continued)

(51) Int. Cl.
*A62B 18/02*    (2006.01)
*A41D 13/11*    (2006.01)
(Continued)

(52) U.S. Cl.
CPC ............ *A62B 18/025* (2013.01); *A62B 18/08* (2013.01); *A62B 18/082* (2013.01);
(Continued)

(58) Field of Classification Search
CPC ........ G01K 5/48; A62B 18/025; A62B 18/08; A62B 18/082; A62B 18/084; A62B 23/02;
(Continued)

(56) References Cited

U.S. PATENT DOCUMENTS 2,067,026 A    1/1937    Schwartz
2,071,806 A    2/1937    Walker
(Continued)

FOREIGN PATENT DOCUMENTS

CA        1123705 A       5/1982
CN      111387603 A       7/2020
(Continued)

OTHER PUBLICATIONS

Invitation to Pay Additional Fees dated Jan. 5, 2015 in connection with PCT/US2014/054163.
(Continued)

*Primary Examiner* — Tu A Vo
(74) *Attorney, Agent, or Firm* — Cook Alex Ltd.

(57) ABSTRACT

A facemask assembly can include an interior air filter that is replaceable and/or contains biocidal elements. The filter can capture exhaled $H_2O$ to activate silver ions creating a biocidal environment. In some embodiments, at least part of the facemask is made via additive manufacturing. A facemask frame assembly can create a pleated filter to increase surface area and bring the filter material closer to the mouth and nose. The facemask can include a facial skirt customized to the facial geometry of the wearer. The facemask can have a permanently sealed filter than can withstand boiling and autoclaving temperatures so the mask system can be sterilized without disassembly. In some embodiments, the facemask has a visible display of how many times the facemask has been sterilized. In some embodiments, the mask includes (Continued)

a RFID device that can transmit how many times the facemask has been sterilized.

18 Claims, 61 Drawing Sheets

Related U.S. Application Data continuation of application No. 16/593,851, filed on Oct. 4, 2019, now Pat. No. 11,484,734, which is a continuation-in-part of application No. 15/226,877, filed on Aug. 2, 2016, now abandoned, which is a continuation of application No. PCT/US2016/042594, filed on Jul. 15, 2016, and a continuation of application No. 14/801,808, filed on Jul. 16, 2015, now Pat. No. 9,457,207, which is a continuation-in-part of application No. 14/477,840, filed on Sep. 4, 2014, now abandoned.

(60) Provisional application No. 62/797,865, filed on Jan. 28, 2019, provisional application No. 62/797,886, filed on Jan. 28, 2019, provisional application No. 61/873,400, filed on Sep. 4, 2013.

(51) Int. Cl.
*A62B 18/08* (2006.01)
*A62B 23/02* (2006.01)
*B33Y 80/00* (2015.01)
B29C 64/386 (2017.01)
B33Y 50/00 (2015.01)

(52) U.S. Cl.
CPC ............ *A62B 18/084* (2013.01); *A62B 23/02* (2013.01); *A62B 23/025* (2013.01); *B33Y 80/00* (2014.12); *A41D 13/1161* (2013.01); *A41D 13/1192* (2013.01); *B29C 64/386* (2017.08); *B33Y 50/00* (2014.12)

(58) Field of Classification Search
CPC ..... A62B 23/025; A62B 18/00; A62B 18/003; A62B 18/02; A62B 18/04; A62B 18/045; A62B 18/06; A41D 13/1161; A41D 13/1192; A61M 2210/0606; A61M 2210/0618; A61M 16/06–0694; A61M 2016/0661
See application file for complete search history.

(56) References Cited

U.S. PATENT DOCUMENTS

| | | | |
|---|---|---|---|
| 2,199,230 A * | 4/1940 | Schwartz | A62B 18/025 55/DIG. 35 |
| 2,201,315 A * | 5/1940 | Lehmberg | A62B 23/025 128/206.16 |
| 2,410,454 A | 11/1946 | Motsinger | |
| 2,540,567 A | 2/1951 | Bennett | |
| 2,655,656 A | 10/1953 | Moeller | |
| 2,738,788 A | 3/1956 | Matheson | |
| 2,845,927 A | 8/1958 | Hill | |
| 2,964,038 A | 12/1960 | Silverman | |
| 2,983,271 A | 5/1961 | Beck | |
| 3,029,812 A | 4/1962 | Matheson | |
| 3,130,722 A * | 4/1964 | Dempsey | A41D 13/1146 128/206.28 |
| 3,137,296 A | 6/1964 | Gurtowski | |
| 3,152,588 A | 10/1964 | Rogowski | |
| 3,154,073 A * | 10/1964 | Klinger | A41D 13/11 24/316 |
| 3,276,445 A | 10/1966 | Langdon | |
| 3,308,816 A | 3/1967 | Franklin et al. | |
| 4,062,357 A | 12/1977 | Laerdal | |
| 4,296,746 A | 10/1981 | Mason, Jr. et al. | |
| 4,630,604 A | 12/1986 | Montesi | |
| 4,653,124 A | 3/1987 | McNeal et al. | |
| 4,688,567 A | 8/1987 | Kikuchi et al. | |
| 4,715,122 A | 12/1987 | Linden | |
| 4,850,110 A | 7/1989 | Meier, Jr. | |
| 4,873,972 A | 10/1989 | Magidson et al. | |
| 4,976,857 A | 12/1990 | Solomon | |
| 5,148,550 A | 9/1992 | Hodgkinson et al. | |
| 5,191,882 A | 3/1993 | Vogliano | |
| 5,313,935 A | 5/1994 | Kortenbach et al. | |
| 5,320,096 A | 6/1994 | Hans | |
| 5,353,789 A | 10/1994 | Schlobohm | |
| 5,357,678 A | 10/1994 | Wei | |
| 5,357,947 A | 10/1994 | Adler | |
| 5,359,993 A * | 11/1994 | Slater | G06M 1/041 606/205 |
| 5,427,092 A | 6/1995 | Shiao | |
| 5,452,335 A | 9/1995 | Slater et al. | |
| 5,584,078 A | 12/1996 | Saboory | |
| 5,647,356 A | 7/1997 | Osendorf et al. | |
| 5,682,879 A | 11/1997 | Bowers | |
| 6,119,694 A | 9/2000 | Correa et al. | |
| 6,161,540 A * | 12/2000 | Fecteau | B01D 39/1623 128/206.16 |
| 6,338,340 B1 | 1/2002 | Finch et al. | |
| 6,378,906 B1 | 4/2002 | Pennaz | |
| 6,691,314 B1 | 2/2004 | Grilliot et al. | |
| 6,736,085 B1 * | 5/2004 | Esnouf | G06M 1/08 374/E5.041 |
| 6,817,362 B2 | 11/2004 | Gelinas et al. | |
| 6,981,503 B1 | 1/2006 | Shapiro | |
| 7,311,764 B2 | 12/2007 | Friday et al. | |
| 7,540,039 B2 | 6/2009 | Reaux | |
| 7,686,018 B2 | 3/2010 | Cerbini | |
| 8,430,100 B2 | 4/2013 | Reese et al. | |
| 8,443,806 B2 | 5/2013 | Morelli et al. | |
| 9,457,207 B2 * | 10/2016 | Waterford | A62B 23/02 |
| 10,806,235 B1 | 10/2020 | Bernstein et al. | |
| 10,835,704 B1 * | 11/2020 | Heimbuch | A61L 2/206 |
| 10,843,015 B2 | 11/2020 | Patil et al. | |
| 11,484,734 B2 * | 11/2022 | Waterford | B33Y 80/00 |
| 11,554,276 B2 | 1/2023 | Waterford | |
| 11,833,372 B2 * | 12/2023 | Waterford | A62B 18/084 |
| 2003/0178026 A1 | 9/2003 | Byram | |
| 2004/0216745 A1 | 11/2004 | Yuen et al. | |
| 2005/0056286 A1 * | 3/2005 | Huddart | A61M 16/0688 128/206.28 |
| 2005/0217118 A1 | 10/2005 | Mah | |
| 2006/0201511 A1 | 9/2006 | Freriks et al. | |
| 2007/0175480 A1 | 8/2007 | Gradon et al. | |
| 2008/0099022 A1 | 5/2008 | Gebrewold et al. | |
| 2008/0223370 A1 | 9/2008 | Kim | |
| 2008/0295843 A1 | 12/2008 | Haas | |
| 2008/0310994 A1 * | 12/2008 | O'Donnell | A61M 16/109 128/203.14 |
| 2009/0030427 A1 | 1/2009 | Razvi et al. | |
| 2009/0114228 A1 | 5/2009 | Kirschner | |
| 2009/0151733 A1 | 6/2009 | Welchel et al. | |
| 2009/0151734 A1 | 6/2009 | Park | |
| 2009/0223522 A1 | 9/2009 | Hernandez et al. | |
| 2010/0126504 A1 | 5/2010 | Johnstone | |
| 2010/0153023 A1 | 6/2010 | Parham et al. | |
| 2010/0268131 A1 | 10/2010 | Efthimiou | |
| 2010/0307503 A1 | 12/2010 | Iwamoto et al. | |
| 2011/0061656 A1 | 3/2011 | Matich | |
| 2011/0227700 A1 | 9/2011 | Hamerly et al. | |
| 2011/0308524 A1 | 12/2011 | Brey et al. | |
| 2011/0315144 A1 | 12/2011 | Eitzman et al. | |
| 2012/0055815 A1 | 3/2012 | Truex et al. | |
| 2012/0067349 A1 * | 3/2012 | Barlow | A61M 16/0683 128/205.25 |
| 2012/0125341 A1 | 5/2012 | Gebrewold et al. | |
| 2012/0132209 A1 | 5/2012 | Rummery et al. | |
| 2012/0325221 A1 | 12/2012 | Tran | |
| 2013/0074845 A1 | 3/2013 | Smith et al. | |
| 2014/0026897 A1 | 1/2014 | Saroch et al. | |
| 2014/0216474 A1 | 8/2014 | Mittelstadt et al. | |

(56) References Cited

U.S. PATENT DOCUMENTS

| | | | |
|---|---|---|---|
| 2015/0107596 A1 | 4/2015 | Mashiko | |
| 2015/0151147 A1* | 6/2015 | Fun | A62B 18/006 |
| | | | 128/206.17 |
| 2015/0290480 A1 | 10/2015 | Ritchie et al. | |
| 2015/0314148 A1 | 11/2015 | Waterford | |
| 2016/0001102 A1 | 1/2016 | Huh | |
| 2016/0166859 A1 | 6/2016 | Rachapudi et al. | |
| 2016/0271428 A1 | 9/2016 | Ehler et al. | |
| 2016/0317848 A1 | 11/2016 | Zilberstein et al. | |
| 2017/0106217 A1* | 4/2017 | Kuhn | A41D 13/1115 |
| 2017/0109943 A1 | 4/2017 | Sutton et al. | |
| 2017/0128753 A1 | 5/2017 | Waterford | |
| 2017/0216099 A1 | 8/2017 | Saladino | |
| 2017/0312555 A1 | 11/2017 | Olmsted et al. | |
| 2017/0368381 A1* | 12/2017 | Awiszus | A42B 3/046 |
| 2017/0372216 A1 | 12/2017 | Awiszus et al. | |
| 2018/0250537 A1 | 9/2018 | Waterford | |
| 2018/0280738 A1 | 10/2018 | Gabriel | |
| 2018/0369529 A1 | 12/2018 | Grashow et al. | |
| 2019/0125011 A1 | 5/2019 | Eisenbrey et al. | |
| 2019/0314595 A1 | 10/2019 | Dube et al. | |
| 2020/0030562 A1 | 1/2020 | Waterford | |
| 2020/0093948 A1* | 3/2020 | Miko | A61L 2/202 |
| 2020/0114178 A1 | 4/2020 | Waterford et al. | |
| 2020/0289859 A1 | 9/2020 | Malloy et al. | |
| 2021/0023326 A1 | 1/2021 | Heimbuch et al. | |
| 2021/0345706 A1 | 11/2021 | Kaltenbach | |
| 2022/0054783 A1 | 2/2022 | Gupta et al. | |
| 2022/0273971 A1 | 9/2022 | Waterford | |
| 2022/0322766 A1 | 10/2022 | Franoszek et al. | |
| 2023/0132896 A1 | 5/2023 | Waterford | |
| 2023/0158345 A1 | 5/2023 | Pathania | |

FOREIGN PATENT DOCUMENTS

| | | | | |
|---|---|---|---|---|
| EP | 3011998 B1 | 3/2017 | | |
| JP | R22020-059954 A | 4/2020 | | |
| KR | 1020190097802 A | 8/2019 | | |
| KR | 102080754 B1 | 4/2020 | | |
| KR | 10-2110687 B1 | 5/2020 | | |
| WO | 2002024279 A1 | 3/2002 | | |
| WO | 2013027174 A1 | 2/2013 | | |
| WO | 2013094806 A1 | 6/2013 | | |
| WO | 2015035101 A2 | 3/2015 | | |
| WO | WO-2019086822 A1 * | 5/2019 | | A61L 2/28 |
| WO | 2019160535 A1 | 8/2019 | | |
| WO | 2020075717 A1 | 4/2020 | | |
| WO | WO 2022216956 A1 | 10/2022 | | |

OTHER PUBLICATIONS

International Search Report and Written Opinion dated Apr. 22, 2015 in connection with PCT/US2014/054163.
International Preliminary Report on Patentability dated Mar. 17, 2016 in connection with PCT/US2014/054163.
International Search Report and Written Opinion dated Oct. 25, 2016 in connection with PCT/US2016/042594.
International Preliminary Report on Patentability dated Jan. 25, 2018 in connection with PCT/US2016/042594.
International Search Report and Written Opinion dated Jul. 19, 2022, in connection with PCT/US2022/023875.
International Preliminary Report on Patentability dated Oct. 10, 2023, issued in connection with PCT/US2022/023875.
U.S. Appl. No. 14/801,808, filed Jul. 16, 2015, Office Action dated Nov. 19, 2015.
U.S. Appl. No. 14/801,808, filed Jul. 16, 2015, Notice of Allowance dated Jun. 9, 2016.
U.S. Appl. No. 15/226,877, filed Aug. 2, 2016, Office Action dated Nov. 1, 2017.
U.S. Appl. No. 15/226,877, filed Aug. 2, 2016, Office Action dated Jun. 13, 2018.
U.S. Appl. No. 15/226,877, filed Aug. 2, 2016, Office Action dated Dec. 13, 2018.
U.S. Appl. No. 15/226,877, filed Aug. 2, 2016, Office Action dated Apr. 4, 2019.
U.S. Appl. No. 15/911,109, filed Mar. 3, 2018, Office Action dated Jun. 11, 2020.
U.S. Appl. No. 15/911,109, filed Mar. 3, 2018, Office Action dated Apr. 27, 2021.
U.S. Appl. No. 15/911,109, filed Mar. 3, 2018, Office Action dated May 10, 2022.
U.S. Appl. No. 15/911,109, filed Mar. 3, 2018, Office Action dated Dec. 27, 2022.
U.S. Appl. No. 16/381,655, filed Apr. 11, 2019, Office Action dated May 26, 2022.
U.S. Appl. No. 16/381,655, filed Apr. 11, 2019, Notice of Allowance Issued Sep. 15, 2022.
U.S. Appl. No. 16/593,851, filed Oct. 4, 2019, Office Action dated Dec. 24, 2021.
U.S. Appl. No. 16/593,851, filed Oct. 4, 2019, Notice of Allowance Issued Apr. 19, 2022.
U.S. Appl. No. 17/882,665, filed Aug. 8, 2022, Office Action dated Apr. 6, 2023.
U.S. Appl. No. 17/882,665, filed Aug. 8, 2022, Notice of Allowance Issued Jul. 25, 2023.
U.S. Appl. No. 18/088,530, filed Dec. 24, 2022, Office Action dated Nov. 16, 2023.
Examination Report date Dec. 4, 2024, issued in connection with European Application No. 22785461.9.
International Search Report and Written Opinion dated Jan. 27, 2025, issued in connection with PCT/US2024/052611.
Extended European Search Report dated Mar. 12, 2025, issued in connection with European Application No. 22785461.9.

\* cited by examiner

FACEMASK WITH FILTER INSERT FOR PROTECTION AGAINST AIRBORNE PATHOGENS

CROSS-REFERENCE TO RELATED APPLICATION(S)

This application claims priority to and is a continuation of U.S. patent application Ser. No. 17/882,665 entitled "Facemask with Filter Insert for Protection Against Airborne Pathogens" filed on Aug. 8, 2022. The '665 application claims priority to and is a continuation of U.S. patent application Ser. No. 16/593,851 entitled "Facemask with Filter Insert for Protection Against Airborne Pathogens" filed on Oct. 4, 2019 (now U.S. Pat. No. 11,484,734). The '851 application claims priority to and is a continuation-in-part of U.S. patent application Ser. No. 15/226,877 entitled "Facemask with Filter Insert for Protection Against Airborne Pathogens" filed on Aug. 2, 2016. The '877 application claims priority to and is a continuation of U.S. patent application Ser. No. 14/801,808 entitled "Facemask with Filter Insert for Protection Against Airborne Pathogens" filed on Jul. 16, 2015 (now U.S. Pat. No. 9,457,207). The '808 application is a Continuation-in-Part of U.S. patent application Ser. No. 14/477,840 also entitled "Facemask with Filter Insert for Protection Against Airborne Pathogens" filed on Sep. 4, 2014. The '840 application claimed priority benefits, in turn, from U.S. Provisional Patent Application Ser. No. 61/873,400 filed on Sep. 4, 2013, also entitled "Facemask with Filter Insert for Protection Against Airborne Pathogens". The '877 application also claims priority to and is a Continuation of International Patent Application Serial No. PCT/US16/42594 also entitled "Facemask with Filter Insert for Protection Against Airborne Pathogens" filed on Jul. 15, 2016.

The '851 application, as well as this application, also claim priority to U.S. Provisional Patent Application Ser. No. 62/797,865 filed on Jan. 28, 2019, entitled "Facemask with Temperature Logging Display".

The '851 application, as well as this application, also claims priority to U.S. Provisional Patent Application Ser. No. 62/797,886 filed on Jan. 28, 2019, entitled "Additive Manufactured Facemask Respirator and Strap System with Customized Facial Interface".

This application claims priority to each of the '665, '877 '808, '840, '400, '594, '865, '886, and '851 applications. Each of the '665, '877 '808, '840, '400, '594, '865, '886, and '851 applications are hereby incorporated by reference in their entireties.

FIELD OF THE INVENTION

The present invention relates to facemasks and, in particular, to a facemask that includes a filter insert designed to protect the wearer, the patient and others in the vicinity of the wearer, from airborne pathogens. In some embodiments the mask can also include a protective eye shield and sound-resonating diaphragms.

The present invention also relates to a method for producing a facemask respirator and strap system via additive manufacturing. More specifically, the present invention relates to a method for producing a facemask respirator and strap system having at least a portion thereof a three-dimensional shape. In at least some embodiments, the facemask respirator and/or strap system are customized to the face of a wearer.

In the medical field, surgical masks are often used as a form of protection against airborne pathogens, including bacteria and viruses. Facemasks are typically worn over the mouth and nose of the wearer and can incorporate a form of eye protection. These masks can also provide similar benefits in non-medical environments. For example, they can be used in environments with high levels of large airborne particulates or allergens, or where the wearer wishes to avoid physical contact between environmental pathogens and their mouth and nose.

Masks can be used in environments with high levels of airborne particulates and/or allergens where the wearer wishes to not inhale said particulate. To effectively reduce a wearer's exposure to airborne substances, a respiratory protection device needs to fit well and effectively filter out said substances.

Preventing inhalation and contact with airborne pathogens and environmental allergens is not only important in environments that require high levels of air purity, such as hospitals, but also in homes of people suffering from allergies. Additionally, wearers suffering from respiratory infections can benefit from the filter capture of pathogens and allergens when out in public.

Current masks can be attached to the wearer's head by means of tie straps, elastic straps headbands, and/or nonadjustable holes cut into the mask designed to fit around the wearer's ear. Alternatively, masks can be fastened using elastic straps around the head or cars. Rectangular cross-sectional elastics are often used in one-size-fits-all nonadjustable masks. These masks are often uncomfortable as they can stretch and/or pinch the skin around the cars and back of the head.

In addition, conventional masks are often required to be disposable as the strapping material tends to capture skin excretions as well as airborne particulates and pathogens and is difficult to clean.

Furthermore, conventional masks generally do not include a biocide-coated insert. They instead rely on airborne particulate, pathogen and droplet-trapping fabrics and physical barriers for protection. Those that do incorporate biocide-coated inserts often require rupturing an envelope to become operable. This rupturing requirement introduces problems including wearers forgetting or being unable to rupture the envelope, or prematurely rupturing the envelope.

In addition, in current mask designs, wearer's exhalations are directed out through the front of the mask. Airborne pathogens not entrapped by the mask are effectively sent directly towards those in front of the wearer. Another problem is conventional masks often provide a poor seal between the mask and the face due to the force of exhalations and the use of non-adjustable elastic fittings that do not provide enough force to keep the mask fitting snuggly.

Since the early 1900's, surgical masks have been in widespread use to help prevent infection of surgical wounds from staff-generated nasal and oral bacteria. According to the National Institute for Occupational Safety and Health (NIOSH), three clinical studies conducted in the 1980's and 90s found no difference in surgical infection rates when staff did not wear surgical masks. NIOSH also published that to be effective in reducing a wearer's exposure to airborne substances, a respiratory protection device needs to have sufficient fit as well as high filtration efficiency. NIOSH also stated that a recent laboratory study of five surgical masks with "good" filters found that 80-100% of subjects failed an OSHA-accepted qualitative fit test. (See CDC—NIOSH Science Blog—N95 Respirators and Surgical Masks at http://blogs.cdc.gov/niosh-scienceblog/2009/10/n95/).

Removing airborne pathogens and environmental allergens is not only very important in environments that require high levels of air purity, such as hospitals, but also in homes of people suffering from allergic responses to allergens. Additionally, wearers suffering from respiratory infections would benefit from the removal of pathogens and allergens when out in public.

Conventional designs focus on protecting patients from potentially harmful exhalations from the medical professional. Such designs trap vapor and liquid droplets in exhalations that contain potential airborne pathogens, thereby preventing them from contacting the patient and others in the vicinity of the wearer. These masks also provide limited protection for the medical professional by forming a physical barrier over the wearer's mouth and nose, preventing the accidental touching of these areas or the inhalation of airborne particles or droplets.

Previous designs can attach to the wearer's head by means of tie straps or headbands. These designs can also attach through nonadjustable holes cut into the mask designed to fit around the wearer's ear. Alternatively, they can also fasten using elastic straps around the head or ears. Rectangular cross-sectional elastics are often used, which can cause discomfort by stretching or pinching the skin around the ears and back of the head and by being one-size-fits-all and non-adjustable.

Disposable filtering facepiece respirators (FFR), such as those with a NIOSH rating of N95-100, are more commonly used in environments where greater protection is required than that provided by surgical masks. Yet, these designs suffer from the inherent flaws:

(1) ties or elastic strap connections that connect along the sides of the mask near parallel to the upper nose seal area and thus, when sufficiently tied or tensioned to seal against the face, simultaneously pull the mask away from the upper nose seal area, preventing a complete seal;

(2) wearers have the option of improperly fitting the mask to their face and/or insufficiently pinching inward the conformable strip in a generic nose bridge area;

(3) little or no upward lift is provided by either ties or elastic straps for a proper seal in the chin area; and (4) exhalations inherently contain body heat, water ($H_2O$) and Carbon Dioxide ($CO_2$) and existing N95~100 masks, ultimately capture and restrict breathability due to the accumulation of water then clogging the mask membrane to the degree that masks that include a front, one-way valve allow the emission of much of an amount of the above, the area above that vent inherently captures it all and restricts breathability and functionality while also creating discomfort for the wearer.

Many existing elastomeric facemasks, such as half-face respirator masks, are created through injection molding using machined molds. Creating such molds can be time-consuming and expensive. The injection molding process also relies upon costly, high-pressure presses that can require highly trained personnel to oversee the manufacturing process. Such constraints can drive up manufacturing costs.

Additionally, in at least some embodiments injection molds can have limited production capacity and inherent limitations that cannot facilitate rapid and/or simplified assembly processes as each piece of the facemask typically includes a subassembly that must be independently molded and assembled.

In some embodiments, additive manufacturing, or 3D printing, is a suitable alternative to injection molding. In some embodiments, 3D printing can case the assembly of elastomeric facemasks and their strap system, and therefore increase production capacity, as it allows for designs in which the fastening or attachment mechanisms or other features are continuous with the body of each piece of the facemask or respirator as well as the independent strap system. In some embodiments, such designs cannot be created via injection molding as the subassemblies would be too difficult to extract from the mold or would require complex, multi-pull molds that would still fail to create continuous elements.

In some embodiments, additive manufacturing can also allow for customization of the facemask to the specific facial geometry of a wearer, providing an optimal fit that conforms to the wearer's three-dimensional (3D) facial profile.

Accordingly, a mask that secures snuggly and comfortably to the wearer's face with an adjustable and comfortable elastic design, and that also includes a replaceable biocidal insert designed to capture the emitted $H_2O$ to activate the silver biocidal ions, yet allows for the venting of heated, $CO_2$-laden air would more effectively protect both the wearer, the patient and others in the vicinity of the wearer.

The present improved facemask designs also overcome shortcomings and disadvantages of prior designs by incorporating a continuous strap that is integrated with the nose bridge to generate a tri-directional force directed downwardly and approximately perpendicularly to the nose at the nose bridge area. The continuous strap, or nose bridge clip with strap, is placed at the nose bridge location in a manner that is customized to the wearer's face and not in a generic, non-adjustable position. The continuous strap construction pulls the mask upward below the chin while simultaneously pulling the mask backward into the face.

The embodiments described below and shown in the various drawings overcome many known shortcomings of conventional facemasks. Such shortcomings include a lack of adjustability and perpetuation of restricted and/or misdirected air-flow.

In some embodiments, the masks provide, among other things, a continuous strap system. In some embodiments, the strap is built directly into the mask itself. In some of these embodiments, the strap is integrated directly into the nose bridge of the mask, generating forces with components parallel and perpendicular to the plane of the face. In some embodiments, adjustability of the mask can be enhanced by allowing the strap to interact with a nose bridge clip, such that the mask can be adjusted and molded to more closely fit the face of a wearer. In some embodiments, the mask can be configured to pull upward beneath the chin as well as towards the plane of the face to provide a tight fit. In some embodiments, the mark can utilize two or more separate adjustable-straps.

In some embodiments, the facemask can comprise a lower air intake. In certain embodiments, this intake is located on the lower front section of a mask. In some embodiments, the air intake directs airflow at a non-right angle to the plane of a filter contained within the mask.

In some embodiments, an air filter is internal to the mask. In certain embodiments, the filter is replaceable. In at least some embodiments, the filter is sealed within the mask structure. In some embodiments, the air filters have biocidal components.

In some embodiments, there are no front-facing openings on the mask. In some embodiments, the facemask can comprise channels that direct exhaled air backwards, in a direction toward or behind the plane of a wearer's face. In some embodiments, this venting occurs from multiple sides of a mask simultaneously. In at least some embodiments, vent systems are symmetrically placed about an axis in the plane of the mask. In certain embodiments, the exhaled air is directed towards the cheeks, neck and/or ears of a wearer.

In some of the embodiments, air is blocked by a solid front-facing construct that restricts direct access to an internal filter from frontal air flow. In some embodiments, masks can contain diaphragm check valves designed to direct exhaled air away from a filter element. In at least some of these embodiments, the exhaled air flows through channels backwards and/or sideways from the mask.

In some embodiments, the facemask system can comprise a nose clip and/or elastic components to complete a continuous strap. Some embodiments of the facemask system feature through holes through which a strap can be mounted. In some embodiments, the strap can clip or snap into a mask.

In some embodiments, the mask can have a flexible center region. In some embodiments of the mask system, flexible openings are provided. In some embodiments, the openings are configured to receive at least one resonating diaphragm.

In some embodiments, openings in a facemask can be circular, oblate, and/or polygonal. In some embodiments, openings can form to receive various attachments. In certain embodiments, a facemask can comprise extrusions along an interior rim and/or on a top or bottom section of the mask.

In certain embodiments, a facemask can comprise an eye shield. In some embodiments, the eye shield is transparent. In some embodiments, an eye shield can comprise at least one extrusion inserted through a pair of through holes. In certain embodiments, a shield can be secured at the nose area of the mask. The eye shield can also rest against the wearer's forehead and/or cheekbones.

Some embodiments of the facemask occur at least in part in the following configuration:
(a) at least one air vent for bidirectional flow of air being inhaled and exhaled by the wearer, the at least one airflow intake capable of directing inward airflow to strike an interior air filter at an oblique angle;
(b) a head mounting pad having a single pull to tension the facemask against the wearer's face;
(c) a continuous strap positionable under the chin of the wearer;
(d) a nose bridge clip positionable by the wearer before and during the tensioning of the strap.

In some embodiments, a nose bridge clip provides materials suitable for creation of "compression zones", wherein these zones can have areas of differing flexibility to conform to a face.

In some preferred embodiments, a mask has snap-in receivers. Some embodiments of snap-in receivers are given in the figures presented herein, however these are not meant to be the only disclosed locations or embodiments of snap-in receivers.

In embodiments having snap-in receivers, the receivers are often (but not exclusively) meant to receive strap(s) for the mask assembly. In some embodiments, the receivers are designed to accommodate a single, continuous strap. In some preferred embodiments, a mask has two snap-in receivers, one in the nose area, and one in the proximity of a wear's chin. These receivers need not be similarly designed to one another. For instance, one receiver can resemble a slot in the mask itself, while the other receiver can resemble a hook. In some embodiments, snap-in receivers can accommodate other mask attachments, such as an eyeshield.

In some embodiments, the continuous strap is elastic, and can be adjusted by twisting the strap behind the head of a wearer. Such a design provides numerous advantages over existing mask designs, such as fewer breakable components, removing the need for clasps or buckles, increased ability to adjust applications of force by the mask to conform to any face, and ease of mask removal.

In some embodiments, the mark utilizes non-continuous straps that can be secured within a buckle and/or fastener system.

SUMMARY OF THE INVENTION

Shortcomings of conventional facemasks are overcome by a facemask comprising at least one airflow intake in a lower front section thereof. The at least one airflow intake capable of directing inward airflow to strike an interior air filter at an oblique angle.

The air filter can be replaceable and/or biocidal.

In an embodiment, the facemask has no directly front-facing openings. The facemask preferably further comprises air channeling features that direct exhalations downward and backward towards the wearer's neck. The facemask preferably further comprises a continuous strap structure with a semi-rigid lower section extending towards the wearer's ears and a plurality of spaced extrusions with a gap between each extrusion. The lower strap section preferably extends behind the wearer's ears and a flexible section curves in a semi-circular manner at a common distance.

The facemask preferably further comprises an elastic section that extends forward therefrom to complete the continuous strap in front of the wearer's face.

The facemask preferably further comprises a nose clip section within a forward-most center section of the continuous strap section and a pair of downwardly-facing lobe extrusions.

The facemask preferably further comprises a pair of through-holes formed within a flexible center structure. The through-holes are preferably spaced equidistantly between the pair of lobe extrusions. The facemask preferably further comprises a pair of hollowed extrusions along the topmost interior rim on either side of the curved topmost section. A pair of flexible circular openings is preferably formed on either side of the wearer's mouth, each of which has interior channels suitable for mounting at least one resonating diaphragm.

The facemask can further comprise a transparent eye shield comprising a pair of extrusions insertable into the pair of through-holes such that the eye shield is secured to the wearer's nose area and inclined inward to rest the top portion against the wearer's forehead.

In another embodiment, a facemask comprises:
(a) at least one air vent for bidirectional flow of air being inhaled and exhaled by the wearer, the at least one airflow intake capable of directing inward airflow to strike an interior air filter at an oblique angle;
(b) a head mounting pad having a single pull to tension the facemask against the wearer's face;
(c) a continuous strap positionable under the chin of the wearer;
(d) a nose bridge clip positionable by the wearer before and during the tensioning of the strap.

In the foregoing embodiment, the air filter is preferably replaceable and/or biocidal. The at least one vent is preferably a plurality of vents. The vent is preferably configured to direct exhaled air downwardly and backwardly towards the neck of the wearer. The nose bridge clip is preferably configurable to provide a compression zone over the wearer's nose. The compression zone preferably comprises portions of differing flexibility. The head mounting pad has an opening formed in an interior portion thereof, such that, for example, a wearer with hair in a ponytail can extend the ponytail through the opening and in a direction away from the wearer's head.

In some embodiments, a 3D-printed facemask and strap system can include:
   (a) a front section including a shell with an opening formed therein and an internal ridge along the perimeter of the opening, which is continuously formed with the shell;
   (b) a frame assembly insertable within the interior ridge of the front section;
   (c) a facial skirt 3D printed atop, adhesively bonded or over-molded onto the assembled front section and filter material compressed between the frame that seals together the facemask; and
   (d) a strap system that 3D prints both the elastomeric strap as well as directly bonding atop that the non-elastic strap locking component.

In some embodiments, the frame assembly can include horizontal segments that extend laterally from a vertical frame of the frame assembly and the front section can include crossmembers extending the width of the opening to create cavities for receiving the horizontal segments of the frame assembly.

A filter material can be inserted between the front section and the frame assembly. In some embodiments, the filter material is initially linear and becomes pleated when inserted between the front section and the frame assembly.

In some embodiments, the facial skirt can be customized to fit the unique, facial geometry of the facemask wearer.

A method for producing a facemask utilizing additive manufacturing can include:
   (a) 3D printing a front section and a pleated frame, the front section comprising an internal ridge;
   (b) placing a linear piece of filter material between the front section and the pleated frame, wherein the linear piece of filter material conforms to the pleated frame resulting in a pleated filter material;
   (c) snapping the pleated frame into the internal ridge of the front section to create a partially assembled facemask; and
   (d) 3D printing a facial skirt on the back portion of the partially assembled facemask.

In some embodiments the facial skirt can be bonded with an adhesive (or other means) to the back portion of the assembled facemask or it can be overmolded on to the front section via injection molding.

A method for producing the strap system can include:
   (a) 3D printing the elastomeric strap to completion; and
   (b) within the same process, printing a non-elastic polymer atop an end of such strap that can serve as a strap locking mechanism.

In some embodiments, the front section and pleated frame are made of plastic and the facial skirt is made of silicone.

In some embodiments, when the facial skirt is printed on the back portion of the partially assembled facemask, it seals the components of the facemask together.

In some embodiments, the method also includes customizing the facial skirt to the unique facial geometry of the facemask wearer.

In some embodiments, customization includes capturing an image of the face of the wearer and using the image to create customized 3D modeling instructions which can then be used to form the facial skirt during additive manufacturing. In some embodiments, capturing the facial images can be done by a 3D scanner or digital camera.

In some embodiments, the portion of the facial skirt that contacts the wearer's skin is customized to his or her facial geometry.

BRIEF DESCRIPTION OF THE DRAWINGS

FIG. 34A is a perspective view of the first section and pleated frame assembled with a filter in between.

DETAILED DESCRIPTION OF PREFERRED EMBODIMENT(S)

As used herein "elastic" is intended to mean the state or quality of being elastic, flexible, resilient and/or adaptable.

As used herein "oblique" is intended to mean the state of being neither perpendicular nor parallel to a given line or surface; slanting; sloping.

As used herein "additive manufacturing" is intended to mean a process of making a three-dimensional solid object of virtually any shape from a digital model.

As used herein "diaphragm" is intended to mean a thin disk that vibrates when receiving or producing sound waves, as in a telephone, microphone, speaker or the like.

When describing elements of FIGS. 1-11, the same number is used to identify elements that are the same or substantially similar to each other in the different views illustrated in FIGS. 1-11.

Figure 1:
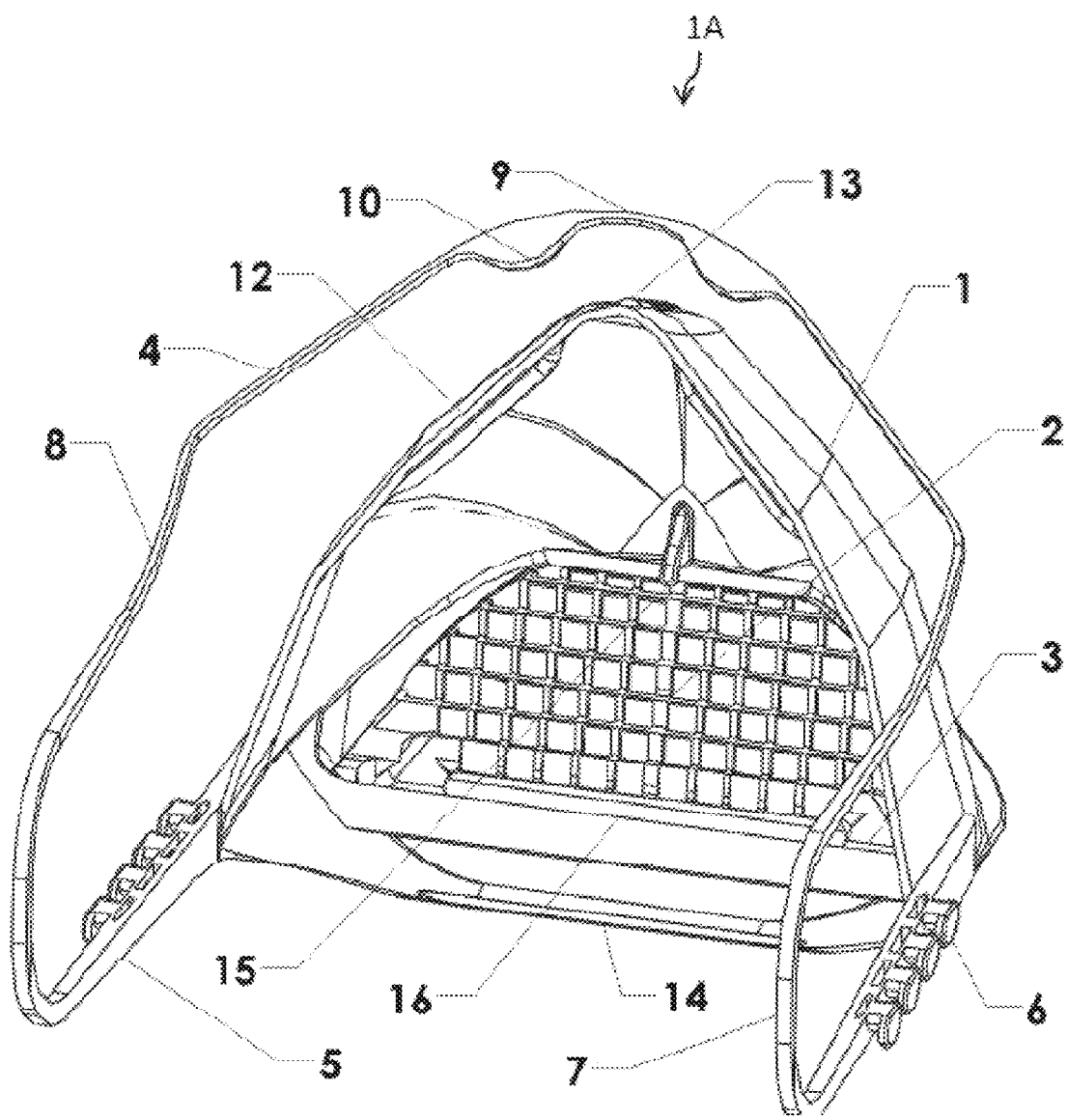
FIG. 1 is a perspective view taken from the back side of an embodiment of a facemask assembly with biocidal insert for protection against airborne pathogens.
Figure 2:
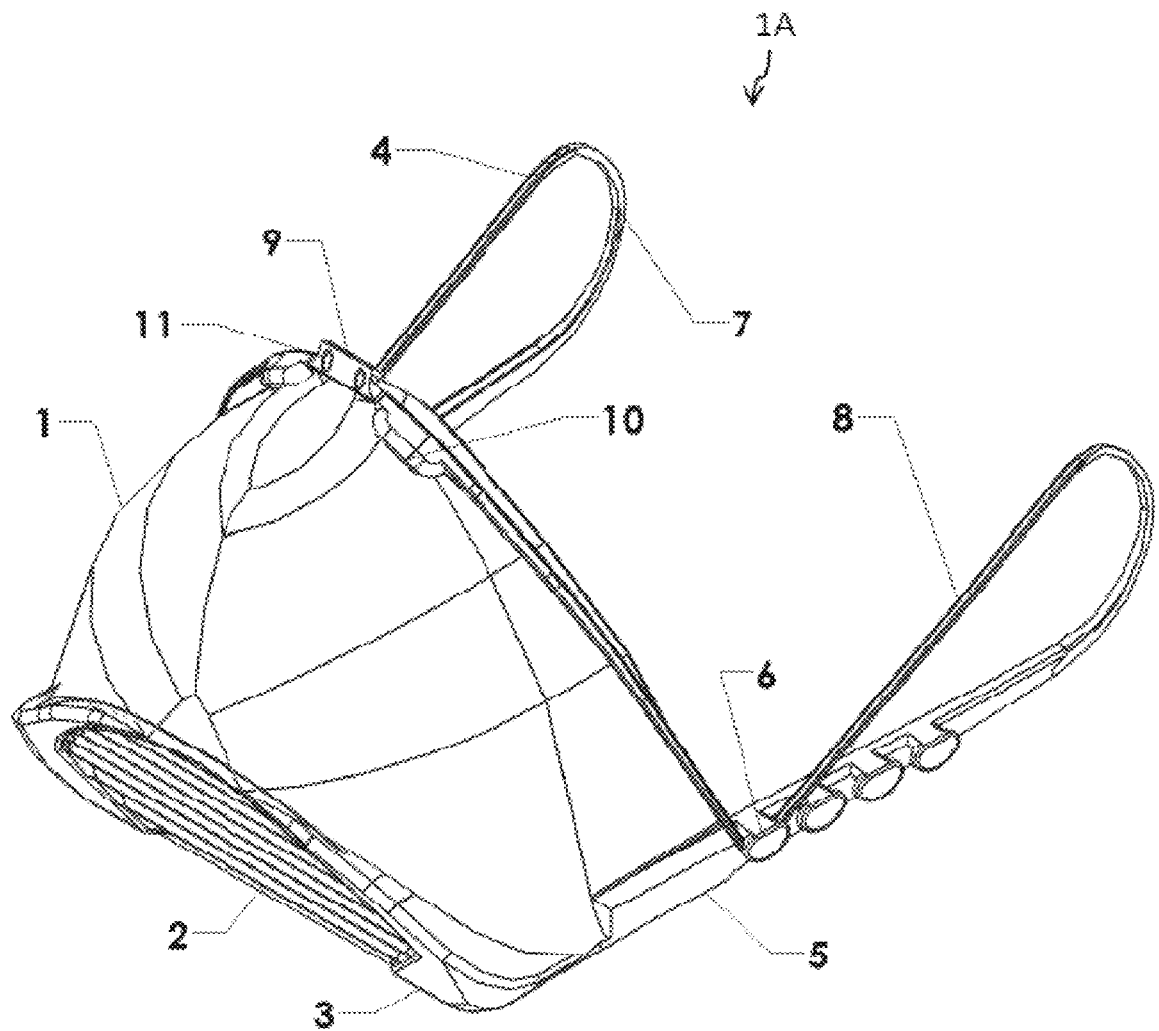
FIG. 2 is a perspective view taken from the front side of the facemask assembly illustrated in FIG. 1.

Turning first to FIGS. 1 and 2, illustrating facemask assembly 1A, elastic facemask 1 has a plurality of air channels 2 and side vents 3 formed therein for directing exhaled air flowing from the wearer's mouth down and back towards the neck of the wearer, and for directing inhaled air flowing into facemask 1 so as to strike a filter insert (not shown in FIGS. 1 and 2) at an oblique angle to enhance the capture and retention of airborne pathogens and particulates.

As shown in FIGS. 1 and 2, continuous strap 4 has a pair of lobes configured to press down against the wearer's nasal bone area. Strap 4 has more elastic section 8 designed to stretch downward to be inserted into the lobe extrusions 6 formed at the bottom of semi-rigid section 5. Strap 4 also includes a wider, rounded back-of-the-car section 7 to provide greater comfort without stretching like common elastic rubber bands, which grab and pinch the skin.

As further shown in FIGS. 1 and 2, continuous strap 4 has nose bridge arch section 9 and a pair of lobes 10 designed to press down against the wearer's nasal bone area. A plurality of spaced extrusions 13 hold nose bridge arch section 9 to the wearer's preferred location on the nose bridge. A pair of hollow extrusions 12 form a secondary seal in the nasal bone area to inhibit the wearer's exhalations from escaping towards the eyes. Hollow extrusions 12 inflate with each exhalation to press facemask 1 against the wearer's face.

As shown specifically in FIG. 2, a pair of spaced holes 11 formed in nose bridge arch section 9 enable the ready insertion of an eye shield (illustrated in FIG. 10), which contains a pair of matching extrusions. The pull-down action atop the wearer's nose area simultaneously seals the nose section of facemask 1 to the wearer's face while securing the mask and leaning the mask against the wearer's forehead or eyeglasses. FIG. 2 also specifically illustrates semi-rigid section 5 of continuous strap 4, which enables elastic section 8 to be pulled down and secured to lobe extrusions 6.

FIGS. 1 and 2 also illustrate chin sealing section 14 of facemask 1, which can be extended backwards to enhance the seal to the wearer's face. Extrusion 15 captures and retains a filter insert (not shown) into facemask 1. Elastic groove 16 captures and seals the filter into the mask frame.

Figure 3:
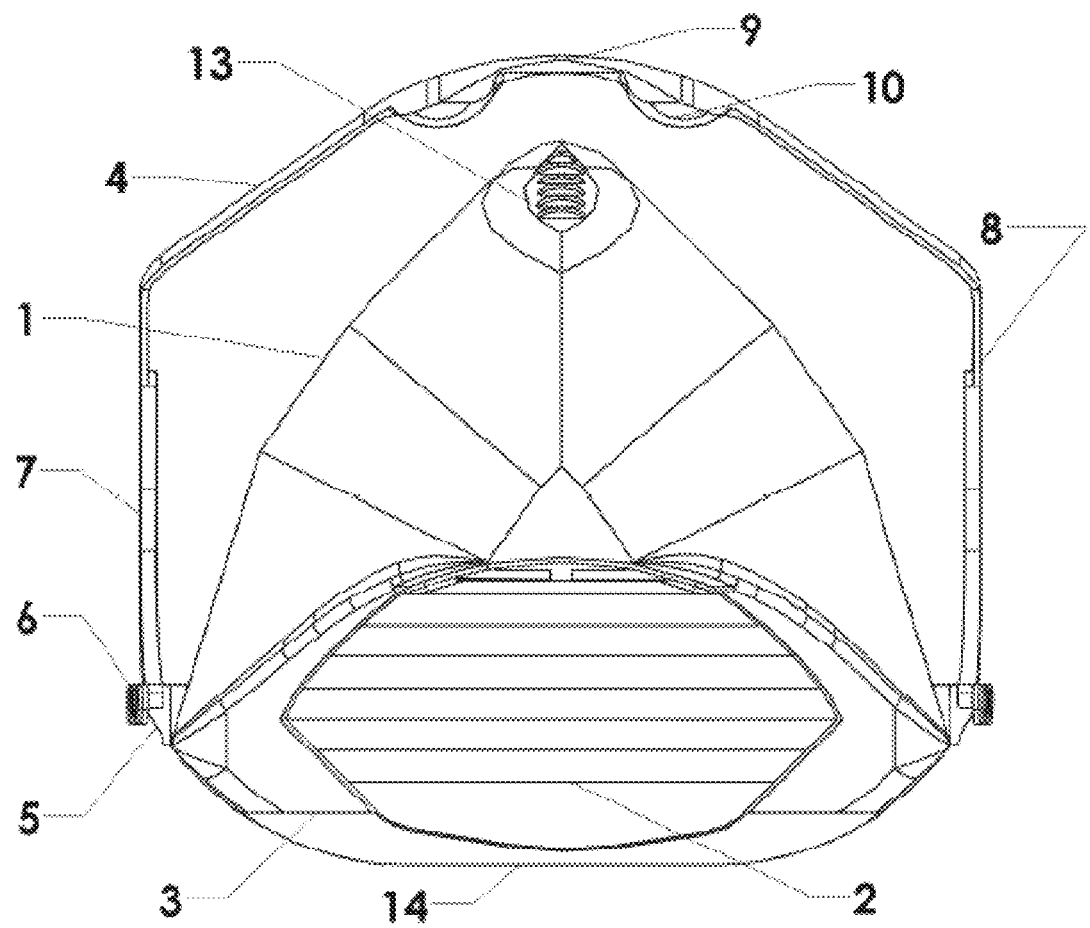
FIG. 3 is a front view of the facemask illustrated in FIGS. 1 and 2.

In FIG. 3, facemask assembly 1A is shown in a front view as including a facemask 1. a plurality of air channels 2 and side vents 3. Continuous strap 4 has a plurality of lobe extrusions 6 extending from semi-rigid section 5, as well as a back-of-the-car section 7. A more elastic section 8 of continuous strap 4 stretches downward to be inserted into lobe extrusions 6 according to the amount of pressure the wearer wishes to have against the wearer's face.

FIG. 3 further illustrates continuous strap 4 as having nose bridge arch section 9 and a pair of lobes 10 designed to press down against the wearer's nasal bone area. A plurality of spaced extrusions 13 hold nose bridge arch section 9 to the wearer's preferred location on the nose bridge. Chin sealing section 14 of facemask 1 can be extended backwards to enhance the seal to the wearer's face.

Figure 4:
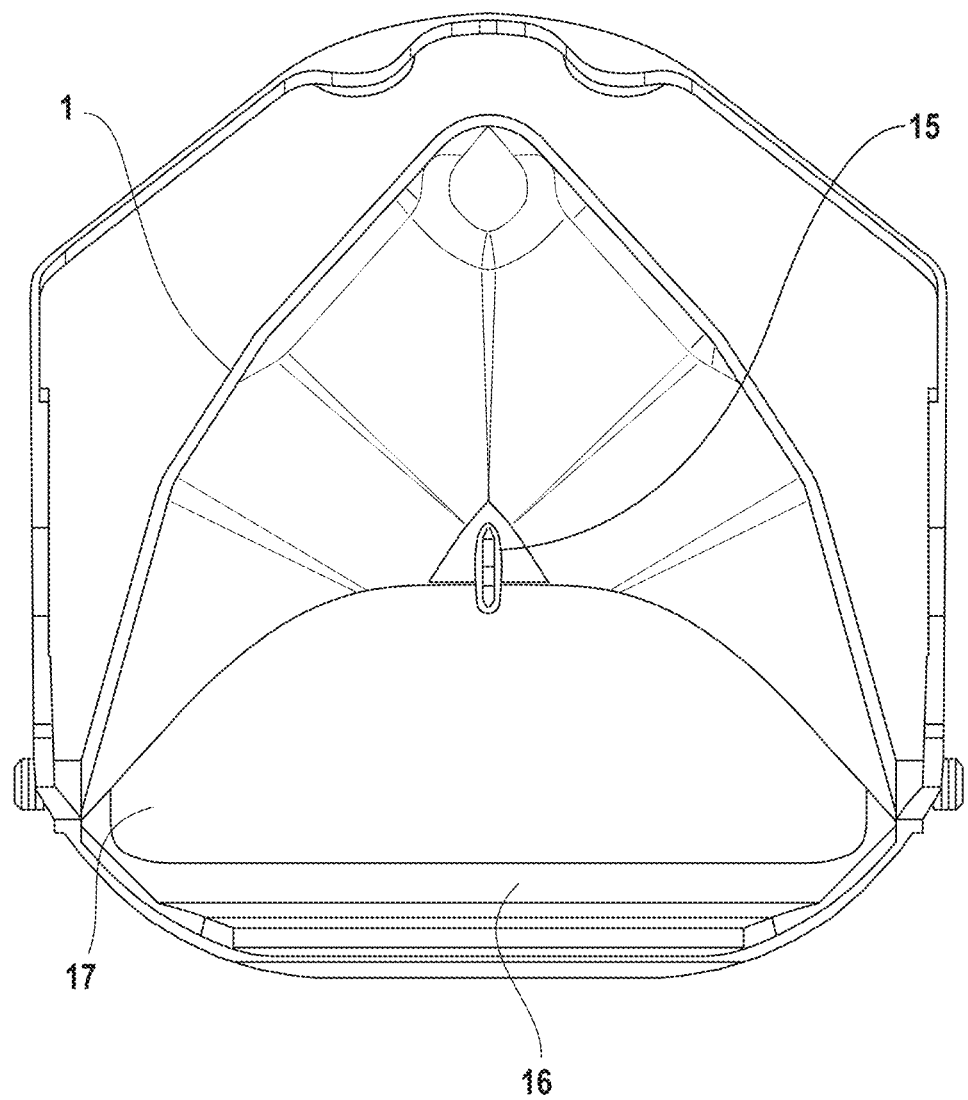
FIG. 4 is a back view of the facemask illustrated in FIGS. 1-3.

FIG. 4 specifically shows in a back view of facemask 1, in which extrusion 15 captures and retains a filter 17 in facemask 1. An elastic groove 16 captures and seals filter 17 within facemask 1.

Figure 5:
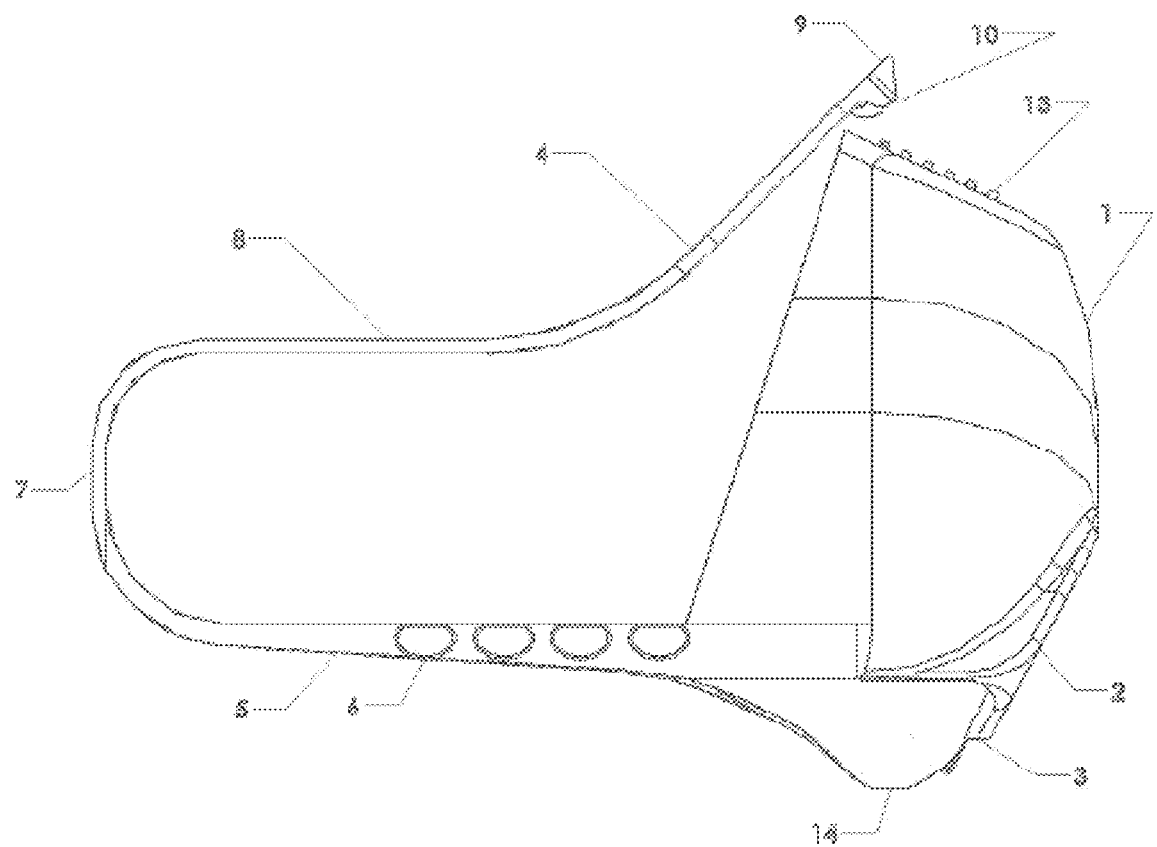
FIG. 5 is a side view of the facemask illustrated in FIGS. 1-4 with the strap unsecured.

FIG. 5 is a side view of facemask 1 with continuous strap 4 unsecured at its nose bridge arch section 9, which is insertable into one of a plurality of spaced extrusions 13 hold facemask 1 to the wearer's preferred location on the nose bridge.

Figure 6:
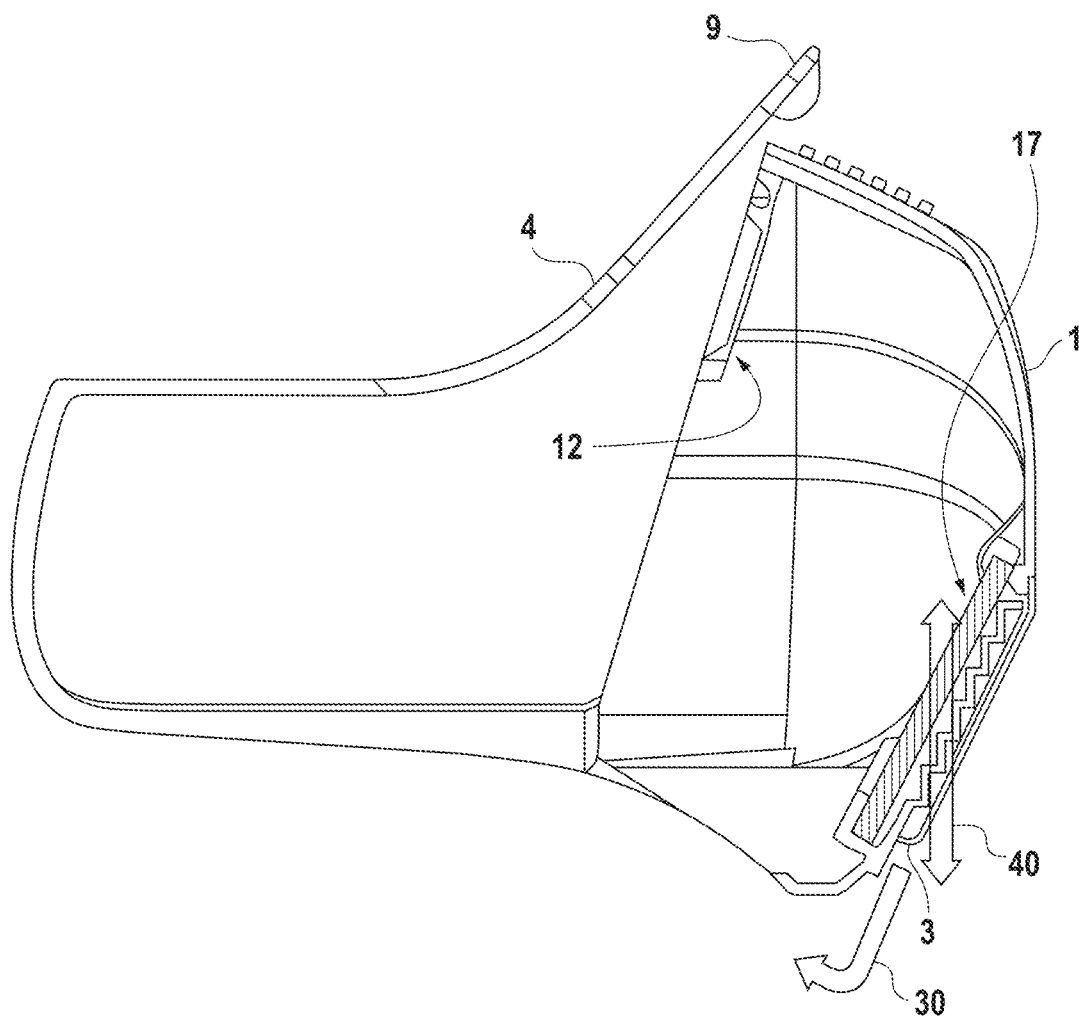
FIG. 6 is a side cutaway view of the facemask illustrated in FIGS. 1-5 with the filter inserted.

In the side cutaway view of FIG. 6, filter 17 is inserted into facemask 1. As depicted by arrow 40, bidirectional airflow induces entrained pathogens and particulates to strike filter 17 at an oblique angle. Arrow 30 depicts the channeling by side vents 3 of the wearer's exhalations down and backwards to further protect persons in front of the wearer.

As further shown in FIG. 6, a pair of hollow extrusions 12 form a secondary seal in the nasal bone area to inhibit the wearer's exhalations from escaping towards the eyes. Hollow extrusions 12 inflate with each exhalation to press facemask 1 against the wearer's face.

Figure 7:
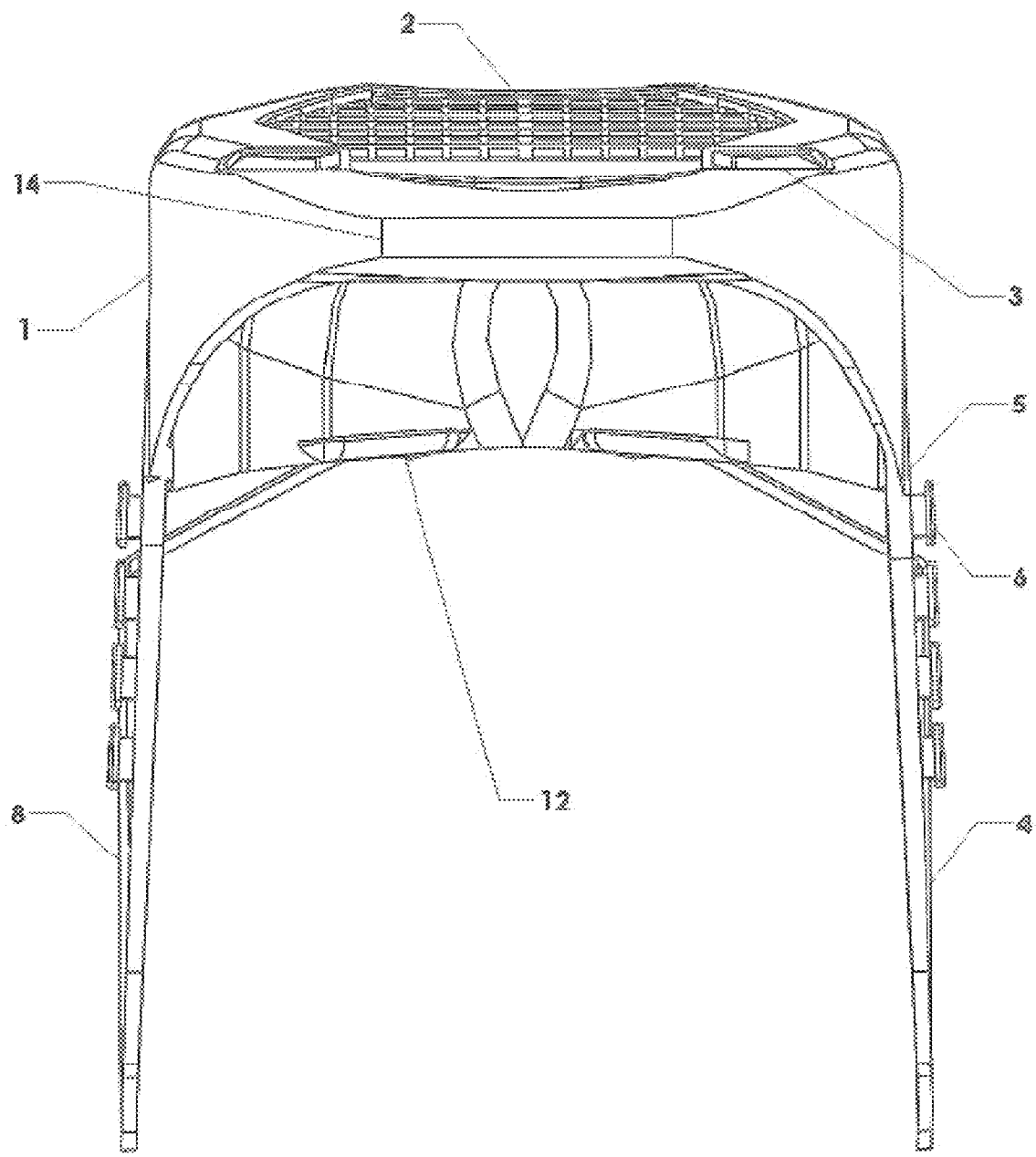
FIG. 7 is a bottom view of the facemask illustrated in FIGS. 1-6.

FIG. 7 specifically illustrates, in a bottom view, facemask 1 including lower front vents 2, with no front-facing openings. Side vents 3 direct the wearer's exhalations down and backwards. Hollowed extrusions 12 form a secondary seal in the nasal bone area to inhibit exhalations from being directed towards the wearer's eyes. Hollowed extrusions 12 inflate against the wearer's face with each exhalation.

Figures 8, 9:
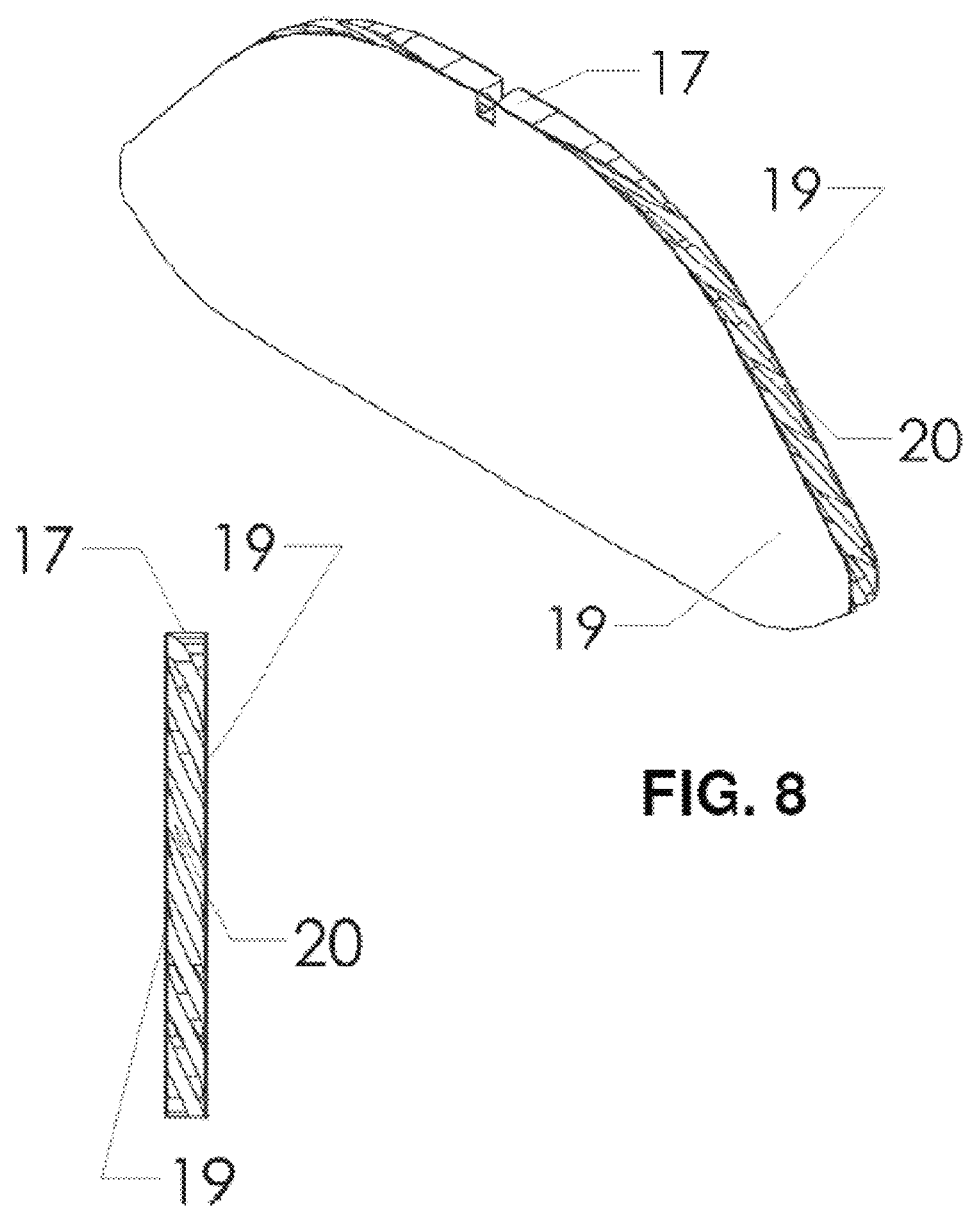
FIG. 8 is a perspective view of a filter insert for use in the facemask illustrated in FIGS. 1-7.
FIG. 9 is a side cross-sectional view of the filter insert illustrated in FIG. 8.

FIGS. 8 and 9 specifically illustrate filter insert 17, which has a frame containing a plurality of air channels 20 in approximate alignment with the air vents of the facemask to facilitate bidirectional air flow to strike the filter at an oblique angle. Filter material 19 can be varied depending upon the particular need of the wearer, such as antibacterial protection or capturing particulate matter. The S-shaped curved section of filter insert 17 increases the capture of airborne pathogens and particles.

Figure 10:
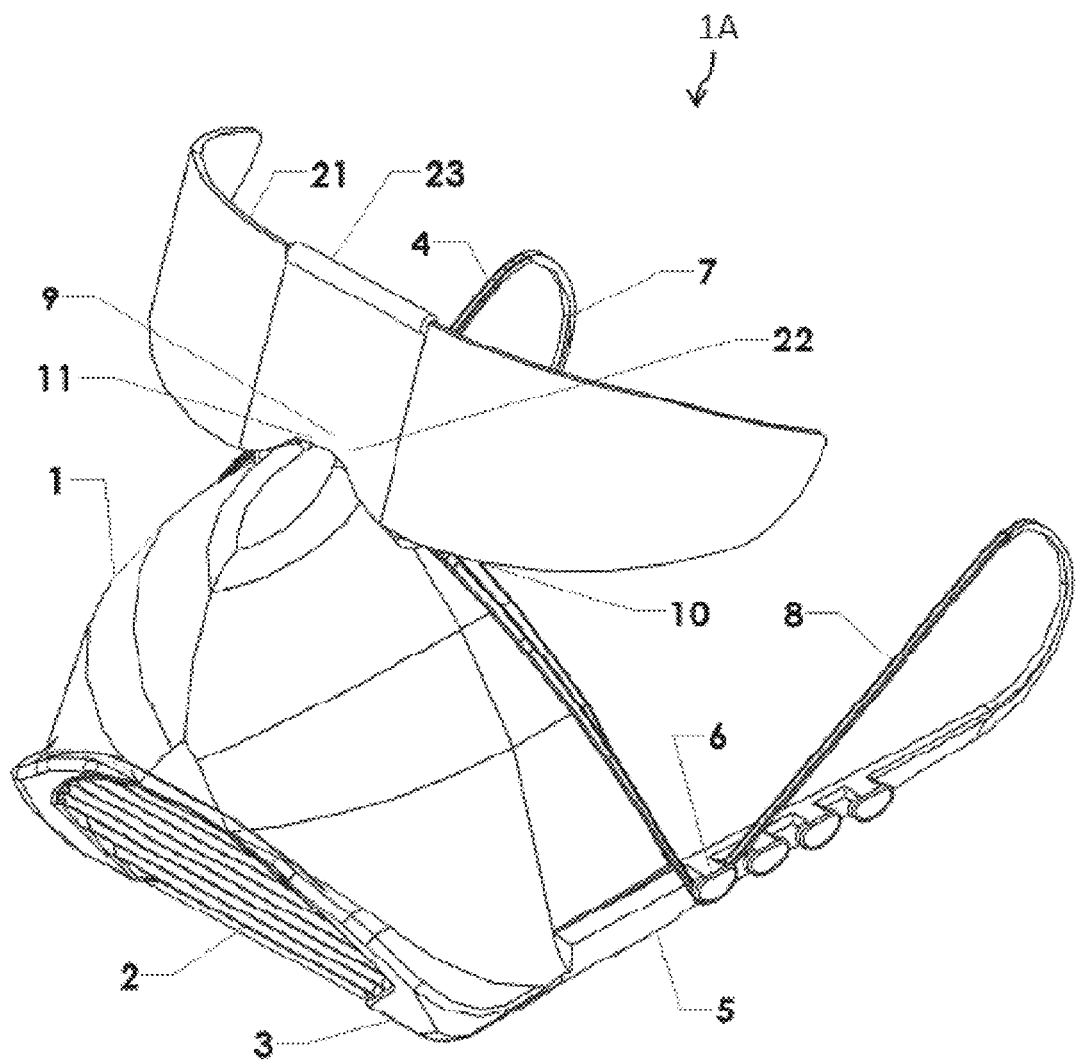
FIG. 10 is a perspective view of the front side of the facemask illustrated in FIGS. 1-6 with an eye shield attached.

FIG. 10 shows facemask 1 illustrated in FIGS. 1-6 with an exemplary eye shield 21 attached. Eye shield 21 has a pair of interior extrusions 22 that are insertable into a pair of spaced holes formed in nose bridge arch section 9 (see FIG. 2). Foam strip 23 allows eye shield 21 to rest comfortably against the wearer's forehead.

Figure 11:
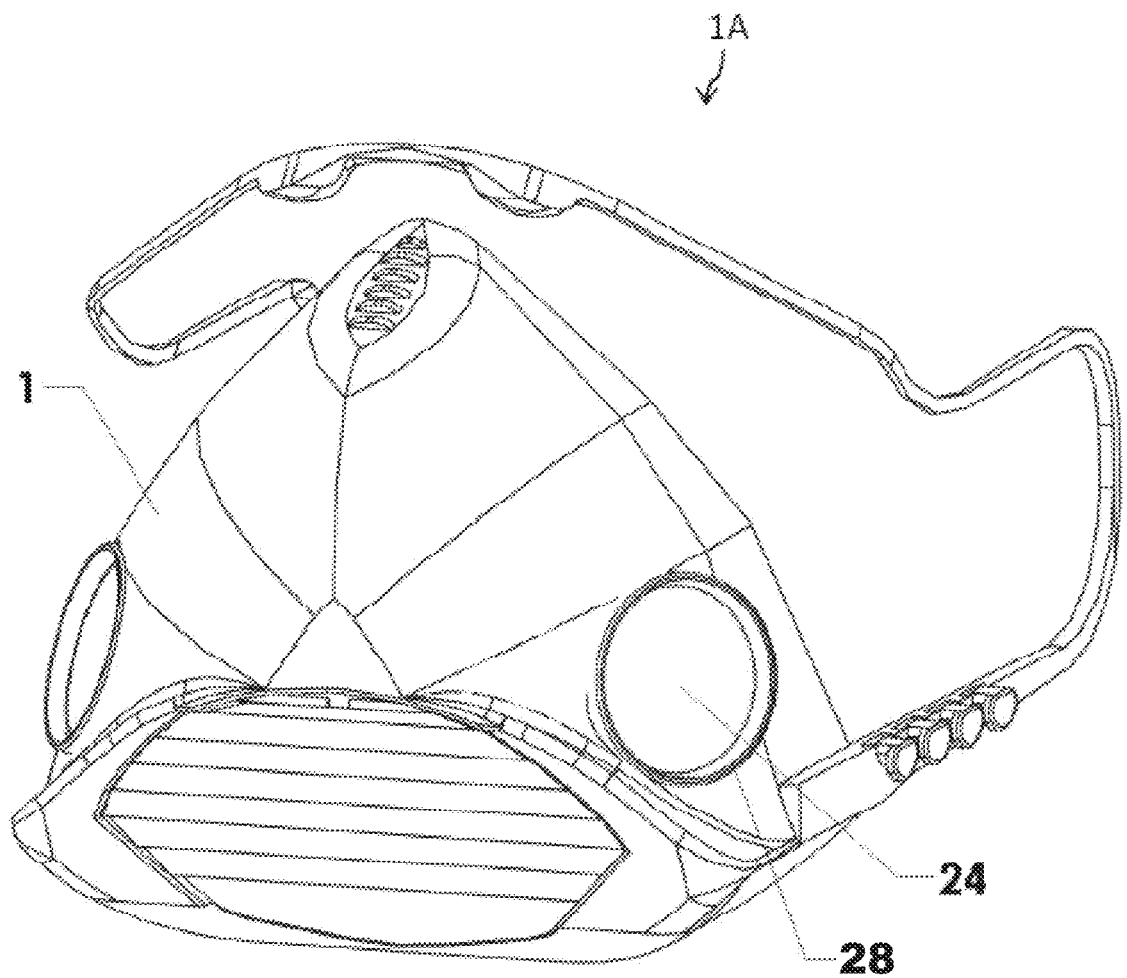
FIG. 11 is a perspective view of the front side of the facemask illustrated in FIGS. 1-6 with a pair of side resonators.

FIG. 11 shows facemask 1 with a pair of side resonators 24. Diaphragms within resonators 24 increase the volume and clarity of the wearer's speech. An elastic grooved flange 28 enables the insertion of the diaphragms.

The present facemask can be manufactured through additive manufacturing methodologies/materials which enable air channeling vents 2 and 3 illustrated in FIGS. 1 and 2 that direct the wearer's inhalation airflow to enter the mask at an oblique angle as well as exhalations to vent downward and backward towards the wearer's neck.

When describing elements of FIGS. 12-18, the same number is used to identify elements that are the same or substantially similar to each other in the different views illustrated in FIGS. 12-18.

Figure 12:
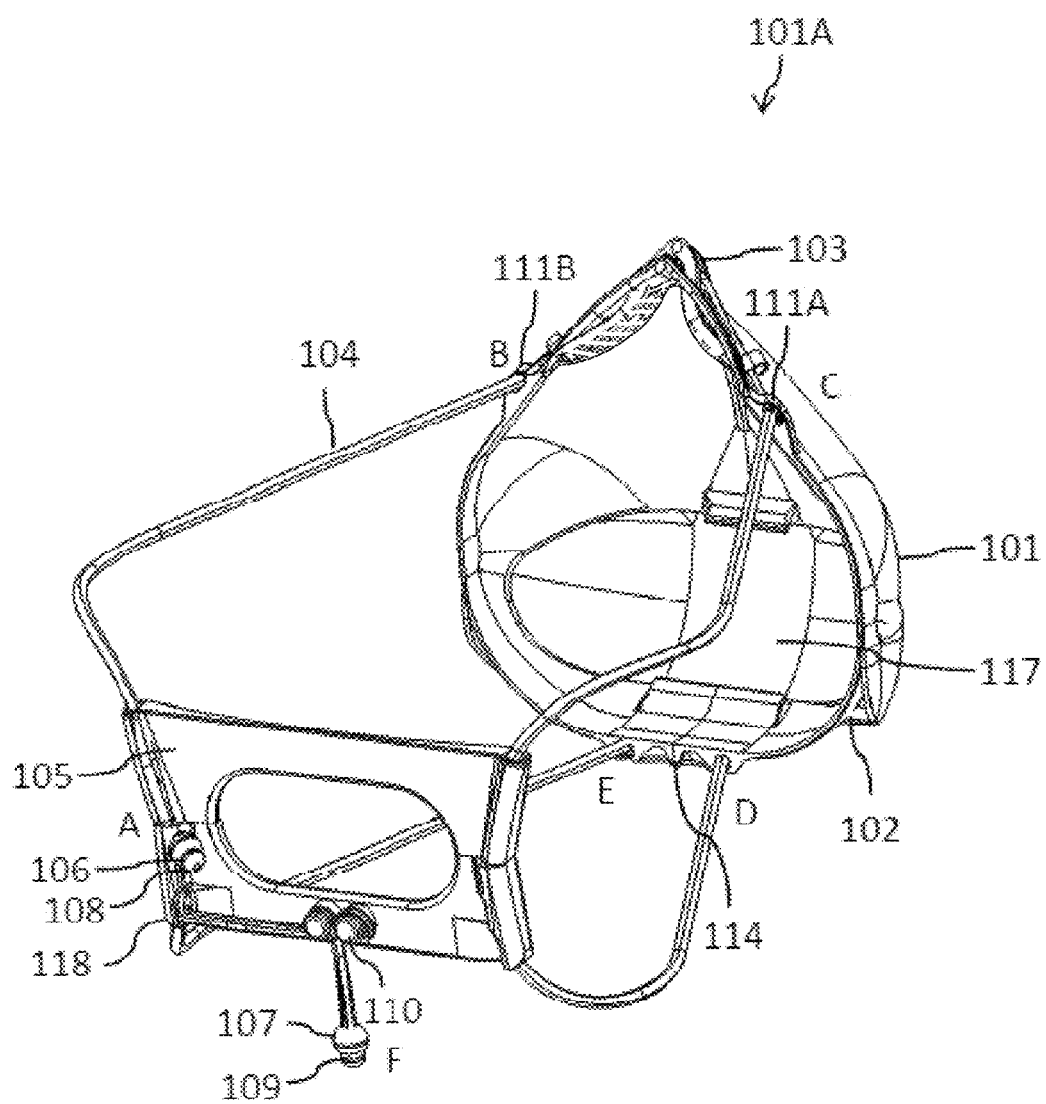
FIG. 12 is a perspective view taken from the back side of a second facemask assembly.

FIG. 12 is a perspective view taken from the back side of another embodiment of a facemask assembly 101A. Facemask assembly 101A comprises a facemask 101.

For some applications, facemask 101 can be configured to comprise a biocidal insert 117 for protection against airborne pathogens. Biocidal insert 117 can comprise one-sided or two-sided coverings of the central frame. For other applications, facemask 101 can be configured to comprise filter insert 117 suitable for protection only against particulates such as airborne dust.

Facemask 101 comprises one or more air vents such as air vent 102 of FIG. 12 for bidirectional flow of air being inhaled and exhaled by the wearer. Vent 102 is configured to direct inhaled air to strike the biocidal insert or filter insert 117 at an oblique angle to enhance the capture and retention of airborne pathogens and/or particulates. Vent 102 is configured to direct exhaled air down and back towards the neck of the wearer.

Figure 15A:
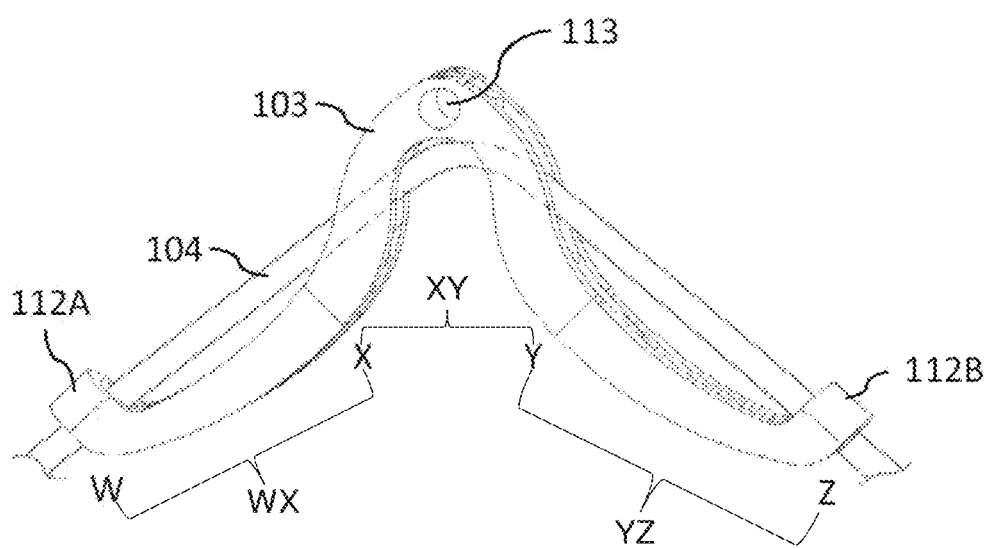
FIG. 15A is a detailed perspective view of the nose bridge clip of the facemask illustrated in FIGS. 12-14.
Figure 15B:
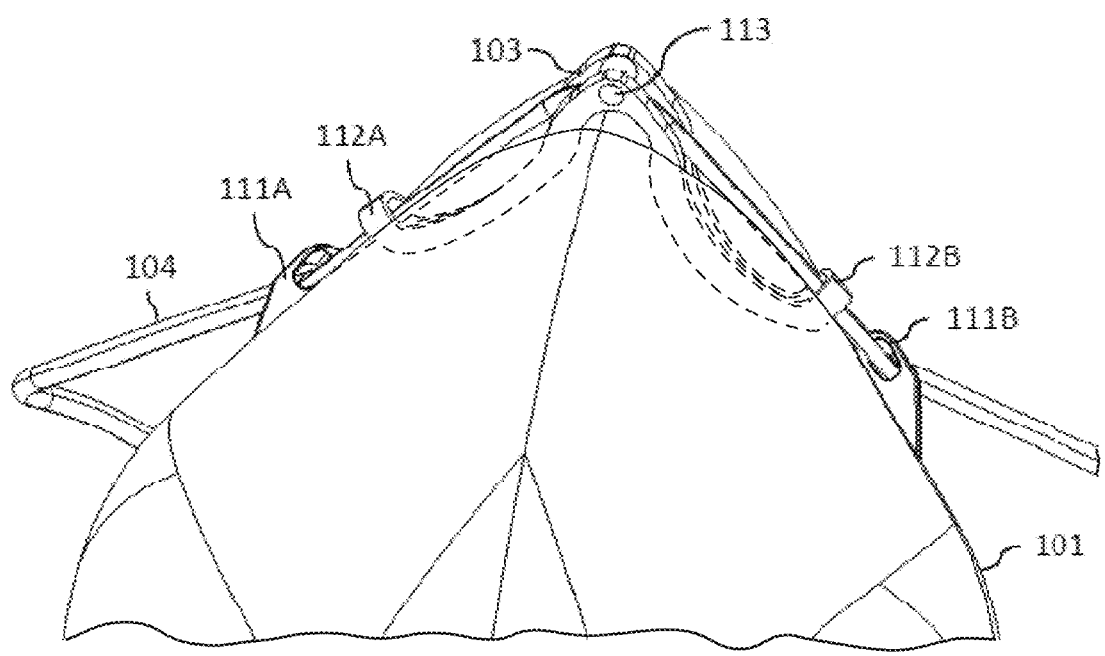
FIG. 15B is a perspective view of a section of the facemask illustrated in FIGS. 12-14 showing detail of the nose bridge clip.

Facemask 101 further comprises a nose bridge clip 103 described in more detail in reference to FIGS. 15A and 15B.

Facemask 101 further comprises a continuous strap 104. Continuous strap 104 comprises five contiguous sections labeled AB, BC, CD, DE and EF in FIG. 12. Section AB of continuous strap 104 runs from the start of strap 104, up through the interior of the left side of the head mount pad 105, then forward through a through-hole 111B and into the left side of nose bridge clip 103. (Left and right sides are defined from the wearer's perspective.) Section BC of continuous strap 104 spans nose bridge clip 103 of facemask 101, running from the left side of nose bridge clip 103 to the right side. Section CD of continuous strap 104 runs from the right side of nose bridge clip 103 via a through-hole 111A to the right side of the head mount pad 105. Strap 104 then travels down through the interior of the right side of head mount pad 105, and out through the bottom, and from there forward to chin strap structure 114. Section DE of continuous strap 104 spans chin strap structure 114, running from the right side to the left side. Section EF of strap 104 runs from the left side of chip strap structure 114 via a side hole 118 located at the bottom of head mount pad 105 to the end of strap 104 at stopper knot 109.

Figure 13:
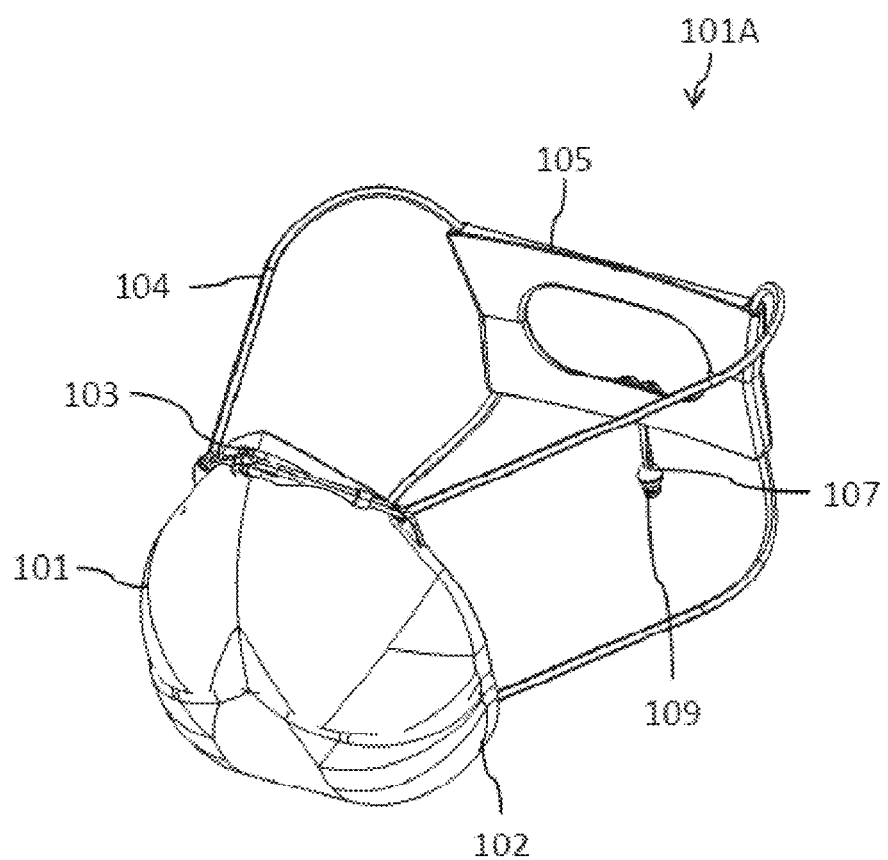
FIG. 13 is a perspective view taken from the front side of the facemask assembly illustrated in FIG. 12.

FIG. 13 is a perspective view taken from the front side of facemask assembly 101A illustrated in FIG. 12. As described above, facemask assembly 101A comprises facemask 101, vent 102, nose bridge clip 103, continuous strap 104 and head mount pad 105. The elements of facemask assembly 101A are described in more detail below in reference to FIGS. 14-18.

Figure 14A:
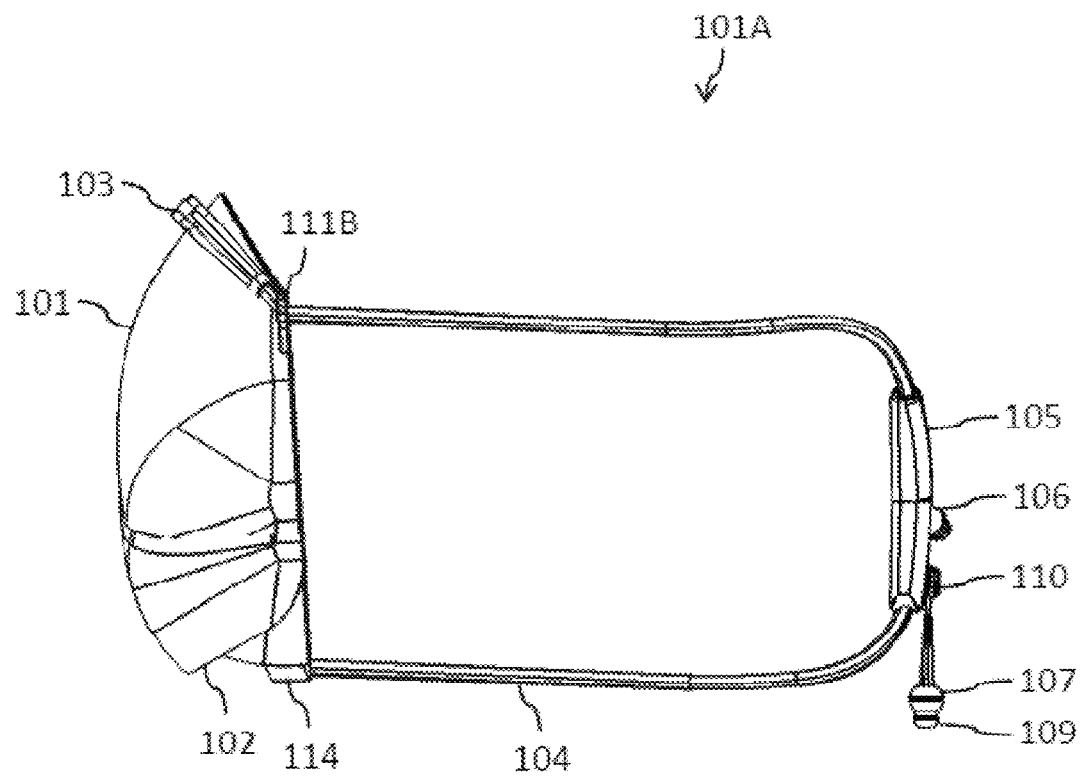
FIG. 14A is a side view of the facemask assembly illustrated in FIGS. 12 and 13.

FIG. 14A is a side view of facemask 101 illustrated in FIGS. 12 and 13. Facemask 101 comprises vent 102, nose bridge clip 103, continuous strap 104, head mount pad 105, beads 106 and 107, stopper knots 108 (not shown in FIG. 14) and 109, and one or more extrusions 110.

A part of continuous strap 104 runs from the base of nose bridge clip 103 to the top of head mount pad 105. Another part of continuous strap 104 runs from a chin strap structure 114 (described in detail in reference to FIG. 16) to the bottom of head mount pad 105.

When strap 104 is in tension, facemask 101 is held fast against the face of the wearer, and head mount pad is held fast against the back of the head of the wearer.

Figure 14B:
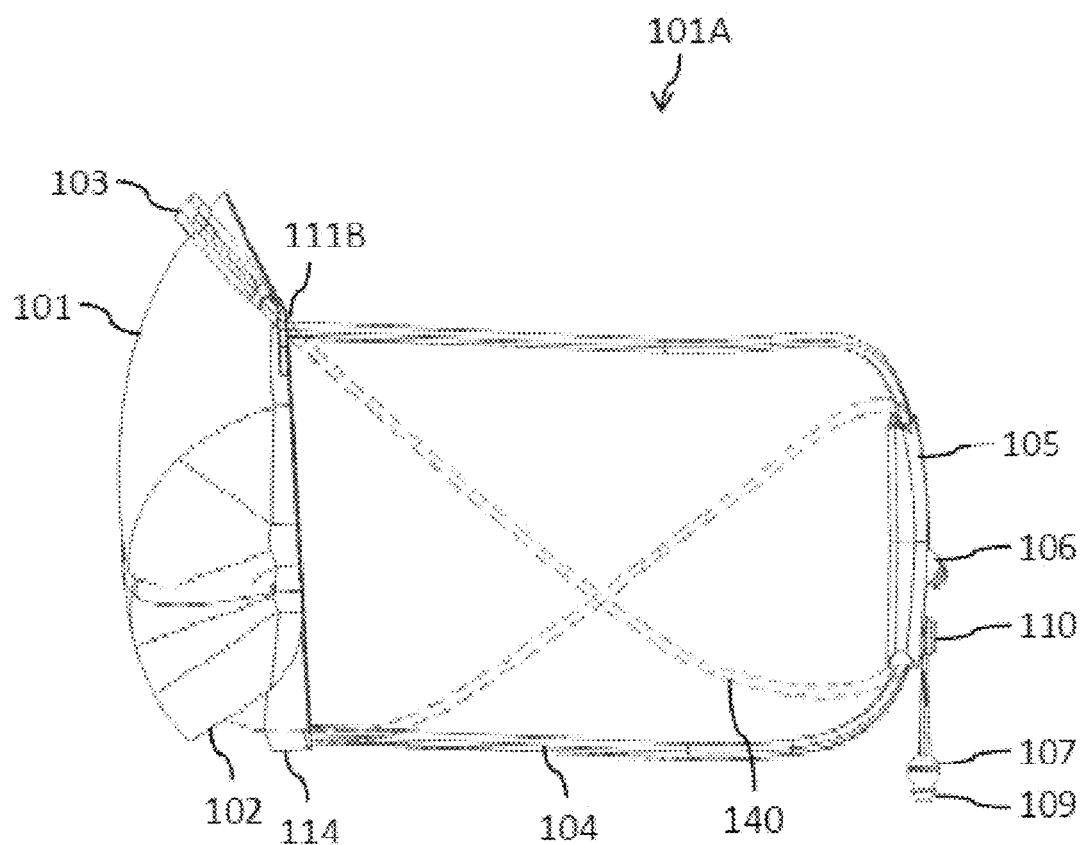
FIG. 14B is a side view of the facemask assembly illustrated in FIGS. 12 and 13 with alternative cross-strapping indicated by dashed lines.

FIG. 14B is a side view of facemask 101 illustrated in FIGS. 12-14A with alternative cross-strapping 140 indicated by dashed lines. Cross-strapping 140 comprises continuous strap 104 of FIG. 14A rerouted between nose bridge clip 103, chin strap structure 114 and head mount pad 105 as described below.

A part of cross-strapping 140 runs from the base of nose bridge clip 103 to the bottom of head mount pad 105. Another part of cross-strapping 140 runs from a chin strap structure 114 (described in detail in reference to FIG. 16) to the top of head mount pad 105.

When cross-strapping 140 is in tension, facemask 101 is held fast against the face of the wearer, and head mount pad is held fast against the back of the head of the wearer. Re-routing continuous strap 104 in the manner described above results in a greater downward tension on the top of facemask 101 and a concomitant greater upward tension on the bottom of facemask 101, which can improve the seal of facemask 101 to the face of the wearer.

Through-holes 111A (not shown in FIG. 14B) and 111B can be configured to direct strap 104 at an approximately 45° angle below the horizontal. Through-holes 111A and 111B are further illustrated in FIG. 15B.

FIG. 15A is a detailed perspective view of nose bridge clip 103 of facemask 101 illustrated in FIGS. 12-14. Nose bridge clip 103 can be configured to provide a compression zone over the nose of the wearer, the compression zone comprising one or more sections of different flexibility. In the embodiment illustrated in FIG. 15A, nose bridge clip 103 comprises three sections labeled WX, XY and YZ providing two different types of flex.

Middle section XY can be manufactured from a suitable semi-rigid flexible material. In operation, the wearer positions section XY atop facemask 101 and over the nasal bone area of the wearer's nose.

Sections WX and YZ can be manufactured from softer, more flexible material than section XY. In operation, sections WX and YZ are generally over the soft tissue area of the upper cheeks of the wearer's face.

Nose bridge clip 103 further comprises eyelets 112A and 112B, and mounting hole 113. Mounting hole 113 can be used to attach an accessory, for example a face shield or an eye shield.

Continuous strap 104 is threaded through nose bridge clip 103 and eyelets 112A and 112B as illustrated in FIG. 15A. When strap 104 is tensioned, it pulls the middle section XY of nose bridge clip 103 against the nasal bone area and the outer sections WX and YZ against the upper cheeks of the wearer's face, thereby creating an effective seal.

It is a benefit of the present facemask assembly that nose bridge clip 103 can be positioned by the wearer before and during the tensioning of strap 104. An advantage of being able to position nose bridge clip 103, and of facemask assembly 101A being more adjustable, is an increased likelihood that facemask assembly 101A is more comfortable and effective than conventional facemask assemblies. Furthermore, nose bridge clip 103 can be manufactured to suit the facial physiology of the wearer. In practice, facemask assembly 101A can be supplied with one or more nose bridge clips and the wearer can select the most suitable nose bridge clip for the wearer's physiology.

FIG. 15B is a perspective view of a portion of facemask 101 illustrated in FIGS. 12-14 showing detail of nose bridge clip 103. Strap 104 is threaded through nose bridge clip 103, eyelets 112A and 112B, and through-holes 111A and 111B. Strap 104 runs from through-holes 111A and 111B to the right and left sides respectively of head mount pad 105 (not shown in FIG. 15B).

Figure 16:
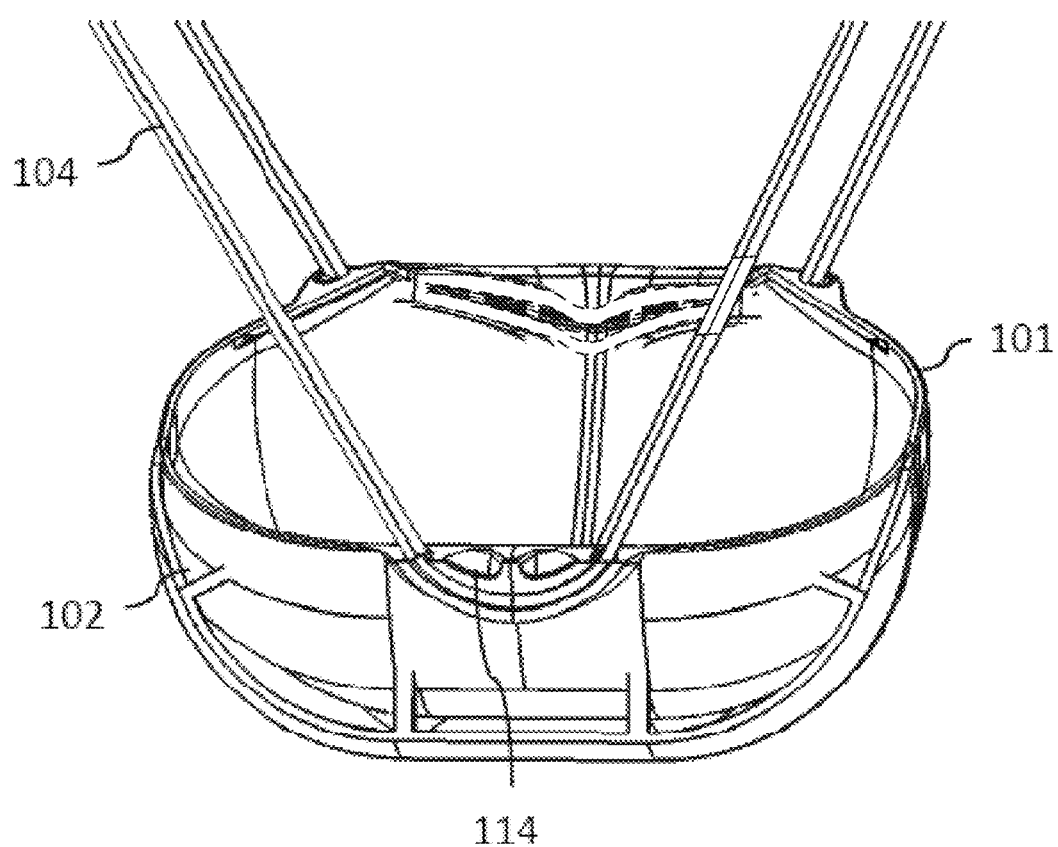
FIG. 16 is a detailed perspective view taken from the underside of the facemask illustrated in FIGS. 12-15.

FIG. 16 is a detailed perspective view taken from the underside of facemask 101 illustrated in FIGS. 12-15. Facemask 101 comprises air vent 102. Inhaled air is directed up into facemask 101 by vent 102, the inhaled air striking an interior filter 117 (not shown in FIG. 16) at an oblique angle. Exhaled air is directed out of facemask 101 by vent 102, the exhaled air being directed down and back towards the neck of the wearer.

Facemask 101 further comprises a chin strap structure 114. In some embodiments, chin strap structure 114 can be a tab or another suitable feature into which continuous strap 104 can be clipped. In other embodiments, chin strap structure 114 can be a hole through which continuous strap 104 can be threaded.

It is a benefit of the present embodiment that chin strap structure 114 (in which strap 104 passes under the jaw) can provide an improved seal of facemask 101 to the face of the wearer relative to other embodiments or facemasks in which the strap is at, or above, the jawline.

Continuous strap 104 as illustrated in FIGS. 12-16 can be hollow medical-grade surgical tubing. Other suitable material can be used, for example O-ring cord or cordage.

Figure 17:
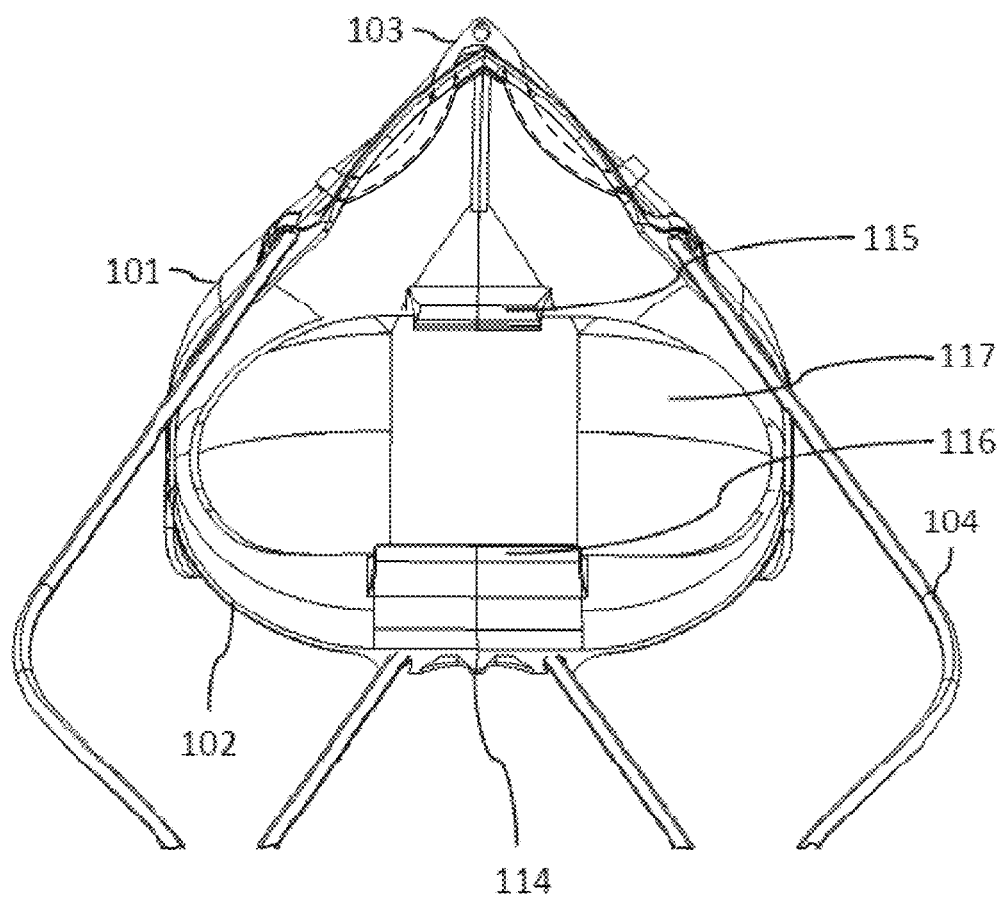
FIG. 17 is a back view of the facemask illustrated in FIGS. 12-16.

FIG. 17 is a back view of facemask 101 illustrated in FIGS. 12-16. Facemask 101 comprises an interior filter 117.

Filter insert 117 comprises a filter frame. One or both major sides of the filter frame can be covered with biocide material to destroy pathogenic particles. Alternatively, the filter frame can be configured to simply provide protection from non-pathogenic particulates such as dust.

The filter insert can be held in place by tabs 115 and 116 at the top and bottom respectively of the filter insert. Alternatively, the filter insert can be held in place by tabs on the left and right-hand sides, or by another suitable mechanism.

Filter 117 insert can be concave in shape to fit facemask 101, for example, or it can be flat as in facemask assembly 1A described above.

FIG. 17 illustrates the inward thrust of nose bridge clip 103, the clip being described in more detail above in reference to FIGS. 15A and 15B.

Figure 18:
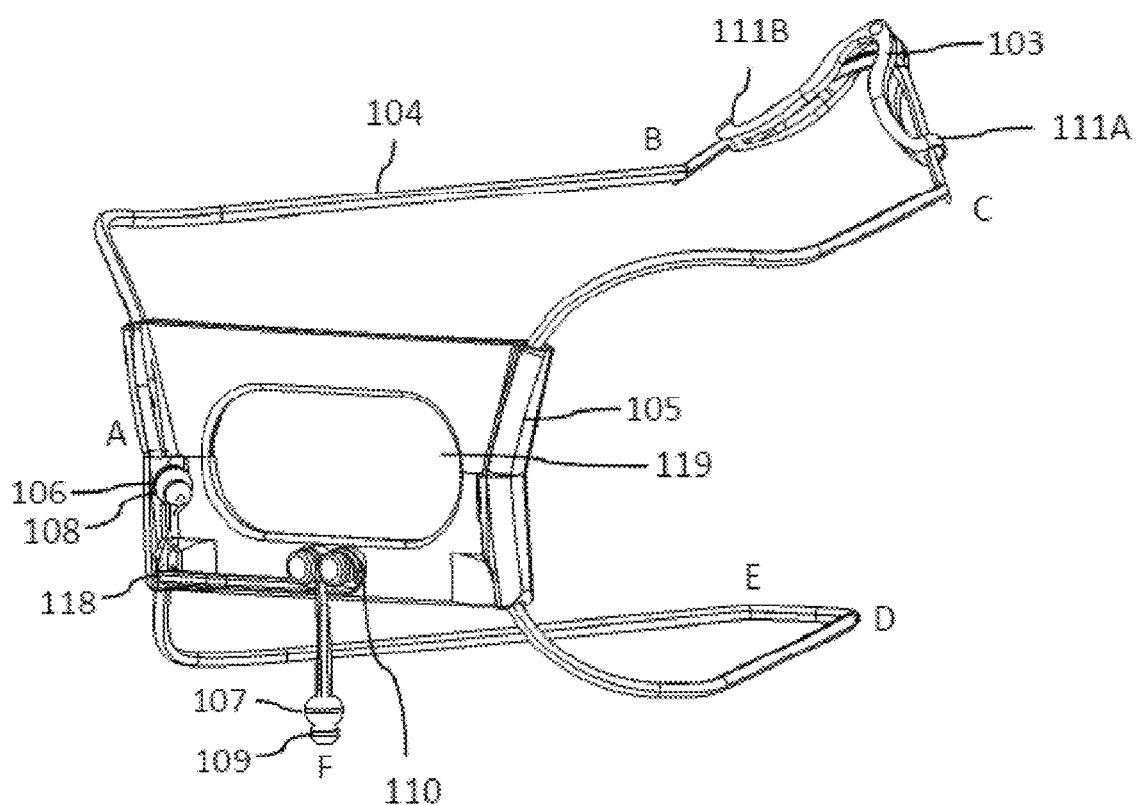
FIG. 18 is a detailed perspective view of the nose clip, continuous strap and head mount pad of the facemask assembly illustrated in FIGS. 12 and 13 taken from the back side of the facemask assembly.

FIG. 18 is a detailed perspective view of nose clip 103, continuous strap 104 and head mount pad 105 of facemask assembly 101A illustrated in FIGS. 12 and 13 taken from the back side of facemask assembly 101A.

Starting at position A in FIG. 18, strap 104 is threaded through bead 106, and stopper knot 108 is used to prevent the end of strap 104 from pulling through bead 106. Strap 104 runs upward through an interior channel of head mount pad 105 and then to position B where it passes through through-hole 111B on facemask 101 (not shown in FIG. 18). Strap 104 passes to position C via nose bridge clip 103 and through-hole 111A. From position C, strap 104 runs via head mount pad 105 to position D on the right side of chin strap structure 114 (not shown in FIG. 18). Strap 104 then passes through chin strap structure 114 to position E, and from there back to head mount pad 105. Strap 104 passes through side hole 118 (which, in this example, is on the left-hand side) and out through the back side of head mount pad 105.

At head mount assembly pad 105, strap 104 loops around one or more extrusions 110. for example using a figure of eight. Strap 104 is pulled down from extrusions 110 to securely fasten it. Alternatively, another suitable mechanism (including but not limited to a grip or a clip) can be used to secure the strap at the back of head mount pad 105.

The end of strap 104 is threaded through bead 107, and stopper knot 109 is used to prevent strap 104 from pulling back through bead 107.

While facemask assembly 101A as illustrated in FIGS. 12-18 has starting position A on the left side of the assembly (when viewed from the back or from the perspective of the wearer), it will be understood that in other embodiments (such as for a left-handed wearer) the starting position A can be on the right side of the assembly.

In operation, the wearer can adjust facemask assembly 101A as follows. Such adjustment can be done, for example, the first time the wearer dons the facemask assembly.

First, head mount pad 105 is placed against the back of the head. Secondly, the facemask is placed over the face. Next, the nose bridge clip is positioned over the wearer's nose, and sections AB, BC and CD of strap 104 are tensioned using the right hand to pull section CD through the nose clip and to hold the nose bridge clip fast against the nose. Sections DE and EF of strap 104 are tensioned, this time using the left hand, and by holding the head mount pad in position with the right hand. Once the tension is as desired, strap 104 is looped around extrusions 110 and pulled down to fasten it.

Once adjusted as described above, the facemask assembly can be readily removed by the wearer, for example, by holding the facemask and lifting the head mount pad forward over the head.

Since strap 104 is securely fastened, removing the facemask assembly will not significantly affect the tensioning of the strap. The wearer can don the facemask assembly again, without further adjustment, by placing the mask on the face, positioning the nose bridge clip, and then pulling the head mount pad back over the head.

Head mount pad 105 comprises an opening 119 which can accommodate a ponytail or hair bun.

It is a benefit of the present invention that the interior air filter (or filter insert) is in close proximity to the nose and mouth of the wearer, thereby providing less opportunity for backflow, build-up of $CO_2$ within the facemask, and/or re-inhalation of exhaled air by the wearer.

Figure 19:
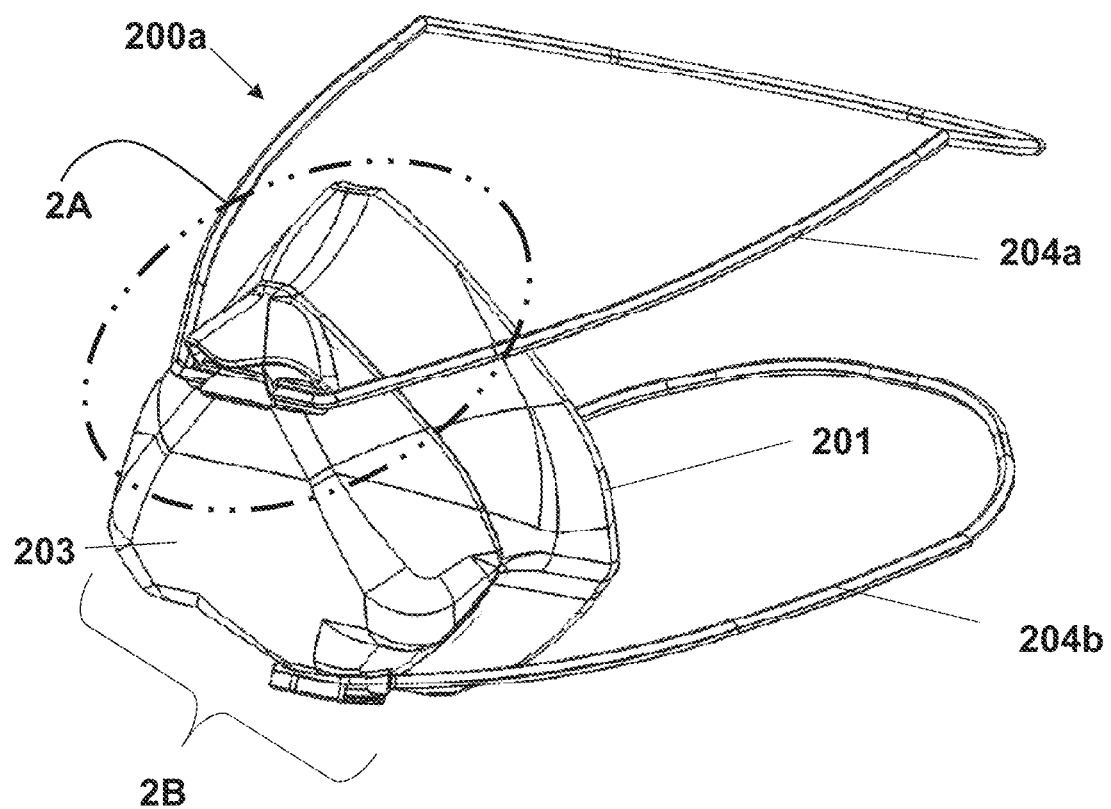
FIG. 19 is a perspective view taken from the front side of a third facemask assembly.
Figure 19A:
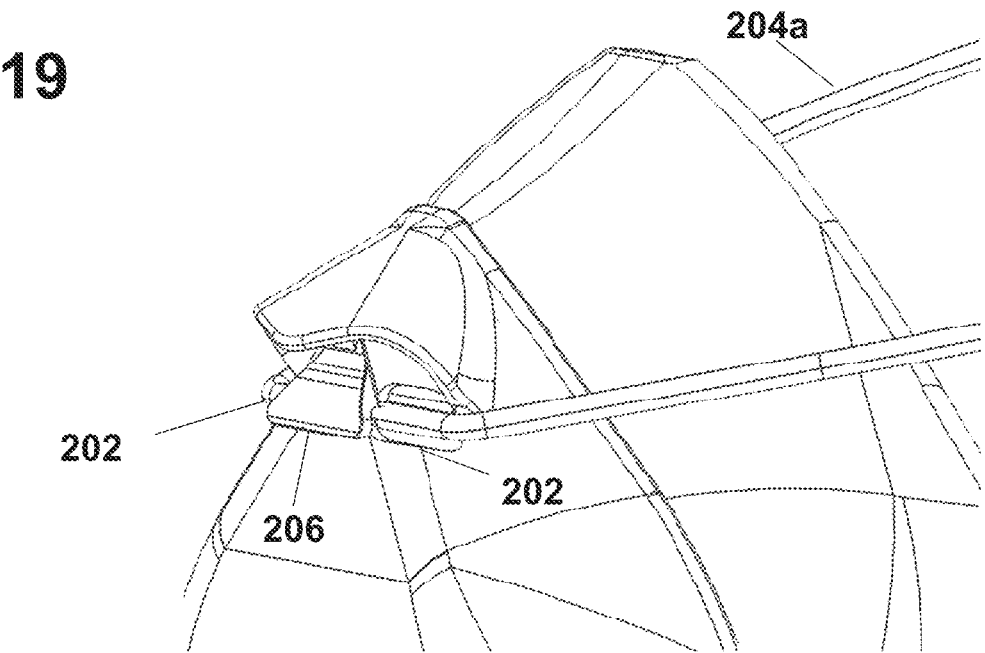
FIG. 19A is a close-up perspective view of the nasal area indicated by section 2A in FIG. 19.
Figure 19B:
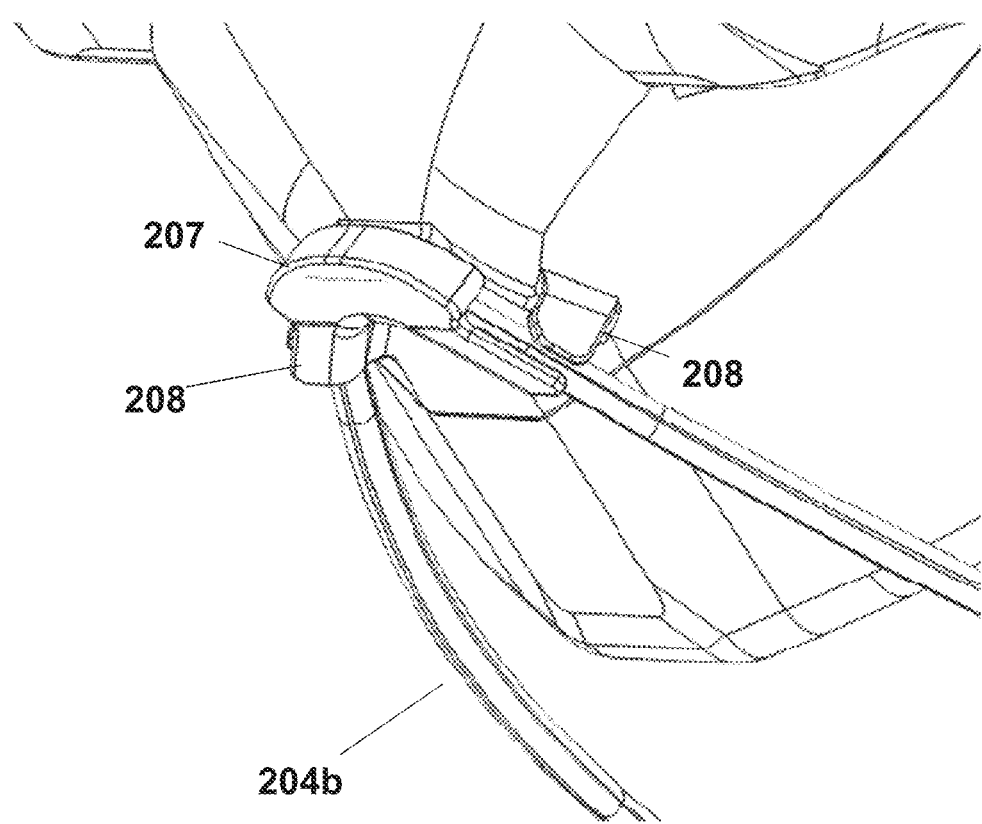
FIG. 19B is a close-up perspective view of the chin area indicated by section 2B in FIG. 19.

Turning to FIGS. 19, 19A and 19B illustrate another embodiment of a facemask assembly. Facemask assembly 200a includes elastic facemask section 201. Facemask section 203 has nasal area 2A (shown in detail in FIG. 19A) and chin area 2B (shown in detail in FIG. 19B). Front section 203 can be made of a hard plastic, among other materials. In some embodiments front section 203 is made of a thin plastic material that improves the speech clarity of the user by resonating. Face mask section 201 can be made of a soft silicone that is comfortable to wear. In some embodiments face mask section 201 creates an airtight seal with a user's face.

Nasal area 2A and chin area 2B have snap-in constructs 202 and 207 configured to enable the snapping in of various straps, cords, tubing, and/or O-ring stock. In FIG. 19 top strap 204a and bottom strap 204b are used to keep facemask assembly 200a properly positioned on the user's head.

Snap-in constructs 202 and 207 allow straps 204a and 204b to be inserted, removed and replaced. Snap-in constructs 202 and 207 also enable a wearer to make emergency repairs to facemask assembly 200a. For example, if top strap 204a were to break and the user did not have access to a proper replacement strap, the user could utilize a wide variety of suitable materials such as his or her own shoelace for an immediate field repair. This feature could be lifesaving should such an immediate field repair be necessary in an infectious or hazardous air environment.

In some embodiments top strap 204a can slide upward to enter into void 206 which allows top strap 204a to slide back and forth to balance the position of any clips and/or buckles (not shown). In some embodiments the combination of snap-in constructs 202 and void 206 allows for top strap 204a to be easily removed and/or replaced.

Turning to chin area 2B in FIG. 19B, snap-in construct 207 and optional side clips 208 help maintain bottom strap 204b in place.

Figure 20:
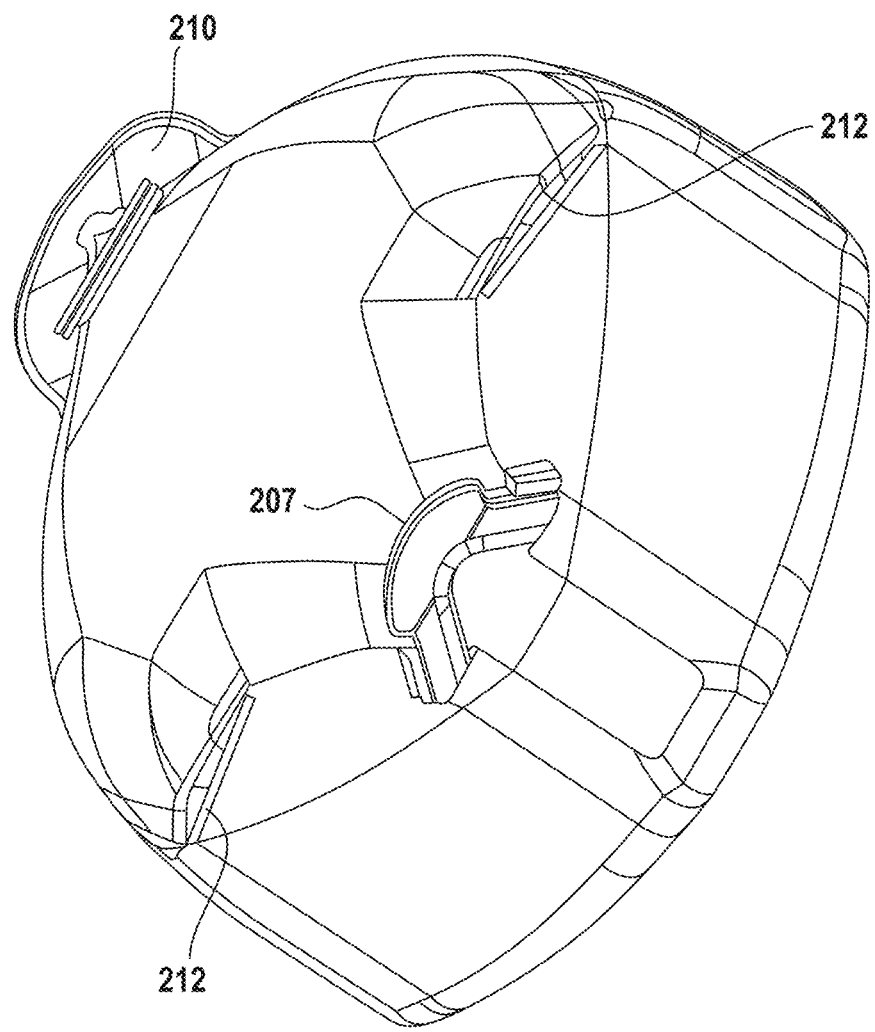
FIG. 20 is a bottom view of the facemask assembly of FIG. 19.

FIG. 20 illustrates a bottom view of facemask assembly 200a. Nasal vent 210 allows the escape of exhaled heat and $CO_2$ loaded air which leads to improved speech clarity and improved nasal or nose breathability. Nasal vent 210, coupled with the greater porosity of filter material 226 (see FIG. 22B) on the internal filter due to the oblique airflow supports improved nose breathability. The oblique angle air flow supports greater capture of air-borne elements within surface filter material 226 (see FIG. 22B). In addition, nasal breathing has been found to lower blood pressure and individuals' heartrates. It has also been found to help improve the function of individual's organs, including the brain, with optimal oxygenation.

Lower side vents 212 aid in sending exhaled air backwards and away from those in front of the user. The user may be ill and therefore it is important to keep his or her exhalations away from those he or she is interacting with. Lower side vents 212, like nasal vent 210, aid in preventing (or at least reducing) direct frontal contact of particles onto filter material 226 (see FIG. 22B).

Figure 21:
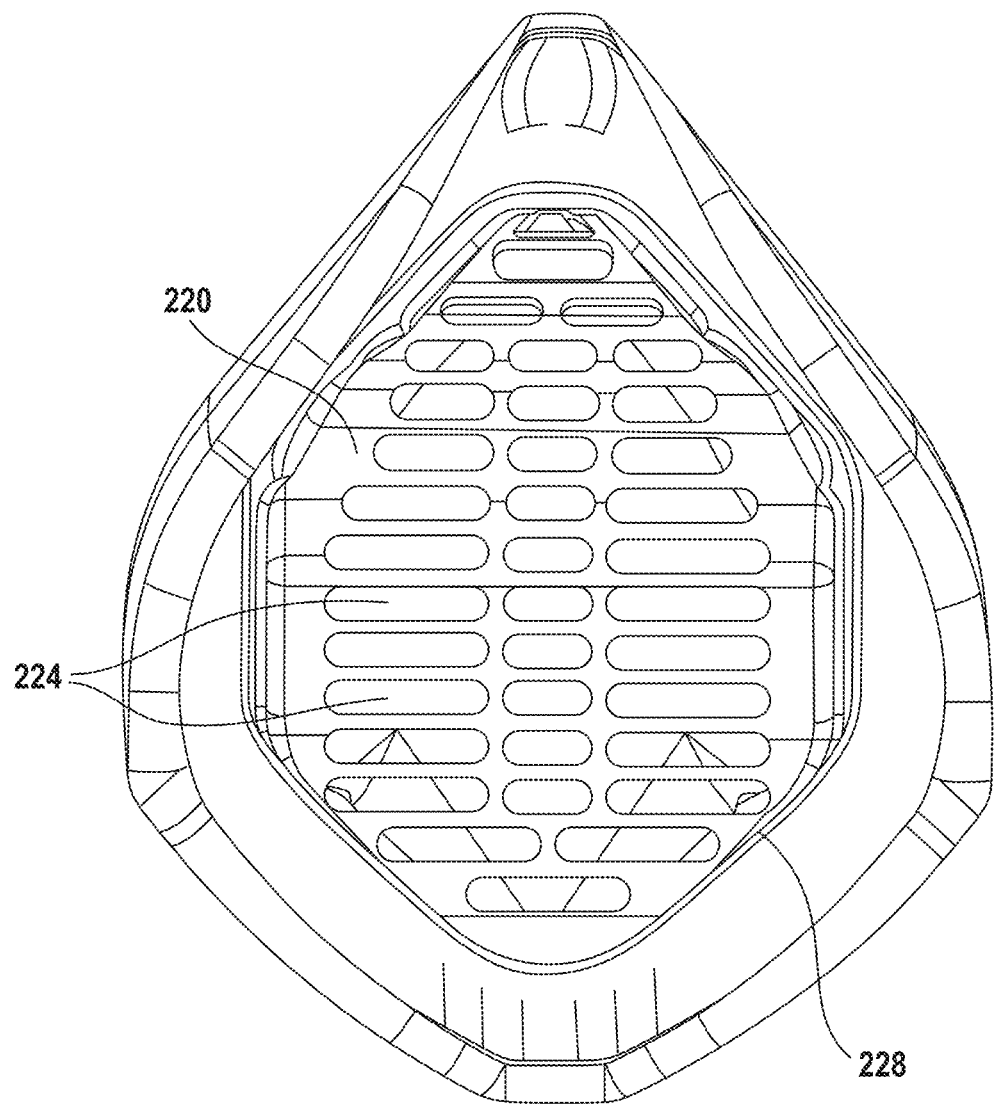
FIG. 21 is a back view of the facemask assembly of FIG. 19 with a filter insert frame.
Figure 22A:
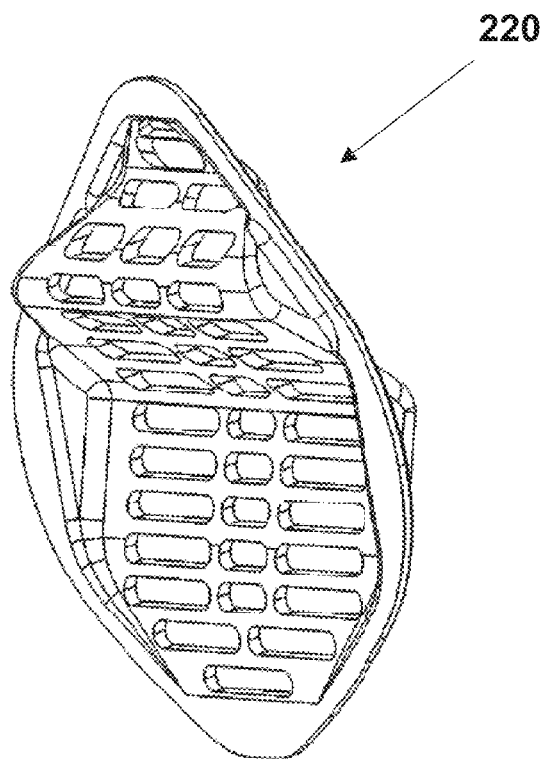
FIG. 22A is a perspective view of a curved filter insert frame.
Figure 22B:
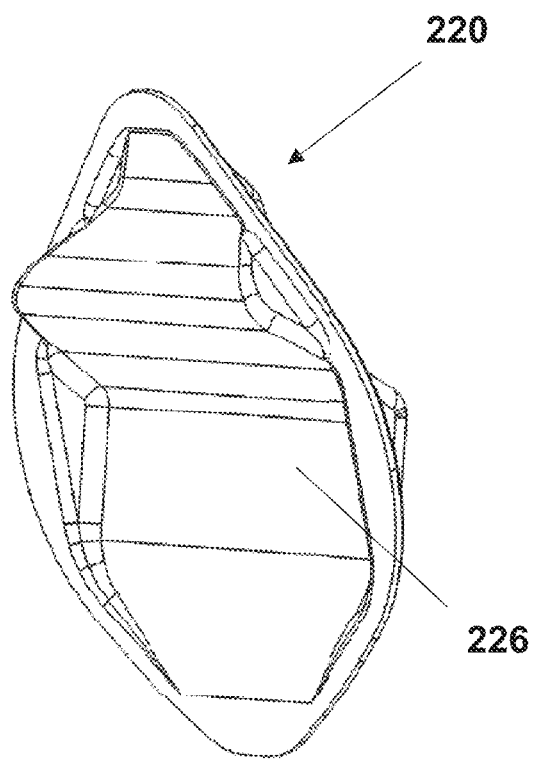
FIG. 22B is a perspective view of a curved filter insert frame with a filter material attached.

FIG. 21 shows a back view of facemask assembly 200a and a back view of curved filter insert frame 220 configured to receive filter material 226 (see FIG. 22B). Curved filter insert frame 220 includes breathing vents 224 (also present in FIG. 23). Elastic ridge 228 of facemask assembly 200a allows for the easy insertion and extraction of curved filter insert frame 220 against stopper ridge 230 (see FIG. 24). In some embodiments curved filter insert frame 220 with filter material 226 is disposable. In other embodiments curved filter insert frame 220 with filter material 226 can be cleaned and reused.

FIG. 22A and FIG. 22B are side perspective views of curved filter insert frame 220. FIG. 22A illustrates curved filter insert frame 220 without filter material 226 while FIG. 22B illustrates curved filter insert frame 220 with filter material 226. In some embodiments filter material 226 has a single active surface. In other embodiments filter material 226 can have multiple active surfaces. In certain embodiments the active material contains silver which acts as a biocidal element. In other or the same embodiments filter material 226 can be optimized for the capture of non-infectious particles such as dust or air pollution particulates. The "s-shaped" structure of curved filter insert frame 220 positions filter material 226 close to the nose and mouth. This is important when silver is used for biocidal protection as silver needs moisture to provide such protection.

Figure 23:
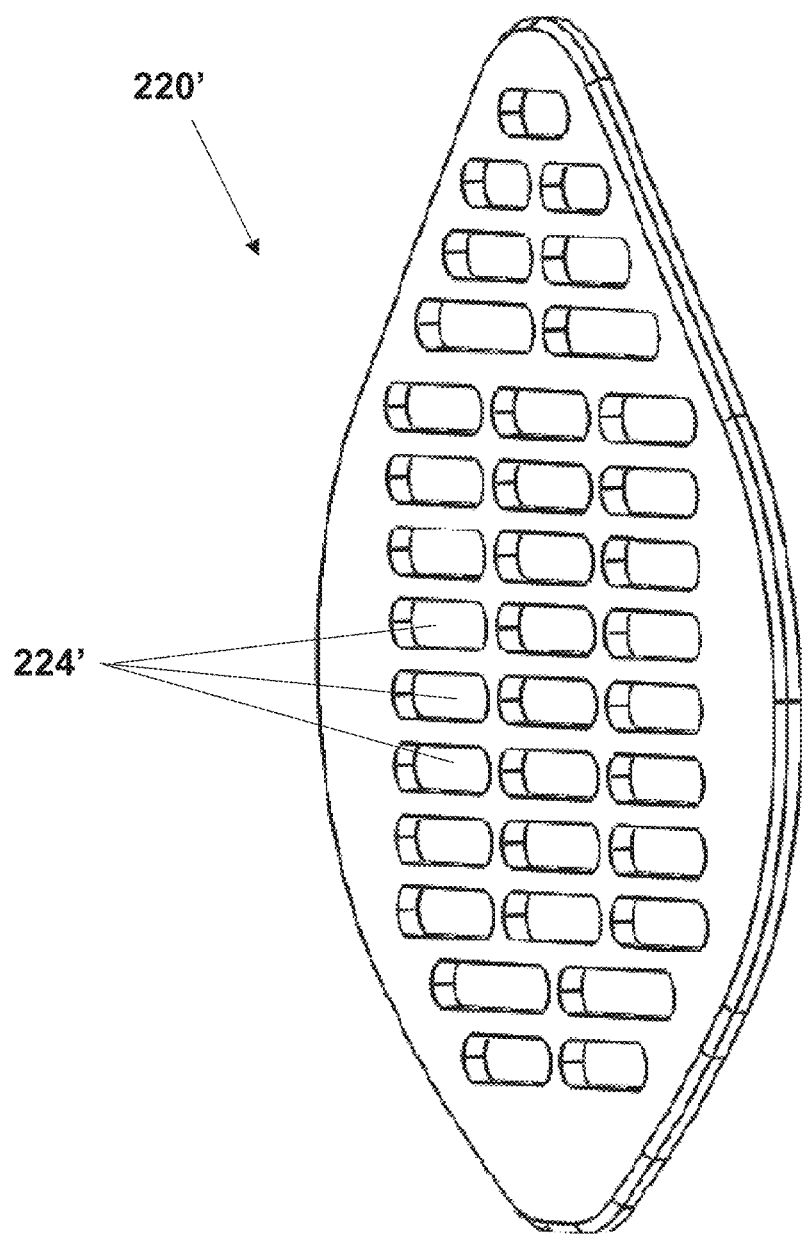
FIG. 23 is a perspective view of a flat filter insert frame.

FIG. 23 is perspective view a flat filter insert frame 220'. Curved filter insert frame 220 is configured to capture airborne particles and provide biocidal protection from airborne pathogens. Flat filter insert frame 220' is configured to capture particulate airborne particles. Its flat design allows for smaller packaging and cleaning for repeated use. Flat filter insert 220'includes breathing vents 224'. Filter material 226 can also be used with flat filter insert frame 220'.

Figure 24:
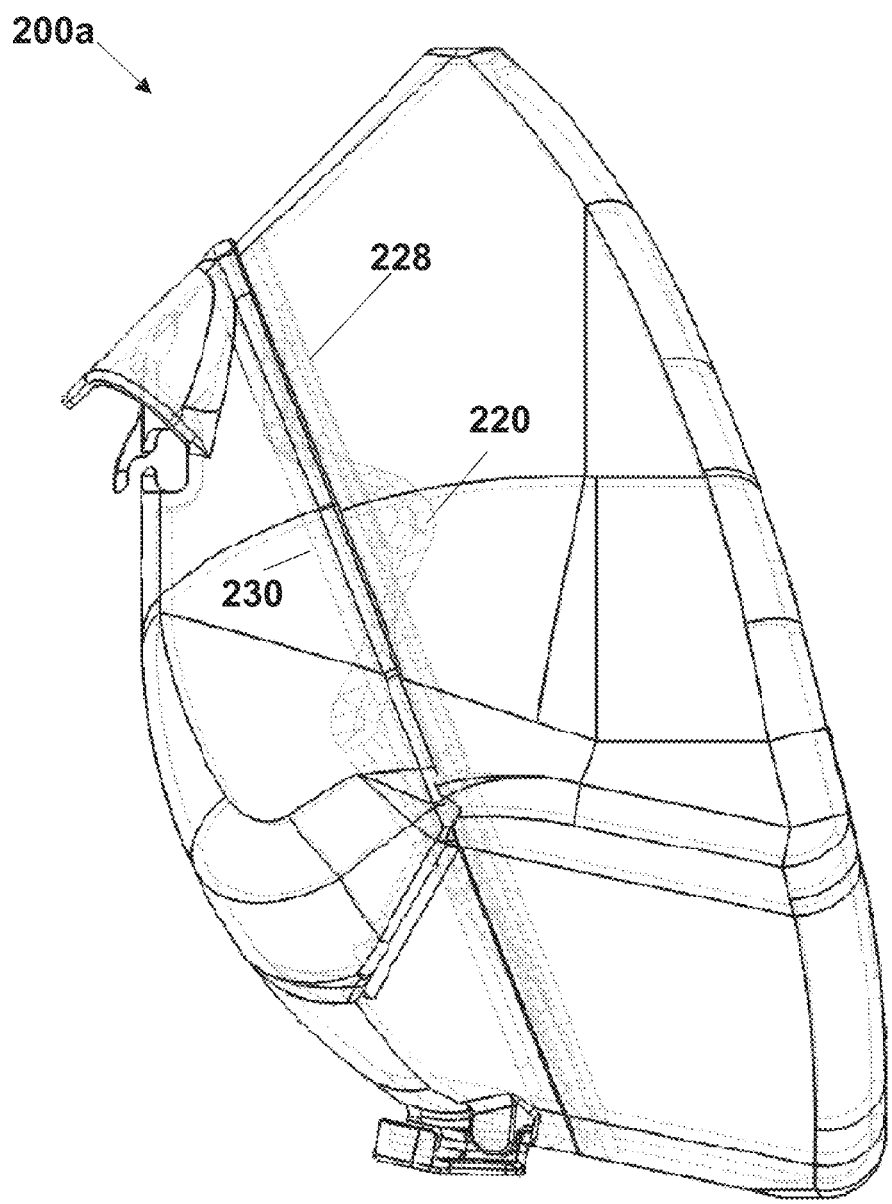
FIG. 24 is cutaway side view of the facemask assembly of FIG. 19 with a filer insert.

FIG. 24 is a side view of facemask assembly 200a with filter insert frame 220 inserted between elastic ridge 228 and stopper ridge 230. The shape of curved filter insert frame 220 allows for closer proximity of filter material 226 to the mouth and nostrils which enhances the capture of moisture from exhalations.

Figure 25:
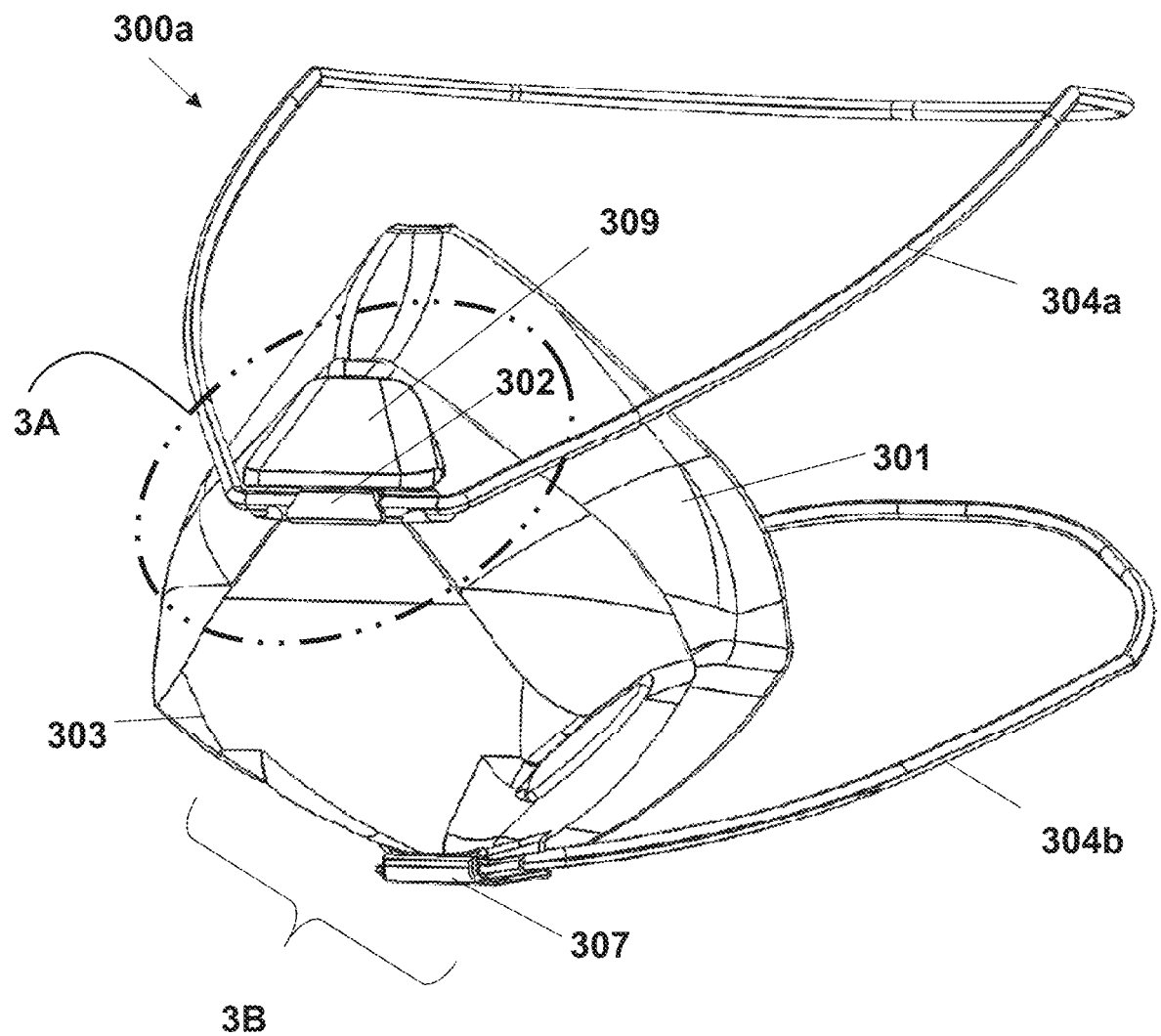
FIG. 25 is perspective view of a fourth facemask assembly.

FIG. 25 shows facemask assembly 300a which includes a soft, elastic facemask section 301. Front section 303 has nasal area 3A and chin area 3B. Front section 303 can be made of a hard plastic, among other materials.

Nasal area 3A and chin area 3B have snap-in constructs 302 and 307 configured to accommodate the insertion and extraction of various straps, cords, tubing, and/or O-ring stock such as top strap 304a and bottom strap 304b. Snap-in constructs 302 and 307 allow straps 304a and 304b to be replaced and/or decontaminated and re-inserted. In certain embodiments straps 304a and 304b are of a fixed length. In other embodiments straps 304a and 304b are open-ended to be tied behind the ears or the head or secured and adjusted via various cord lock systems. In some embodiments nasal snap-in construct 309 allows for an eye shield to be either added or removed from facemask assembly 300a.

In some embodiments top strap 304a can slide upward to enter into a void which allows top strap 304a to slide back and forth to balance the position of any clips and/or buckles (not shown). In some embodiments the combination of both snap-in constructs 302 and 307 allow for both top strap 304a and bottom strap 304b to be easily removed by reversing the previously snap-in movement.

Turning to chin area 3B, snap-in construct 307 and optional side clips (not shown) help maintain bottom strap 304b in place.

Figure 26:
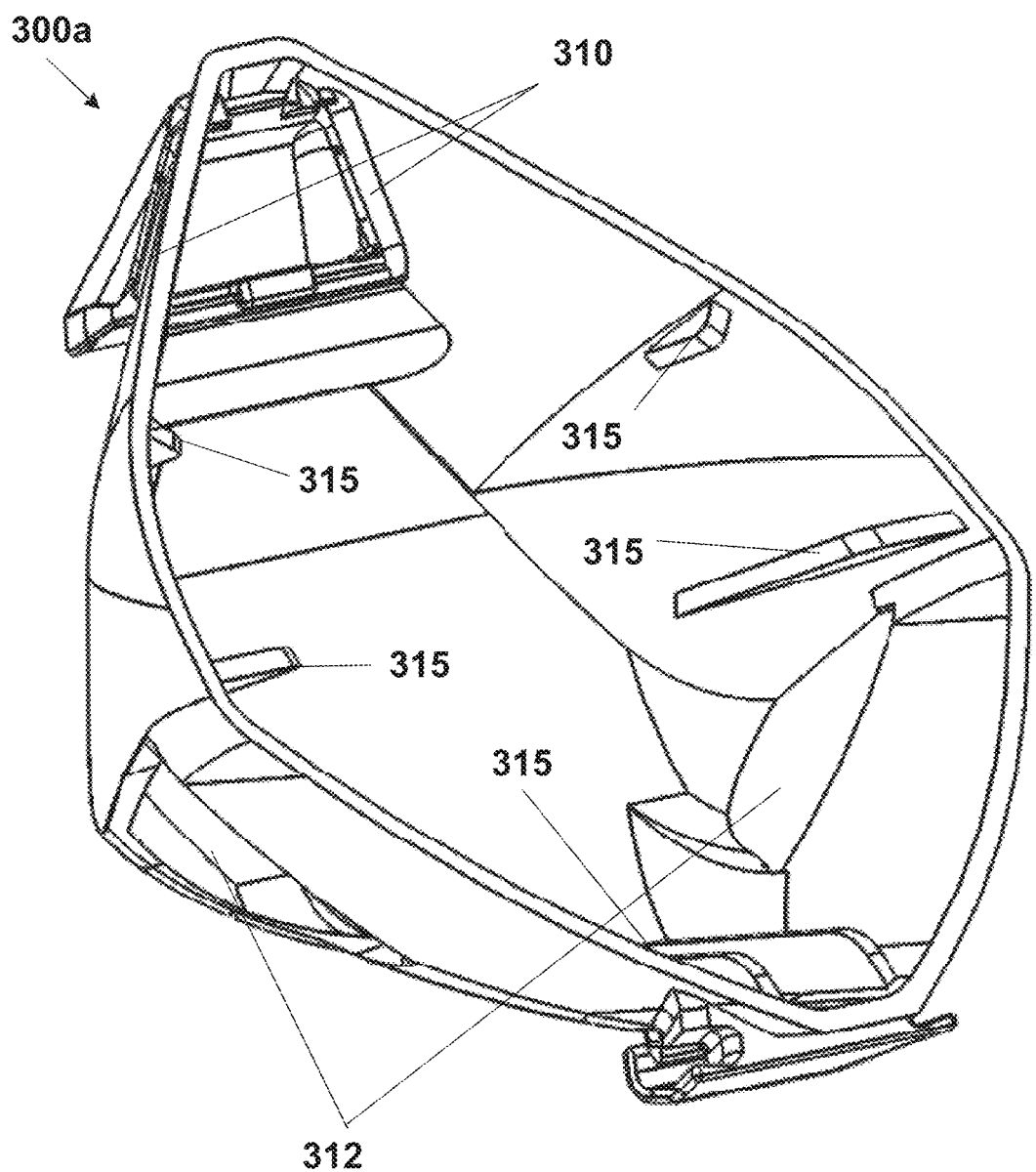
FIG. 26 is a perspective view of the back of the facemask assembly of FIG. 25.

FIG. 26 illustrates a perspective view of facemask assembly 300a with the soft elastic face mask section 301 removed. In this embodiment nasal vents 310 allow the escape of exhaled heat and $CO_2$ loaded air. Nasal vents 310 supports improved nose breathability over conventional masks and respirators and accentuates the oblique angle air flow that supports greater capture of air-borne elements within the surface of filter material (not shown). Side vents 312 aid in sending exhaled air backwards and away from those in front of the wearer. Side vents 312, like the nasal vent 310, aid in preventing (or at least reducing) direct frontal contact of airborne particles on to the air filter material.

In certain embodiments stopper extrusions 315 keep the filter insert (not shown) pressed back into the silicone skirt (not shown).

Figure 27:
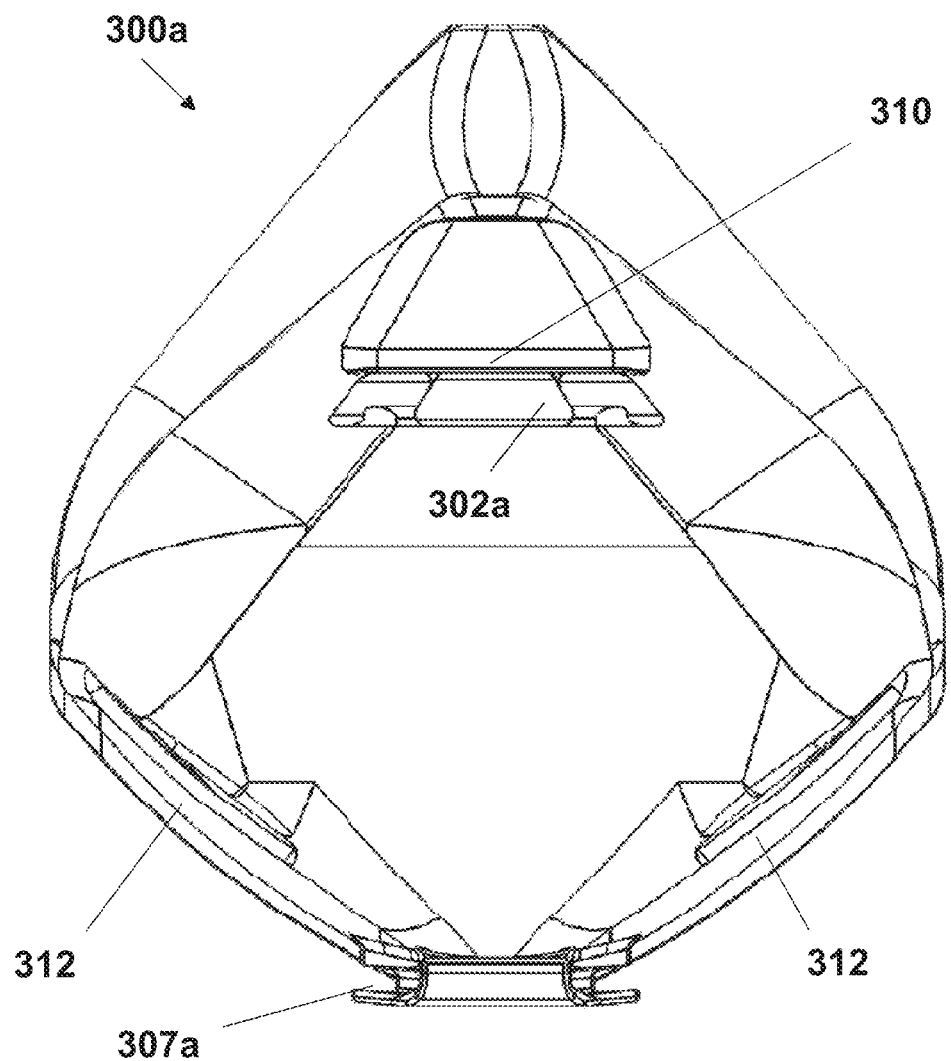
FIG. 27 is a front view of the facemask assembly of FIG. 25.

FIG. 27 is a front view of facemask assembly 300a. Snap-in slots 302a and 307a can be configured to accommodate a wide varies of straps, cords, tubing, and/or O-rings. Facemask assembly 300a is configured to reduce, if not completely prevent forward facing air inhalations and exhalations. Additionally, nasal vent 310 and side vents 312 create oblique airflow patterns over filter insert (not shown).

Figure 28:
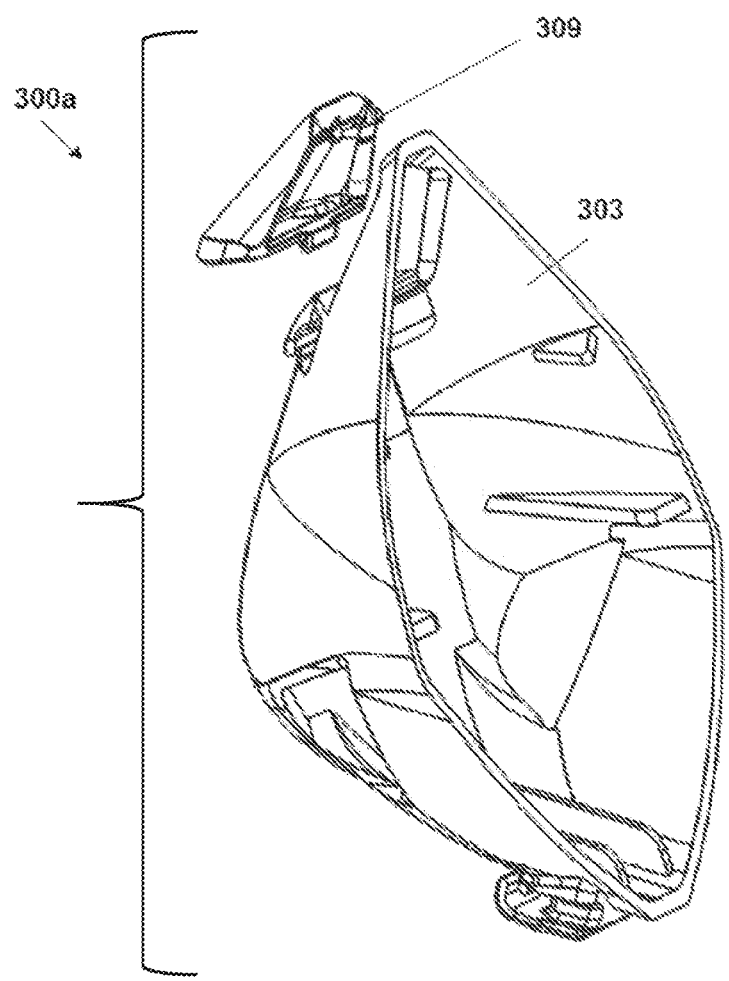
FIG. 28 is an exploded perspective view of the back of the facemask assembly of FIG. 25 with the soft elastic facial skirt removed.

FIG. 28 is an exploded perspective view of front section 303 of facemask assembly 300a with elastic section 301 removed. Nasal air vent snap-in construct 309 is seen detached from front section 303.

Figure 29A:
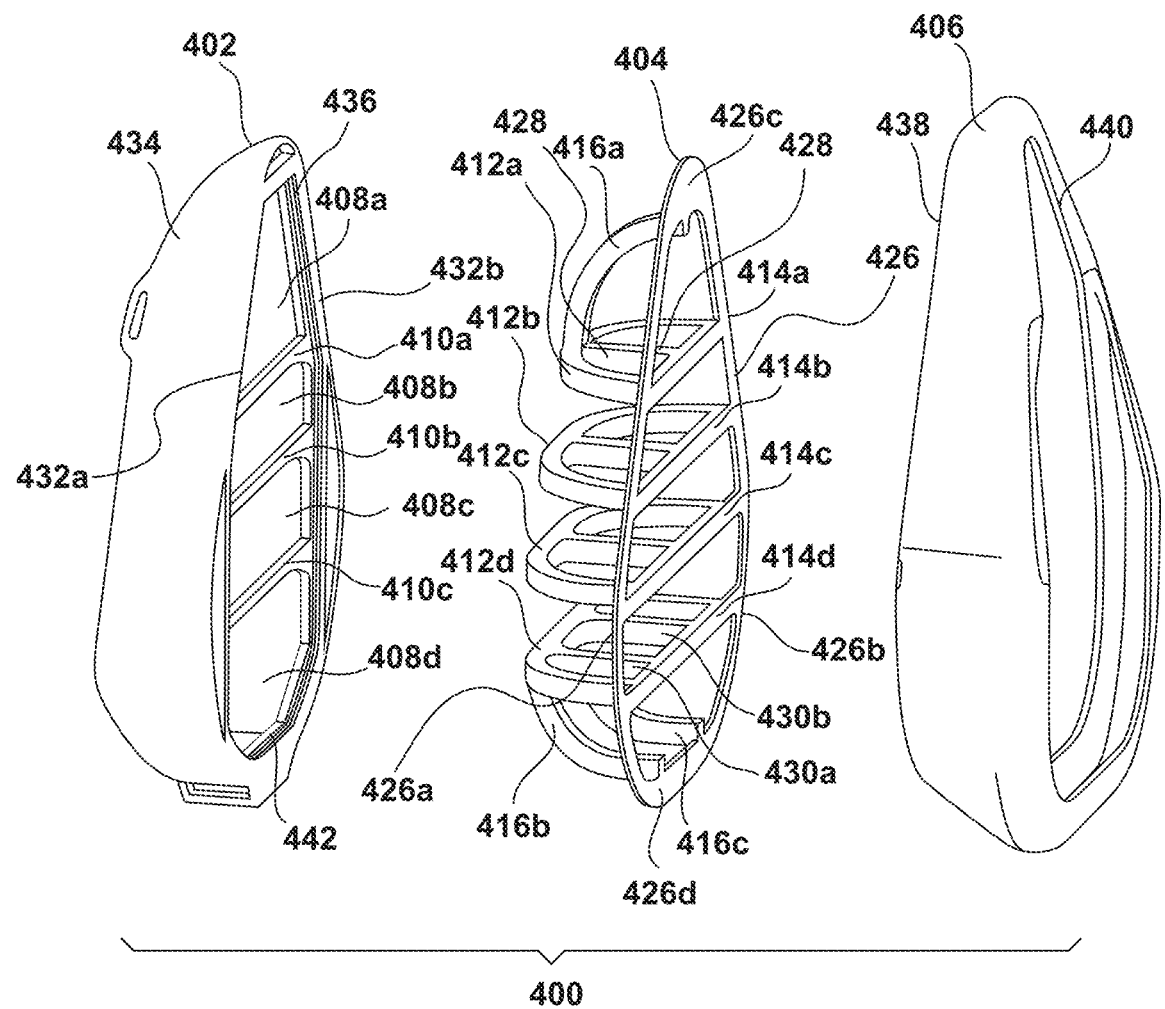
FIG. 29A is an exploded perspective view of a facemask.
Figure 29B:
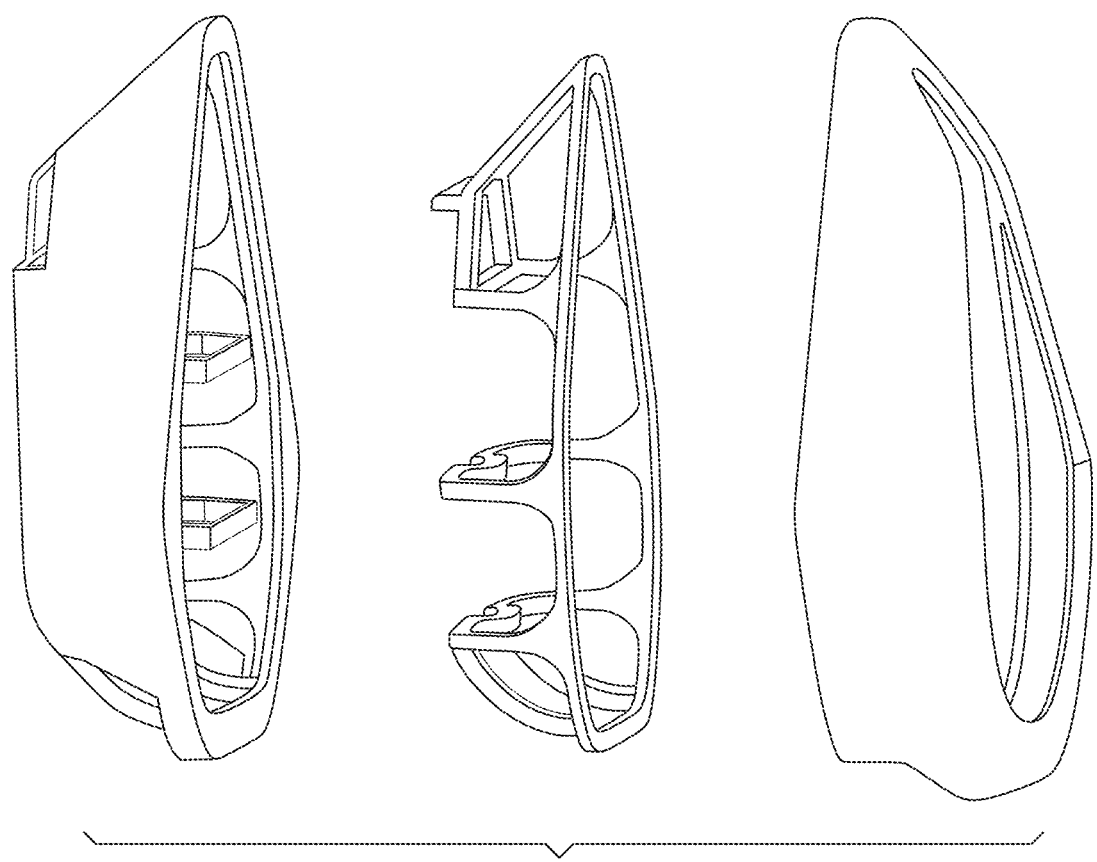
FIG. 29B is an exploded perspective view of another embodiment of a facemask.

Turning to FIG. 29A, facemask 400 can include front section 402, frame 404, and facial skirt 406. In some embodiments, such as those illustrated in FIG. 29A, frame 404 can be slotted or pleated with a series of horizontal segments 412a-d extending laterally from vertical frame 426. In some embodiments, each of horizontal segments 412a-d is curved or rounded and extends the respective width of vertical frame 426, from side 426a to 426b. In some embodiments, horizontal segments 412a-d are substantially perpendicular to vertical frame 426.

In some embodiments, crossmembers 414a, 414b, 414c, and 414d of horizontal segments 412a, 412b, 412c, and 412d, respectively, are continuous with vertical frame 426. Horizontal segments 412a, 412b, and 412c can each include bisecting member 428 that extends from the outward, curved portion of each segment to crossmember 414a, 414b, and/or 414c, respectively. In some embodiments, horizontal segment 412d includes trisecting members 430a and 430b that extend from the outward portion of horizontal segment 412d to crossmember 414d.

In some embodiments, horizontal segment 412a is connected to top end 426c of vertical frame 426 by curved member 416a and horizontal segment 412d is connected to bottom end 426d by curved members 416b and 416c. In some embodiments, curved member 416a can be disposed along the vertical midline of frame 404 and align with bisecting member 428 of each horizontal segment. In some embodiments, curved members 416b and 416c align with trisecting members 430a and 430b of horizontal segment 412d.

Front section 402 can include outer shell 434 that receives frame 404 when facemask 400 is assembled. In some embodiments, such as those illustrated in FIG. 29A, front section 402 has a "cross frame" internal structure that includes crossmembers 410a, 410b, and 410c that extend the respective inner width of outer shell 434 from side 432a to side 432b. In the embodiment shown, crossmembers 410a-c create four cavities, 408a-d, each cavity for receiving a horizontal segment of frame 404 when facemask 400 is assembled. Specifically, cavities 408a, 408b, 408c, and 408d receive horizontal segments 412a, 412b, 412c, and 412d, respectively.

The perimeter of the receiving portion of front section 402, that is, the portion of front section 402 in which frame 404 is inserted, can be polygonal in shape. In some embodiments, such as those shown in FIG. 29A, perimeter 436 can be octagonal in shape. In some embodiments, perimeter 436 includes continuous groove 442 allowing frame 404 to be snapped into front section 402.

Front section 402 and/or frame 404 can be rigid or semi-rigid structures constructed from materials such as, but not limited to, various polymers, elastomers, plastics, rubbers, and/or silicones. In some embodiments, front section 402 can be made from various grades of hard plastic.

Facial skirt 406 of facemask 400 has elastic properties and contacts the face of a wearer. In some embodiments, facial skirt 406 can be constructed from materials such as, but not limited to, soft silicone that conforms to the wearer's face and creates a seal with the wearer's skin. In some embodiments, facial skirt 406 includes inner perimeter 438 with an opening formed therein (not shown). In some embodiments, inner perimeter 438 contacts frame 404 and front section 402 when facemask 400 is assembled, sealing the facemask together. In some embodiments, outer perimeter 440 of facial skirt 406 has an opening formed therein that fits over the nose and around the mouth of a wearer, sealing facemask 400 to the wearer's face.

In some embodiments, facial skirt 406 can be customized to a specific wearer.

Figure 30A:
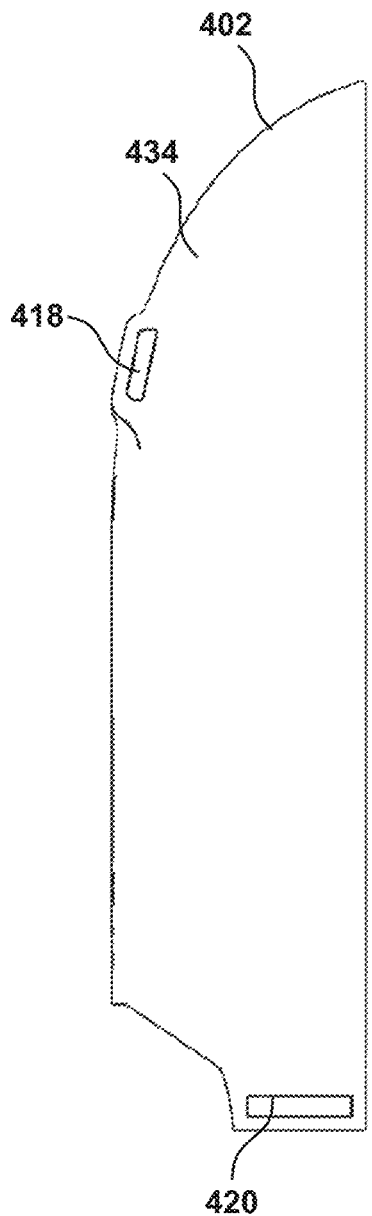
FIG. 30A is a side view of the front section of FIG. 29A.
Figure 30B:
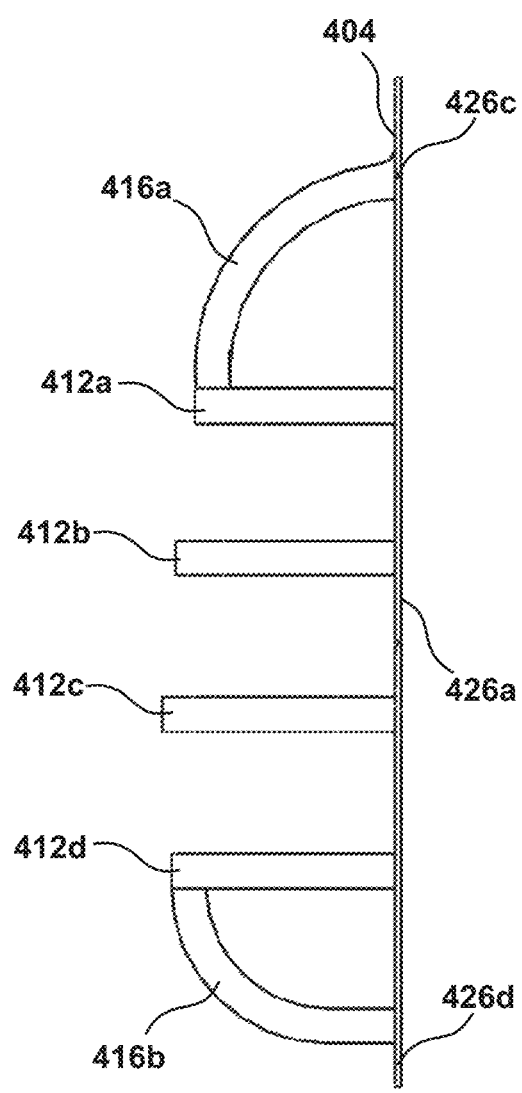
FIG. 30B is a side view of the pleated frame of FIG. 29A.
Figure 30C:
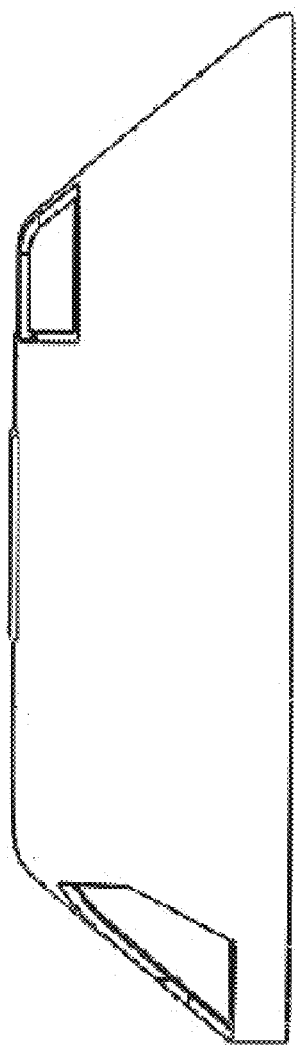
FIG. 30C is a side view of the front section of FIG. 29B.
Figure 30D:
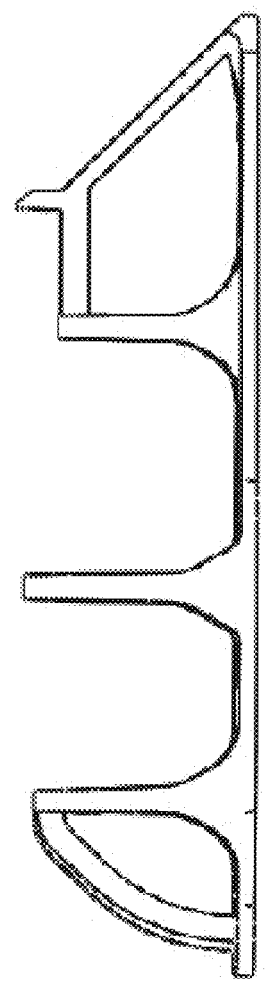
FIG. 30D is a side view of the pleated frame of FIG. 29B.

FIGS. 30A and 30B are side views of front section 402 and frame 404, respectively. Shell 434 of front section 402 can include upper and lower slots or openings extending therethrough for insertion of various strapping or fastening mechanisms. In some embodiments, shell 434 includes upper slot 418 and lower slot 420, each for accepting a strap or fastening mechanism that can be tied, clipped, and/or snapped together and/or attached around the cars or head of a wearer.

Figure 31A:
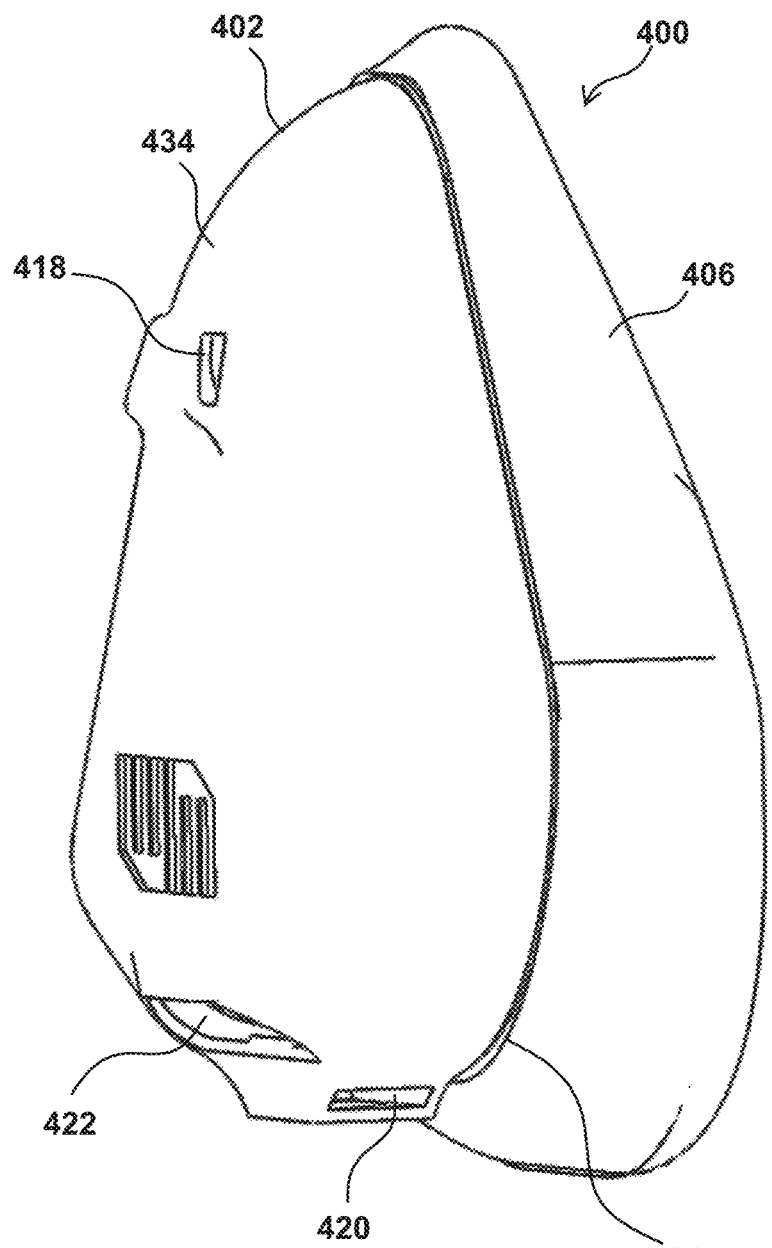
FIG. 31A is a perspective view of an assembled facemask.
Figure 31B:
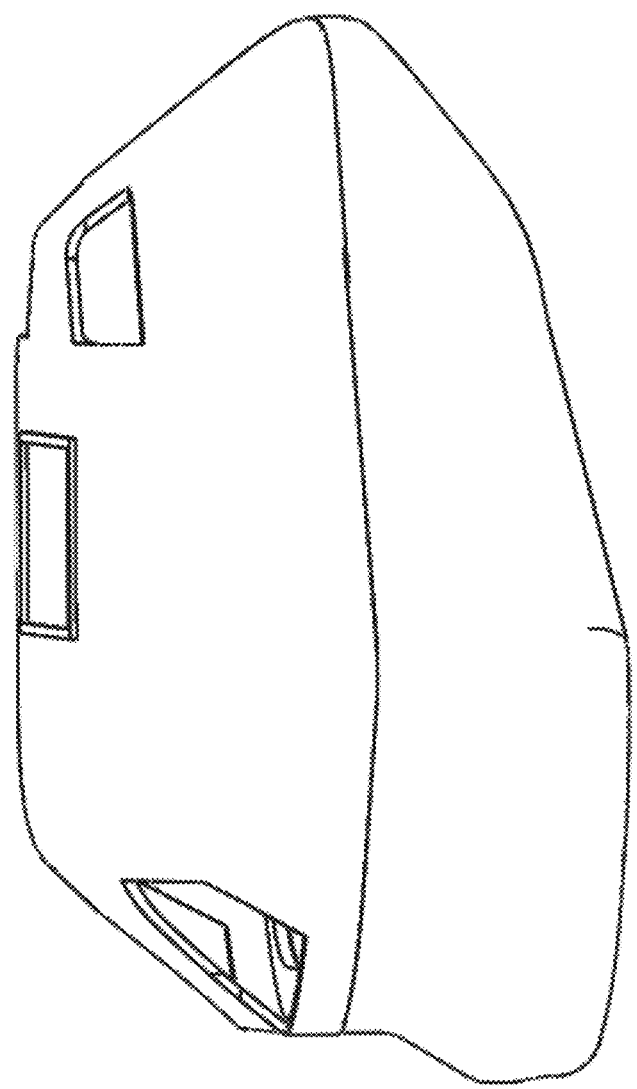
FIG. 31B is a side view of an assembled facemask.
Figure 32:
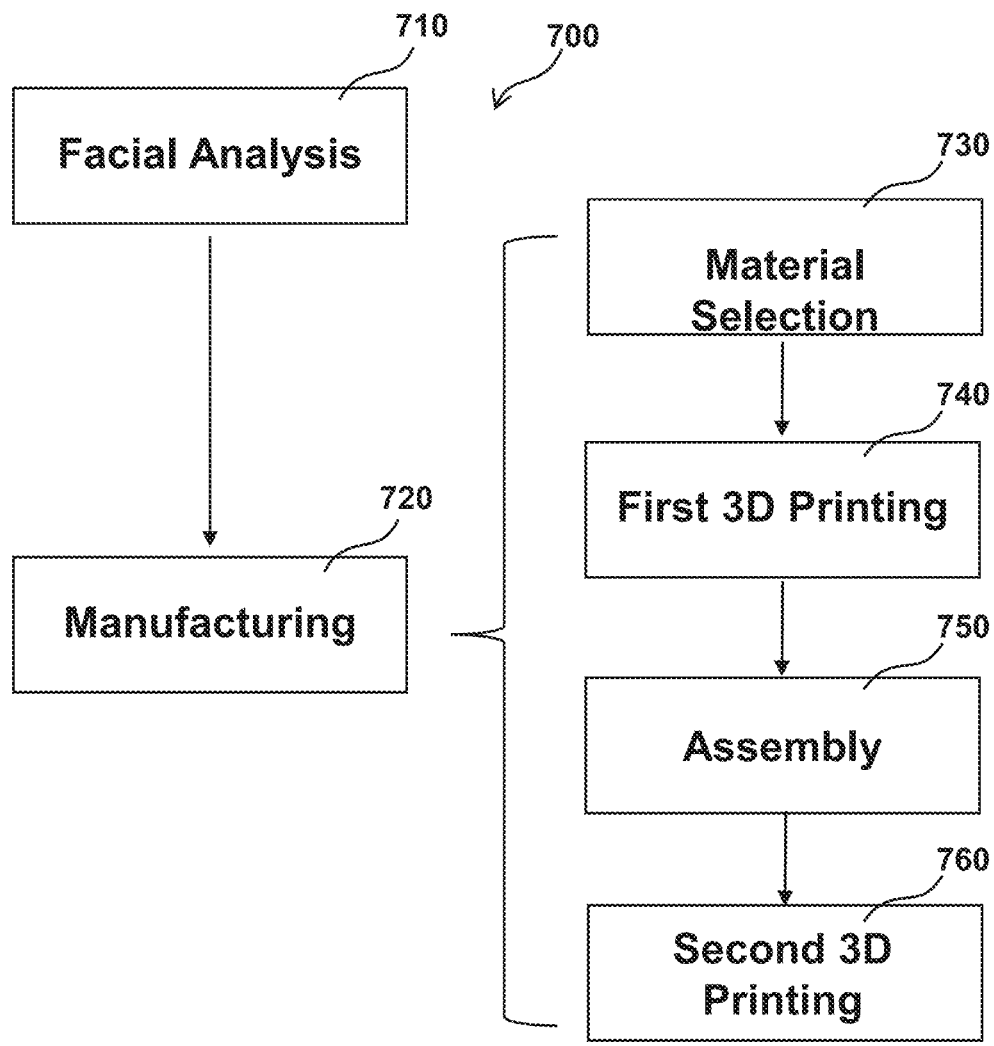
FIG. 32 is a flow chart illustrating a method for making a customized facemask via additive manufacturing.

FIG. 31A illustrates assembled facemask 400. When assembled, frame 404 is inserted into front section 402 and perimeter 438 of facial skirt 406 seals the facemask together. A filter material can be positioned between frame 404 and front section 402 before snapping or inserting the frame into the front section. In some embodiments, the filter material (not shown) is initially flat and becomes pleated as it conforms to horizontal sections 412a-d when pressed between frame 404 and front section 402. In some embodiments, the excess filter material is then cut away through a variety of common assembly processes, including, but not limited to, various shears, water-jet, laser cutting and/or die-cut approaches.

As further illustrated in FIG. 31A, shell 434 of front section 402 includes at least one venting structure 422.

Method for Making a Facemask with a Customized Facial Skirt

In some embodiments, front section 402, frame 404, and facial skirt 406 can each be manufactured as one continuous piece via additive manufacturing (3D printing). In other embodiments, front section 402 and frame 404 are manufactured as two separate pieces that can snap together around a piece of filter material. 3D printing of facemask 400 confers certain design features of the facemask that cannot be achieved via injection molding. Specifically, perimeter 436 with ridge 442 and/or crossmembers 410a-c of front section 402 cannot be manufactured via injection molding to be continuous with shell 434. Similarly, the various structures that make up the pleats of frame 404 including horizontal segments 412a-d, curved members 416a-c, bisecting members 428, and/or trisecting members 430a and 430b cannot be manufactured via injection molding to be continuous with one another and vertical frame 426. Instead, multiple pieces would need to be molded independently and assembled and attached via an adhesive or via a mechanical attachment, such as a fastener. Using 3D printing, particularly for front section 402, enables creation of features detailed above which cannot be manufactured within the limitations inherent to injection molding.

A method for additive manufacturing a soft facial skirt to the assembled mask using an inserted support structure is also disclosed. In some embodiments, the inserted support structure enables the printing to create an inward curvature section. In at least some embodiments, the support structure is ultimately removed before the mask is used.

A method for additive manufacturing facemask 400 can also include customizing facial skirt 406 to the unique facial topography of a specific wearer. Adjusting various properties of facial skirt 406 such as, but not limited to, its weight, length, width, depth, and/or the shape of outer perimeter 440 based on the distinct facial structure of the wearer, creates a facemask that optimally conforms to the wearer's face and provides a seal with the skin. A customized facial skirt can also maximize, or at least increase, wearer comfort. In some embodiments, front section 402 and frame 404 are scaled to a wearer's customized facial skirt.

In some embodiments, Facemask Additive Manufacturing Method 700 includes Facial Analysis 710 which is used to customize facial skirt 406 to fit the unique facial geometry of a specific wearer. Facial Analysis 710 includes compiling data related to the facial structure and geometry of the wearer using 3D modeling technologies. In some embodiments, facial images can be captured via a 3D scanner, triangulation scans from digital image scanners, or various grades of digital cameras or video cameras equipped with 2D or 3D reconstruction software. Multiple images or scans of the wearer's face are captured from various angles and positions to provide facial geometry, dimensions, characteristics, etc.

In some embodiments, Facial Analysis 710 can include various devices or systems for uploading, storing, sharing, analyzing, manipulating, and/or using facial image data. In some embodiments, the facial image data can be transmitted to software or a mobile-, cloud-, or online-based application(s) hosted on devices such as, but not limited to, a tablet, laptop, personal computer, and/or computing data system. Methods of data transmission can include, but are not limited to, Wi-Fi, radio frequencies, wired methods, and/or various LTE and 4G/5G networks.

In some embodiments, Facial Analysis 710 can utilize artificial intelligence or machine learning algorithms to compute, analyze, and/or optimize facial image data.

In some embodiments, the software or application of Facial Analysis 710 can provide a clean, noise-reduced rendering of the wearer's 3D facial surface.

The software or applications of Facial Analysis 710 can generate output, such as 3D modeling instructions, via algorithms and/or mathematical models for creating a facial skirt anatomically customized to the facial geometry of the wearer. The 3D model can then be downloaded to a 3D printer to print the mask using various materials, such as but not limited to elastomers.

Outputs including 3D modeling instructions can be used in Manufacturing Stage 720 of Facemask Additive Manufacturing Method 700 to generate facemask 400 including customized facial skirt 406.

Manufacturing Stage 720 includes Material Selection Stage 730 in which materials for printing front section 402, frame 404, and facial skirt 406 are selected. Facemask 400 including front section 402, frame 404, and facial skirt 406, or portions thereof, can be 3D printed from suitable materials. In some embodiments, facemask 400, or portions thereof, can be made from polyolefins such as, but not limited to, polyethylene (PE), polypropylene (PP), polytetrafluoroethylene (PTFE), and/or polyvinyl chloride (PVC). In some embodiments, facemask 400, or portions thereof, can be made from, silicones such as polydimethylsilane (PDMS). In some embodiments, facemask 400, or portions thereof, can be made from polyacylates such as, but not limited to, polymethyl methacrylate (PMMA). In some embodiments, facemask 400, or portions thereof, can be made from polyesters such as, but not limited to, polyethylene terephthalate (PET), Polylactic Acid (PLA), polyglycolic acid (PGA), and/or polydioxanone (PDO). In some embodiments, facemask 400, or portions thereof can be made from polyethers such as, but not limited to, polyether ether ketone (PEEK) and/or polyether sulfone (PES). In some embodiments, facemask 400, or portions thereof, can be made from polyamide (Nylon), polyurethane (PU), and/or polycaprolactone.

Various properties of facemask 400 can be modulated based on the material selected for 3D printing each component. Such properties include, but are not limited to, plasticity, flexibility, tensile strength, elasticity, durability, thickness, weight, and/or conformability.

In some embodiments frame 404 can be 3D printed from materials such that the resulting structures are flexible and durable and can withstand manipulation and/or impact. In some embodiments, frame 404 is made of thermal polyurethane (TPU), polyamide (nylon), polyurethane (PU), polyethylene (PE), polypropylene (PP), and/or polytetrafluoroethylene (PTFE).

In some embodiments, facial skirt 406, which conforms to the face of the wearer can be printed from materials that balance wearer comfort with structural/functional properties—thickness, elasticity, flexibility, coefficient of friction, etc.—that provide structural integrity such that the facial skirt conforms to the contours of the wearer's face and creates a seal with the skin. Tactile properties of facial skirt 406 such as smoothness and/or texture of outer perimeter 440 or any surface that contacts the wearer's skin can be adjusted at Material Selection Stage 730. In some preferred embodiments, facial skirt 406 can be made from a silicone, silicone-based materials, thermal polyurethanes (TPU) and/or synthetic rubbers.

In some embodiments, the plasticity and flexibility of facemask 400 can be increased with various plasticizers that promote durability of the material.

Following Material Selection Stage 730, First 3D Printing Stage 740 includes 3D printing front section 402 and frame 404 via 3D using modeling instructions provided to a 3D printing system.

In some embodiments, the modeling instructions for front section 402 and/or frame 404 allow for rapid production of each component. In some embodiments, spiral build/vase builds can be used to increase the production of the mask sections.

In Assembly Stage 750, a filter material can be positioned between 3D printed frame 404 and 3D printed front section 402 before snapping or inserting the frame into the front section. In some embodiments, vertical frame 426 of frame 404 snaps underneath ridge 442 of front section 402. In some embodiments, the filter material is initially flat and becomes pleated as it conforms to horizontal sections 412a-d when pressed between frame 404 and front section 402. Once frame 404 and front section 402 are attached, excess filter material can be cut away, if necessary.

In some embodiments, a secondary tool is used to initially press the filter material over crossmembers 410a-c of front section 402 prior to insertion of pleated frame 404.

Following Assembly Stage 750, during Second 3D Printing Stage 760, the partially assembled facemask can be placed or cradled on the 3D printer bed with crossmembers 414a-d of frame 404 exposed. In some embodiments, facial skirt 406 can then be 3D printed directly to the partially assembled facemask as pre-designed. In some embodiments, facial skirt 406 can be 3D printed directly to the partially assembled facemask using the 3D modeling instructions generated during Facial Analysis 710. This effectively seals the facemask together and builds the facial skirt in upwardly extending layers to create a fully assembled facemask 400 with facial skirt 406 anatomically customized to the facial geometry of the wearer.

Facemask Additive Manufacturing Method 700 can be scaled to produce facemasks for both children and adults.

In some embodiments, Manufacturing Stage 720 can be performed without customization of the facial skirt.

Figure 34A:
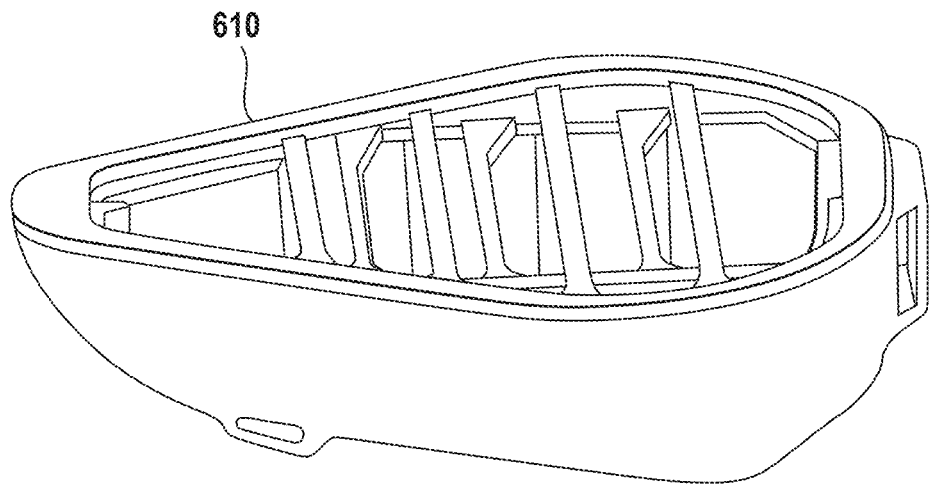
Figure 34B:
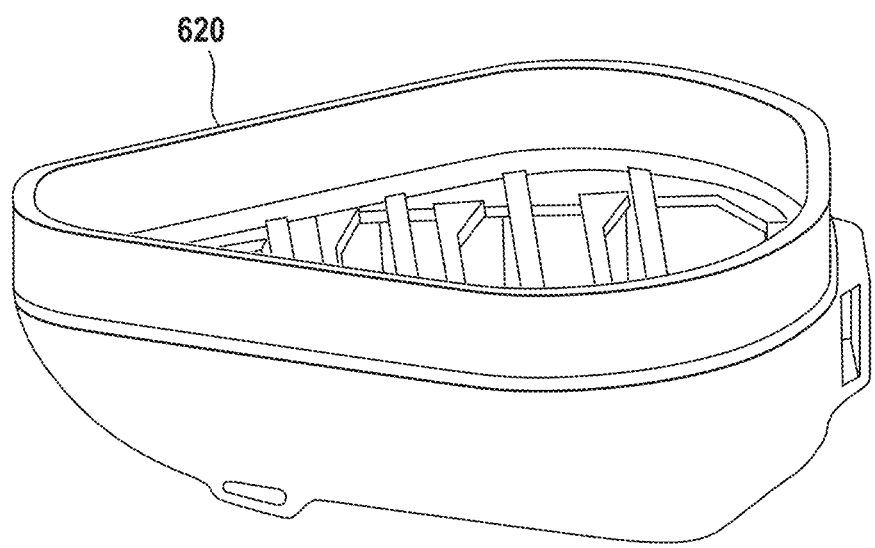
FIG. 34B is a perspective view of the first section and pleated frame assembled with the filter in between with an initial silicone facial skirt section printed atop the assembly.
Figure 34C:
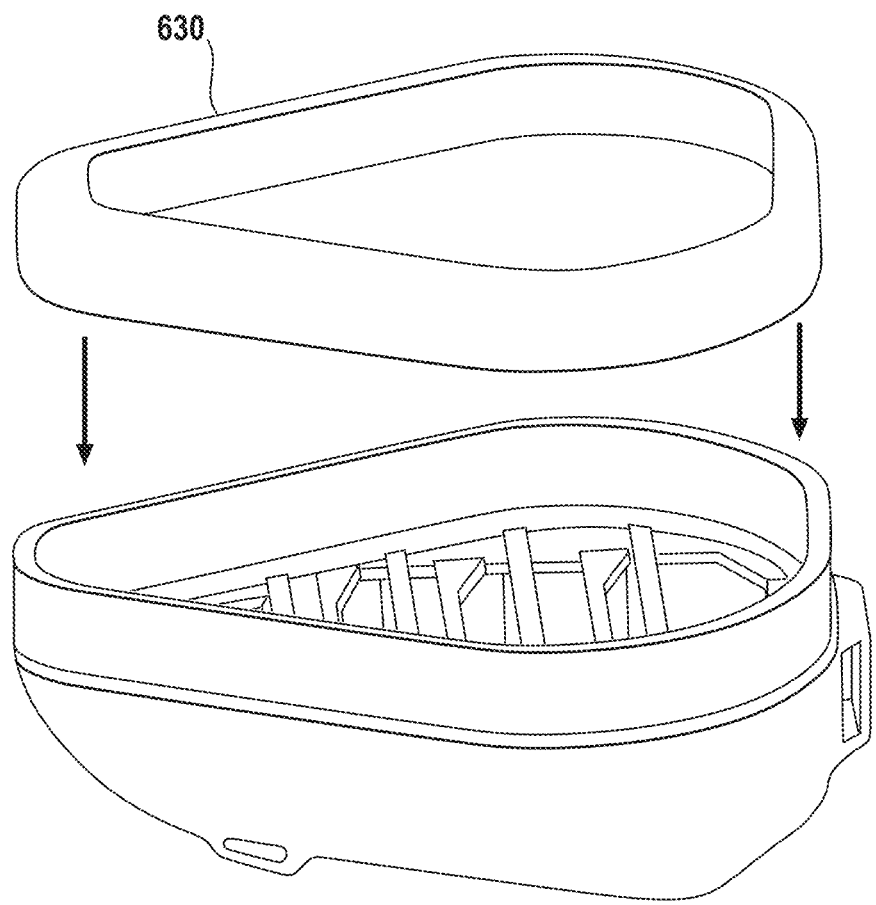
FIG. 34C is a perspective view of a support structure unit being lowered inside the assembly shown in FIG. 34B.
Figure 34D:
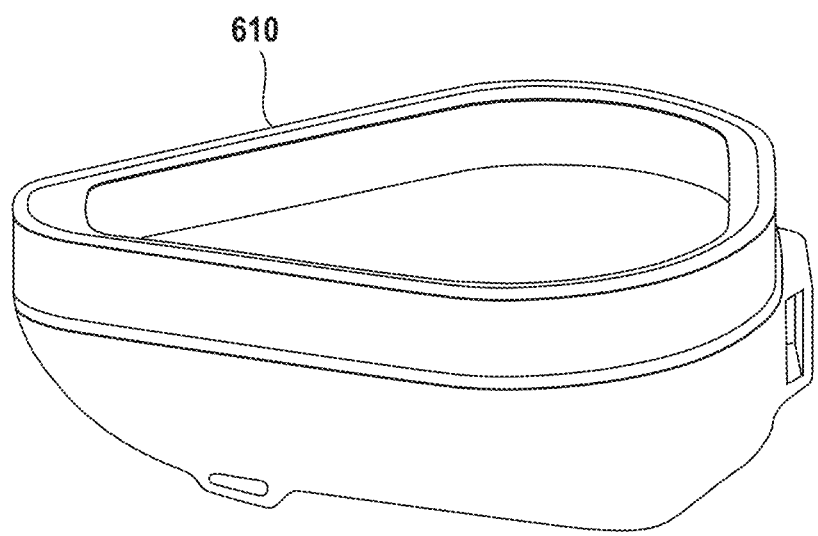
FIG. 34D is a perspective view of a support structure unit resting atop the initially printed silicone base internally.
Figure 34E:
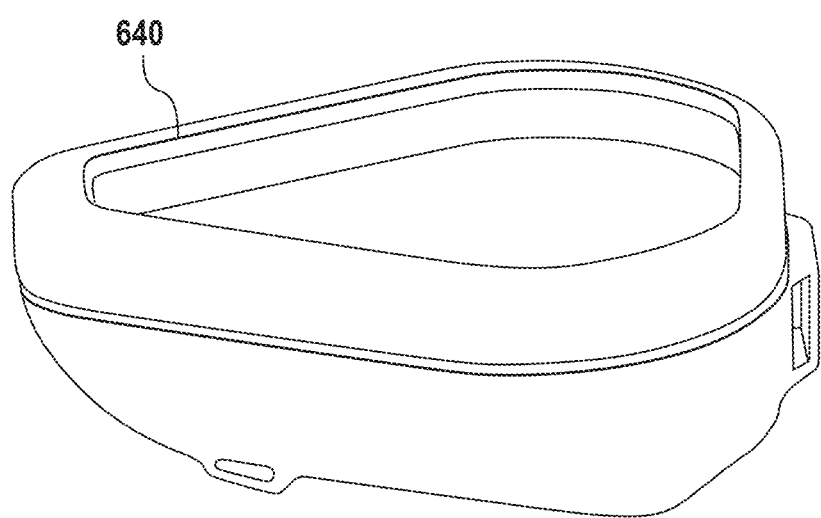
FIG. 34E is a perspective view of a silicone skirt continuing to be printed in an inward curvature and resting atop the internal support structure.

FIG. 34A shows assembled front section 610. In some embodiments, initial facial skirt 620 is printed on assembled front section 610. In some embodiments, initial facial skirt 620 is made of silicone. In some embodiments, a removable printing support structure 630 is placed inside assembled front section 610. An inward curving section 640 can be printed on top of initial facial skirt 620 using removable printing support structure 630. In some embodiments, inward curving section 640 is made of silicone. In some embodiments, initial facial skirt 620 is 3D printed independent of the mask front section and bonded afterwards with an adhesive. In some embodiments, initial facial skirt 620 is created via injection molding and bonded afterwards with an adhesive.

Strap System

Figure 33A:
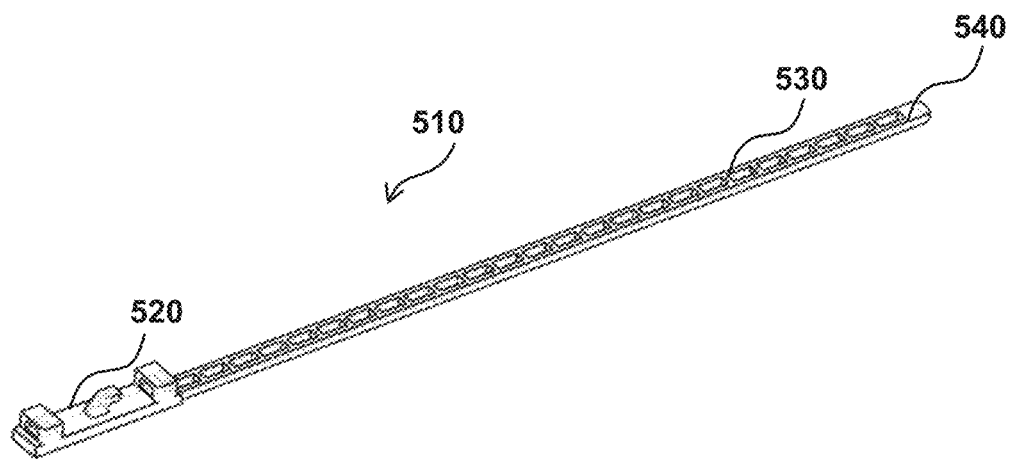
FIG. 33A is a perspective view of a first section of a strap system.
Figure 33B:
FIG. 33B is a top view of a first section of a strap system.
Figure 33C:
FIG. 33C is a perspective view of a first section of a strap system interacting with a second section.

FIG. 33A shows first section 510 of strap system 500. First section 510 can include elastic strap 540 with open slots 530 configured to connect with locking segment 520. In some embodiments, locking segment 520 includes locking tab 550 and strap retaining slots 560.

In some embodiments, strap system 500 can be created via additive manufacturing. In some embodiments, this allows for easy down-sizing of the mask system as well as bonding two dissimilar polymers together without the need for adhesive bond(s). For example, in some embodiments, elastic strap 540 can first be printed and then a different material, such as a non-elastic polymer can be used to directly print locking segment 520 onto elastic strap 540.

Figure 35:
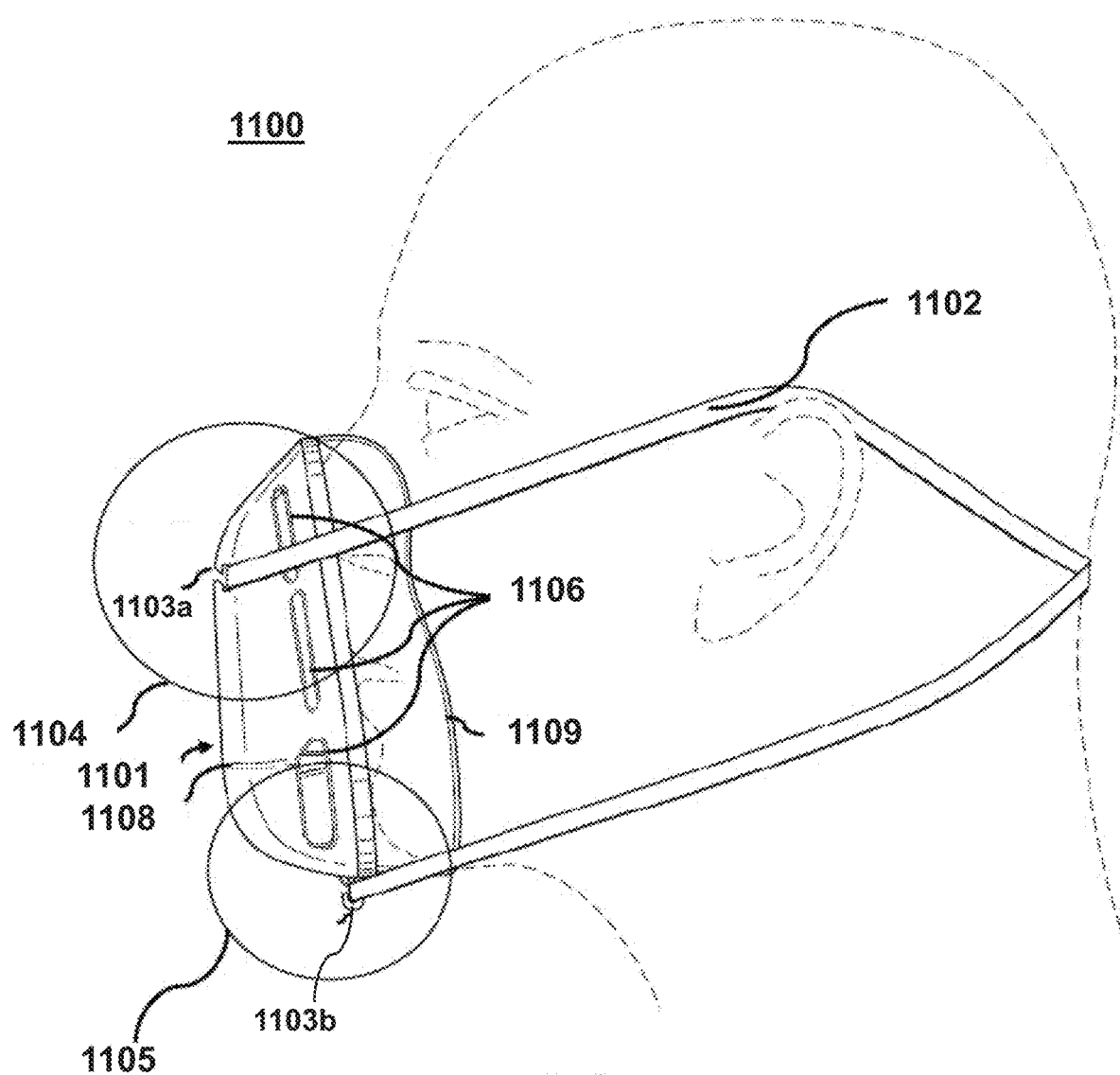
FIG. 35 is a side view of a mask assembly having a single, continuous strap assembly.

Elastic strap 540 is shown to be rectangular, but other shapes and/or configurations are possible Continuous Strap Assembly FIG. 35 is a side view of mask assembly 1100 having continuous strap 1102. Strap 1102 can be made of, among other things, various straps, cords, tubing, and/or O-ring stock. In some embodiments, strap 1102 is elastic.

In the illustrated embodiment, snap-in receivers 103 are present in nasal area 1104 of mask 1101 and beneath chin area 1105. In FIG. 35, two different snap-in receivers 103 are shown. Snap-in receiver 1103b, located beneath the chin, resembles a hook receiving continuous strap 1102. Snap-in receiver 1103a, located in the nasal section, shows a valley defined by two extrusions that receives the upper part of continuous strap 1102. In addition to hooks and extrusions, snap-in receivers 103 can resemble, among other things, voids, divets, sets of ridges, and other suitable moldings of mask 1101 that can accommodate straps.

Snap-in receivers have many advantages, such as allowing a wearer to replace strap 1102 on the fly. For example, if strap 1102 were to break and a wearer did not have access to a proper replacement strap, the wearer could utilize a wide variety of suitable materials such as his or her own shoelace for an immediate field repair. This feature could be lifesaving should such an immediate field repair be necessary in an infectious or hazardous air environment.

In at least some embodiments, vents 1106 are configured to vent exhaled $CO_2$ and $H_2O$-laden air sideways and/or backwards towards a wearer's face and neck. In some embodiments, vents 1106 do not allow exhaled air to be channeled downward. In some embodiments, vents have lips configured to direct the flow of exhaled air.

In some embodiments, mask 1101 contains facial skirt 1109. In some embodiments, skirt 1109 has elastic properties. In at least some embodiments, facial skirt 1109 can be made of a soft silicone or other materials that conform to a wearer's face and/or materials capable of creating an airtight seal.

In at least some embodiments, front section 1108 of mask 1101 is constructed of a hard plastic. In other embodiments, other materials, including but not limited to rubber, silicone, metals, other thin plastics or composite materials can be used to construct section 1108. In certain embodiments, front section 1108 has unrestricted venting that is large enough to improve the speech clarity of a wearer when compared to traditional masks.

Figure 36:
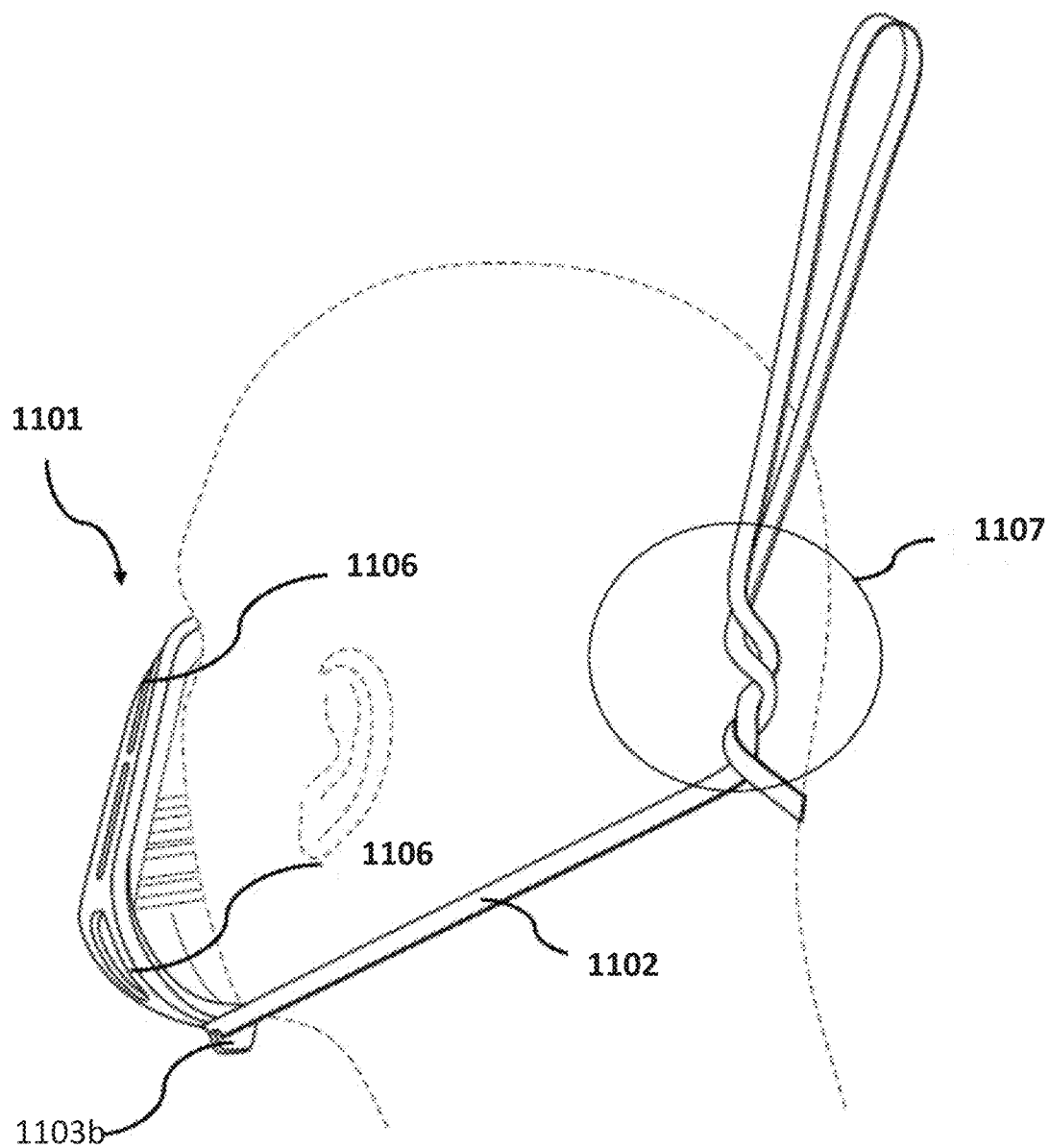
FIG. 36 is a rear perspective view of the mask assembly of FIG. 35 wherein the strap is being adjusted.

FIG. 36 is a rear perspective view of mask assembly 1100 of FIG. 35 showing strap 1102 being adjusted. In some single strap embodiments, such as the one shown in FIG. 36, strap 1102 can be twisted to tighten mask assembly 1100 on the face of a wearer.

Twisting strap 1102 in area 1107 helps conform mask 1101 to the face of the wearer as it increases the seal created by the mask. Twisting strap 1102 in the way illustrated in FIG. 36, also raises strap 1102 above the top ear joint of the wear; thus reducing pressure on the ear and increasing the wear's comfort. As evident in FIG. 37, twisting strap 1102 can change the angle of applied pressure between strap 1102 crossing over the ear and strap 1102 crossing behind the head.

Once enough twists have been established to create a secure seal, strap 1102 can be re-inserted into snap-in receivers 1103a and 1103b. In at least some embodiments, no further adjustment to strap 1102 need to be made to use and remove mask assembly 1100. This is in sharp contrast to traditional elastomeric masks which require the release of at least the two lower straps in order to remove the mask and-the previous tension must then be re-established upon remounting the mask.

Another advantage of single strap embodiments is their self-adjusting nature which do not require the manipulation of multiple straps to conform to the head of a wearer. Embodiments having a single, twistable strap 1102 do not require buckles, tri-glides, plastic strap adjusters, cord-locks and other adjustable elements to change the tensioning of strap 1102. Individual strap adjustment is also not necessary to center the mask on the face; strap 1102 slides within the snap-in receivers 103 so there is little, if any, side-pull generated by them. In addition, single continuous strap 1102 is inherently easy to clean; especially as compared to traditional adjusters such as buckles, tri-glides, plastic strap adjusters and cord-locks.

Figure 37:
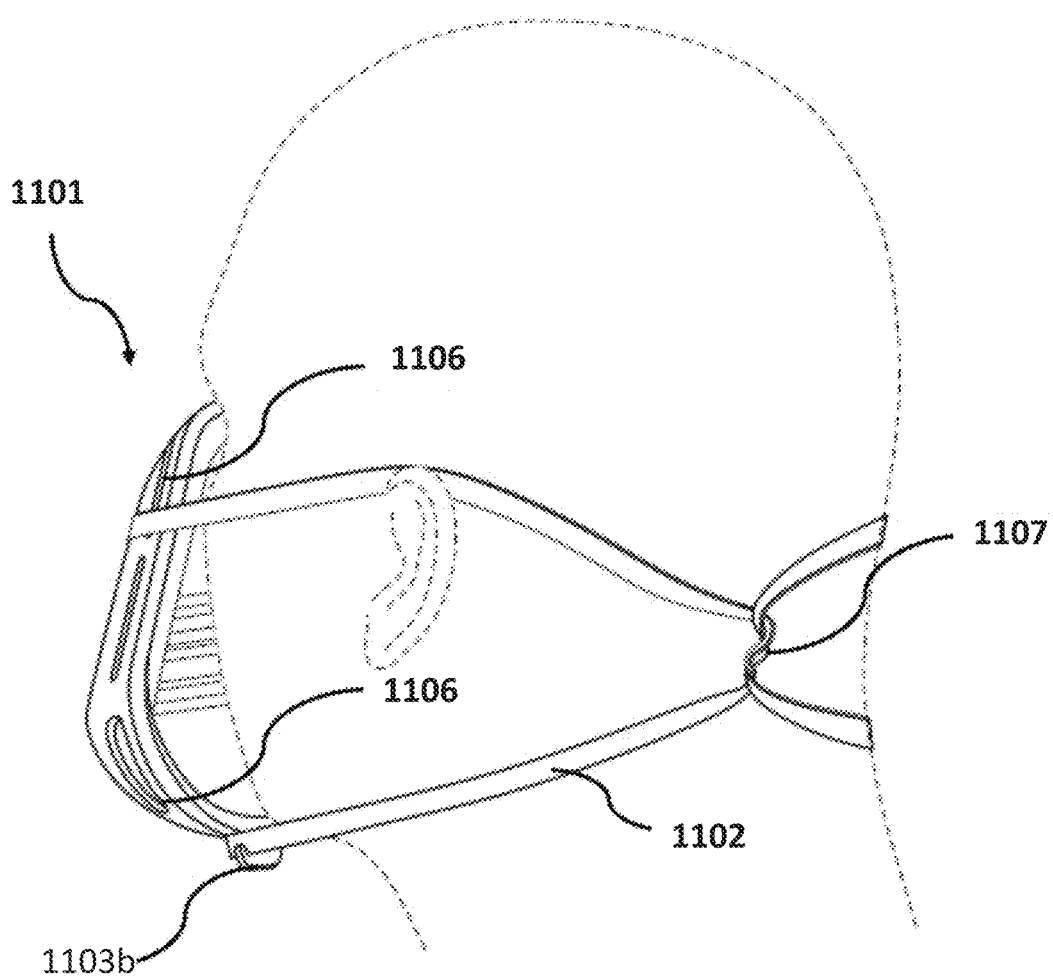
FIG. 37 is a rear perspective view of the mask assembly of FIG. 35 wherein the strap has been adjusted.

FIG. 37 is a rear perspective view of mask assembly 1100 of FIG. 35 according to some embodiments. Strap 1102 is shown re-inserted into snap-in receivers 1103a (not shown) and 1103b. In at least some embodiments, strap 1102 self-aligns within snap-in receivers 1103a and 1103b and crosses behind the head to produce a snug, self-centering fit.

It should be noted that in some embodiments (not shown) mask assembly 1100 can utilize two straps, a top strap configured to slide into the snap-in receiver 1103a which allows the top strap to slide back and forth to balance the position of any clips and/or buckles (not shown) and a bottom strap configured to slide in snap-in receiver 1103b. In some embodiments, snap-in receivers allow the straps to be easily removed. Clips and/or buckles can be used to help stabilize the upper and/or lower straps. Various embodiments of straps can be configured to fit with a mask design given the placement of various snap voids or receivers. In some embodiments, open-ended straps can be tied behind the ears or the head or secured and adjusted.

Pleated Filter

Figure 38A:
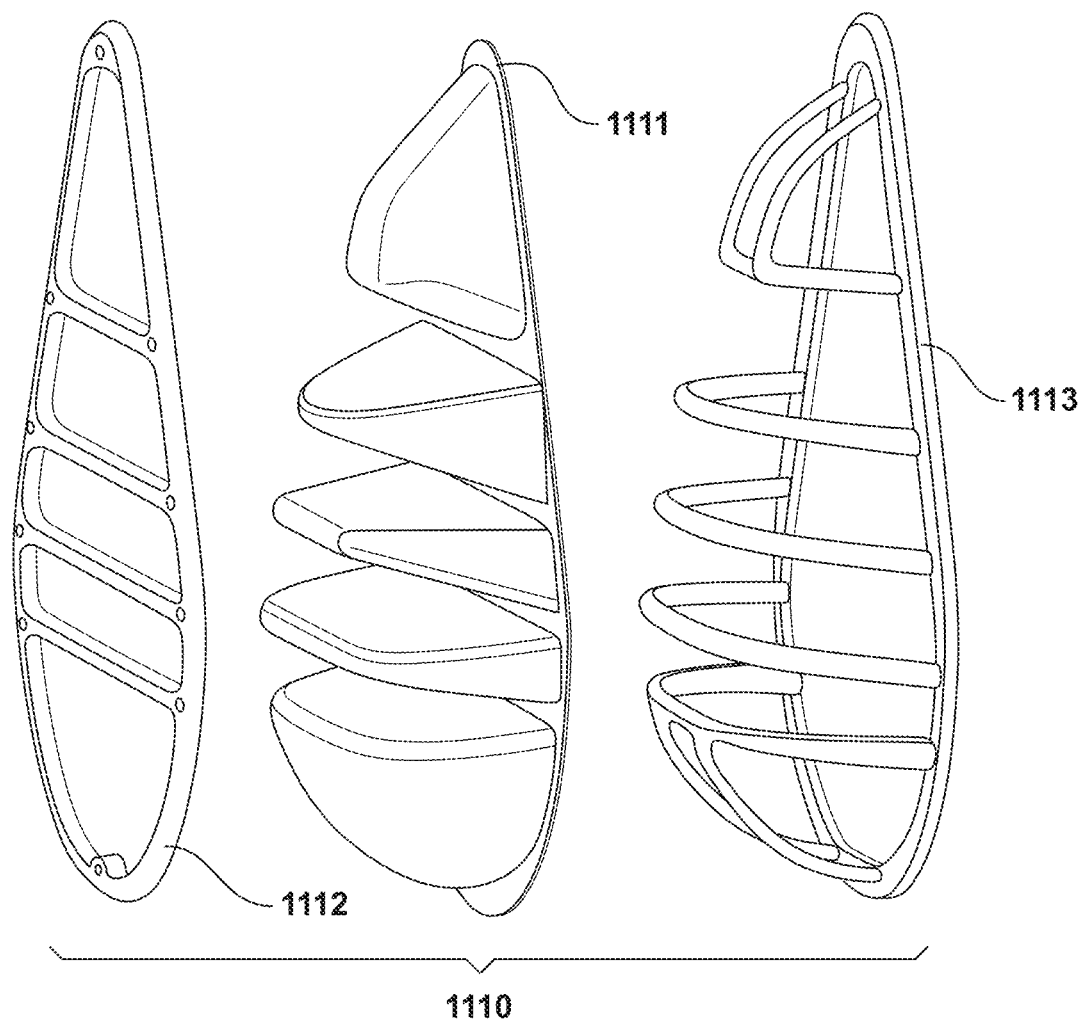
FIG. 38A is a side exploded perspective view of a pleated filter insert assembly having a pleated filter, a front frame, and a rear frame.
Figure 39:
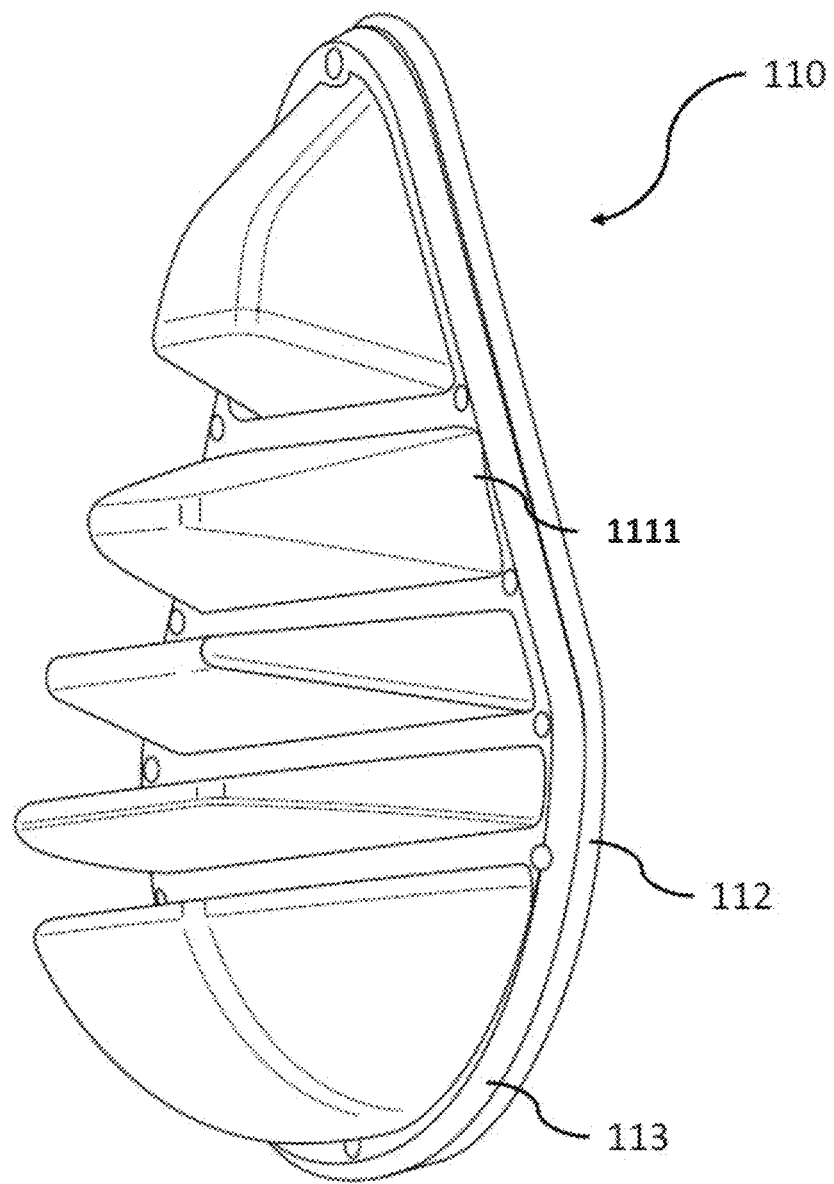
FIG. 39 is a side perspective view of the filter insert assembly from FIG. 38A assembled.

FIG. 38A is an exploded perspective view of pleated filter insert assembly 1110. Pleated filter insert assembly 1110 can comprises pleated filter 1111, front frame 1112, and rear frame 1113. In the shown embodiment, rear frame 1113 is configured to receive front frame 1112, with pleated filter 1111 sandwiched between. FIG. 39 is a side perspective view of filter insert assembly 1110 from FIG. 38A fully assembled.

As seen in FIG. 38A, front frame 1112, and rear frame 1113 can contain cross members with those in rear frame 1113 being elevated and curved to cause pleated filter 1111 to assume a curved, pleated shape. This pleated shape increases the breathable surface area as well as increases the angularity of the oblique angle of attack experienced by any inhaled particulate and/or pathogen.

In some embodiments pleated filter 1111 has a single active layer. In other embodiments pleated filter 1111 has multiple active layers. In certain embodiments, the active material contains silver which acts as a biocidal element. In some embodiments, the active material is silver particles. In some embodiments, the active material is silver nanoparticles. In other or the same embodiments pleated filter 1111 can be optimized for the capture of non-infectious particles such as dust or air pollution particulates.

In some embodiments, filter insert assembly 1110 is permanently affixed to mask 1101 (not shown).

Figure 38B:
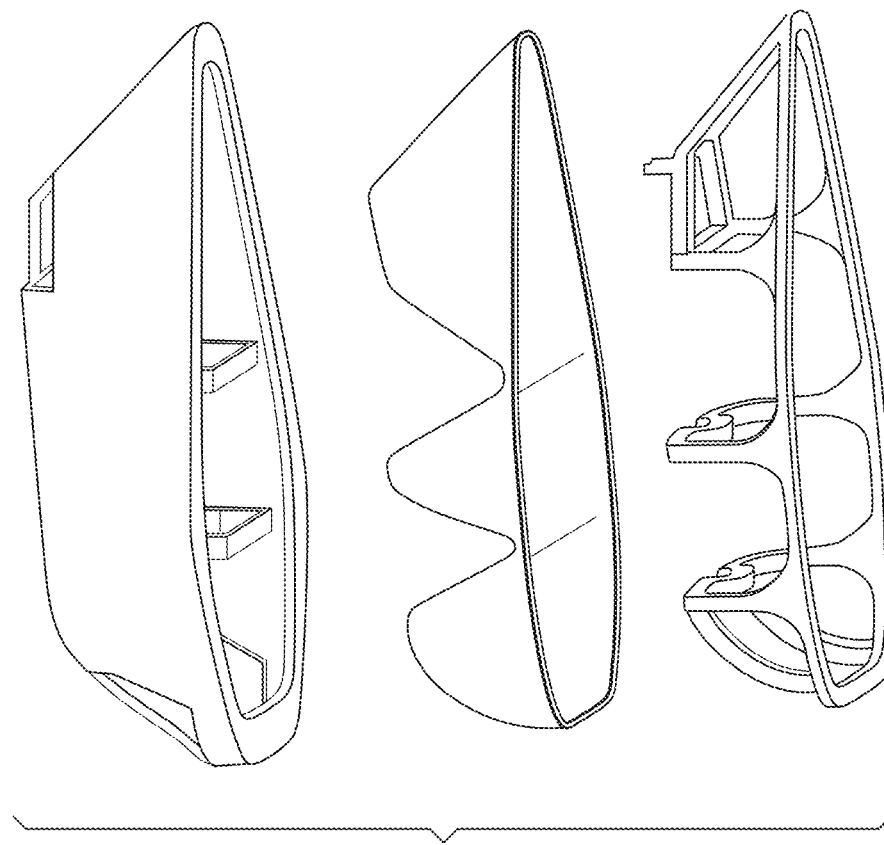
FIG. 38B is a side exploded perspective view of another embodiment of a pleated filter insert assembly having a pleated filter, a front frame, and a rear frame.

In some embodiments, such as shown in FIG. 38B, a separate front frame is not needed for the filter insert assembly and instead the front piece of the mask assembly operates as the front frame.

In some embodiments, pleated filter insert frame can be curved and/or S-shaped to capture airborne particles and provide biocidal protection from airborne pathogens. The "s-shaped" structure of pleated filter insert assembly 1110 positions pleated filter 1111 close to the nose and mouth. This is important when silver is used for biocidal protection as silver needs moisture to provide such protection.

In some embodiments, filter insert assembly 1110 can be flat. Flat designs allow for smaller packaging.

In some embodiments, filter insert assembly 1110 is held in mask 1101 by an elastic ridge and a stopper ridge. In some embodiments, filter insert assembly 1110 is permanently mounted within mask 1100. In certain embodiments, stopper extrusions keep the filter insert assembly 1110 pressed back into skirt 1109. In some embodiments, stopper extrusions can keep filter insert assembly 1110 from contacting the front section of the mask.

In at least some embodiments, a pleated filter contains at least 10% more surface area than a flat filter. In at least some embodiments, a pleated filter contains at least 20% more surface area than a flat filter. In at least some embodiments, a pleated filter contains at least 30% more surface area than a flat filter. In at least some embodiments, a pleated filter contains at least 40% more surface area than a flat filter. In at least some embodiments, a pleated filter contains at least 50% more surface area than a flat filter. In at least some embodiments, a pleated filter contains at least 60% more surface area than a flat filter. In at least some embodiments, a pleated filter contains at least 70% more surface area than a flat filter. In at least some embodiments, a pleated filter contains at least 80% more surface area than a flat filter. In at least some embodiments, a pleated filter contains at least 90% more surface area than a flat filter. In at least some embodiments, a pleated filter contains at least 100% more surface area than a flat filter.

In at least some embodiments, a pleated filter contains at least 10% more surface area than a dual canister filter. In at least some embodiments, a pleated filter contains at least 20% more surface area than a flat filter. In at least some embodiments, a pleated filter contains at least 30% more surface area than a dual canister filter. In at least some embodiments, a pleated filter contains at least 40% more surface area than a dual canister filter. In at least some embodiments, a pleated filter contains at least 50% more surface area than a dual canister filter. In at least some embodiments, a pleated filter contains at least 60% more surface area than a dual canister filter. In at least some embodiments, a pleated filter contains at least 70% more surface area than a dual canister filter. In at least some embodiments, a pleated filter contains at least 80% more surface area than a dual canister filter. In at least some embodiments, a pleated filter contains at least 90% more surface area than a dual canister filter. In at least some embodiments, a pleated filter contains at least 100% more surface area than a dual canister filter.

Mask Configured for Bi-Directional Airflow Towards the Back and/or Sides of a Wearer Existing elastomeric half-face masks require one-way check valves—generally elastic diaphragms mounted directly in front of the mouth—to enable exhalations to vent. Inhalations and exhalations are each mono-directional. Exhaled air above the exhaust vent is thus trapped above it, which prevents nasal breathing primarily due to the build-up of $CO_2$. In addition, particulates and pathogens captured by the filter material migrate through that filter material with every inhalation as the exhalation—which would push them outwards—goes out instead of thru the diaphragm vent.

In some embodiments, facemask assembly 1100 is configured to reduce, if not completely prevent, forward facing air inhalations and exhalations. Vents 1106 can be channeled to create oblique airflow patterns over a filter insert. In embodiments having pleated filter insert(s), these channels can be configured to coincide with filter pleats.

Figure 40A:
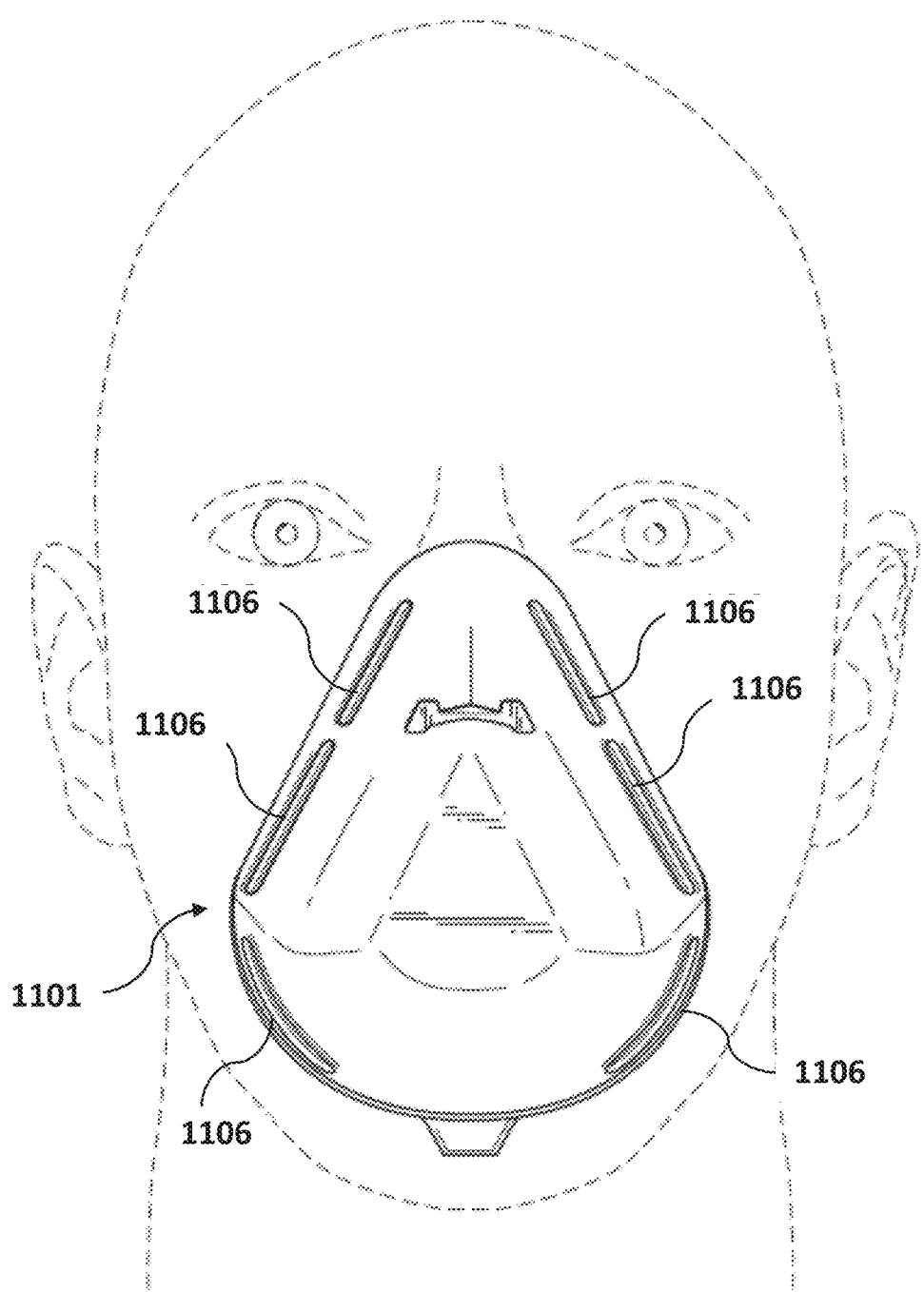
FIG. 40A is a front view of the mask assembly of FIG. 35 with the continuous strap removed for clarity.
Figure 40B:
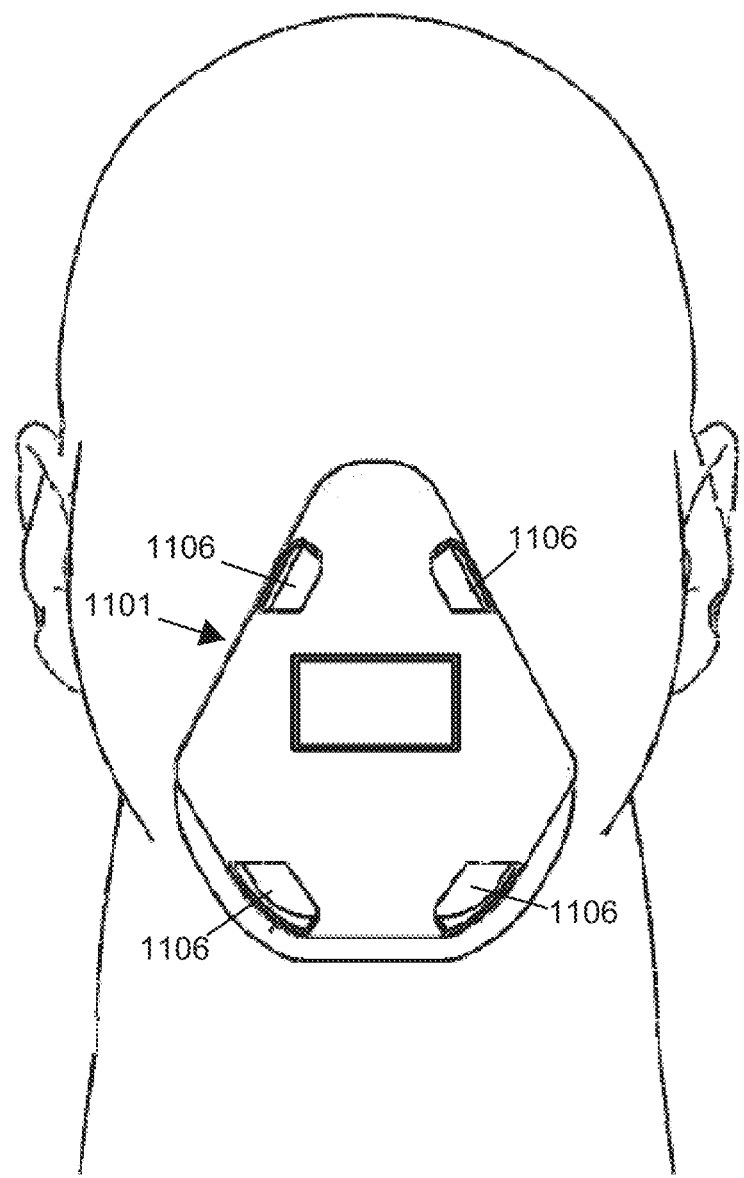
FIG. 40B is a front view of another embodiment of a mask assembly with the continuous strap removed for clarity.

FIG. 40A is a front view of mask assembly 1100 with strap(s) 1102 removed for clarity. In FIG. 40A there is no direct access to the internal filter (such as filter assembly 1110 from FIGS. 38A and 39) from the frontal flow of air on to the mask surface, and the exhaled air is vented sideways and/or backwards relative to the plane of a wearer's face through vents 1106. In some preferred embodiments, vents are arranged symmetrically around mask 1101. In some embodiments, such as the ones shown in FIG. 40B and FIG. 41B, mask 1101 includes four vents 1106.

In some embodiments, vents 1106 are configured to allows the escape of exhaled heat, moisture and $CO_2$. In certain embodiments, vents 1106 are sufficiently large enough such that a wearer can be heard more clearly. In some embodiments, vents 1106 force exhaled air and $CO_2$ off to the sides of a wearer's face, as this is often accomplished by placing vents 1106 near the upper most sides of mask 1101 where exhaled air tends to migrate. The sideways and backwards venting of exhalations is of particular importance when the wearer of a mask is ill to protect those in front. Vents can be configured to aid in reducing frontal contact of inhaled particles onto the filter.

In some embodiments, vents 1106 placed above the nostrils of the wearer support improved nasal breathability over conventional masks and respirators and accentuates the oblique angle air flow that supports greater capture of air-borne elements within the surface of the filter.

In some embodiments, the bi-directional airflow design of the presently disclosed mask, reduces the likelihood of particulates and pathogens migrating through the filter. In at least some embodiments, no air can be trapped within the mask as the uppermost vents are above the wearers' nostrils.

Figure 41A:
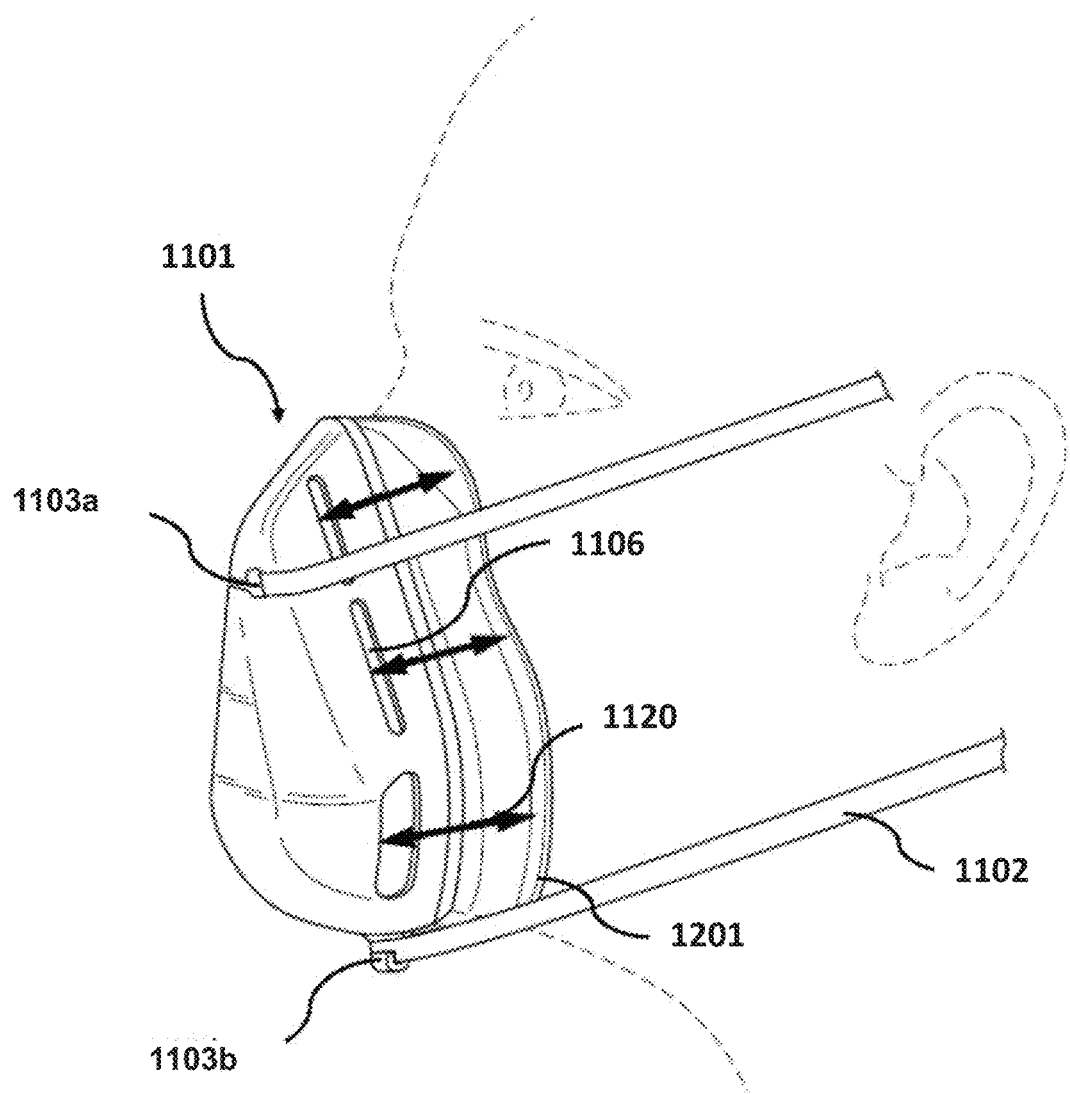
FIG. 41A is a side view of the mask assembly of FIG. 35 indicating bi-directional airflow.
Figure 41B:
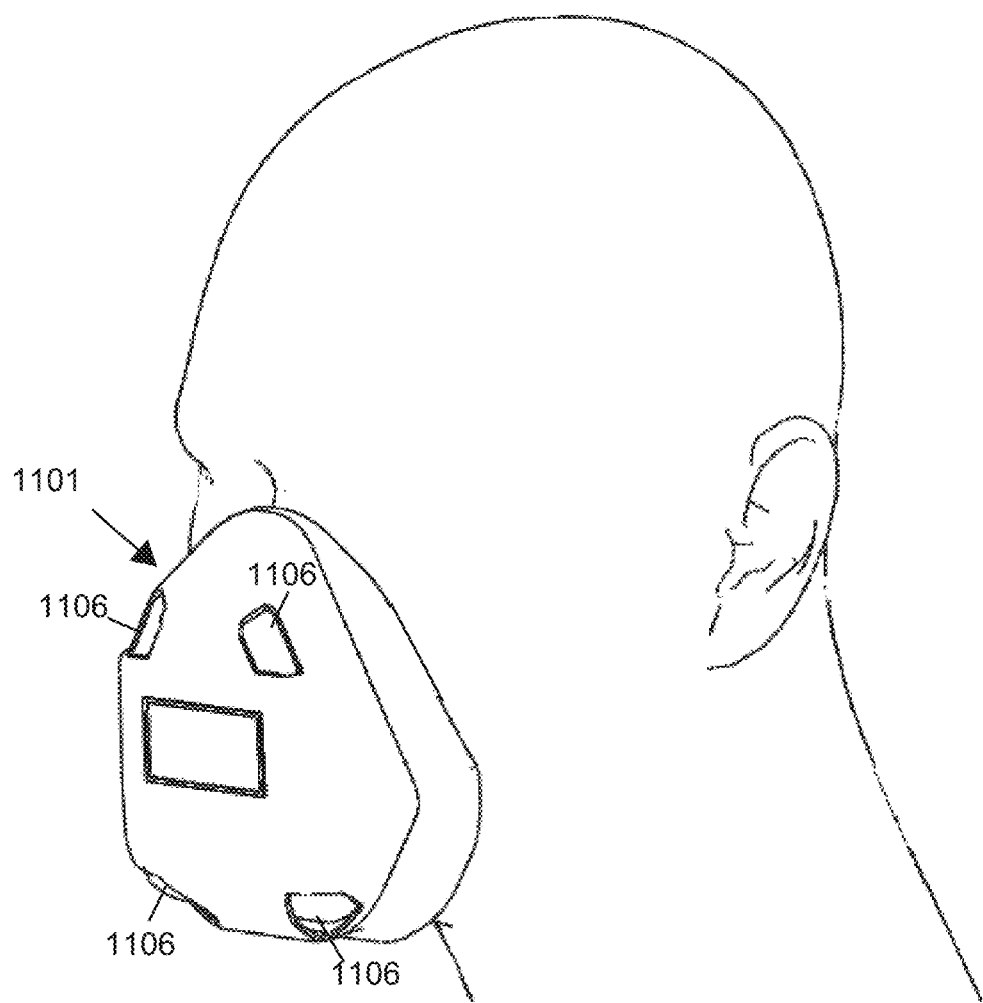
FIG. 41B is a side view of another embodiment of a mask assembly.

FIG. 41A is a side view of the side of mask assembly 1100, showing the air vents 1106, along with the inward and rearward flow of air shown in arrows 1120. In FIG. 41A facemask section 1201 is shown. In some embodiments, facemask section 1201 has elastic properties to conform to the face.

In at least some embodiments, sections of the mask are created with silicone, rubber, or other comfort-inducing materials such as elastomers. These materials help a user wear a mask for long period without discomfort or worrying about transmission/reception of infections.

In some embodiments, the entire mask assembly 1100 can be boiled/autoclaved and is reusable. In some embodiments, mask assembly 1100 can be cleaned by chemical disinfectant methods. Pleated filter 1111 can be designed to be boiled or autoclaved. In some embodiments, strap 1102 can be boiled and/or autoclaved. In certain embodiments, strap 1102 does not need to be disassembled from mask 1101 before being boiled and/or autoclaved. In some embodiments, the entire mask assembly can be cleaned and/or boiled without disassembling it. In some embodiments, pleated filter 1111 is disposable.

In some embodiments, mask assembly 1100 can withstand sterilization temperatures in the inclusive range of 100-132° C. In some embodiments, mask assembly 1100 can withstand sterilization temperatures in the inclusive range of 100-160° C.

In some embodiments, mask assembly 1100 can be autoclaved at 121° C. In some embodiments, mask assembly 1100 can be autoclaved at 132° C.

In at least some embodiments, a pleated filter interacts with a series of vents. In at least some of such embodiments, the mask offers double the inhalation and exhalation venting of a comparable dual canister filter mask.

In at least some embodiments, a mask system allows for particles exhaled by a wearer to strike a pleated filter at an oblique angle. In the event that a wearer coughs or sneezes, thus inducing a high-pressure zone preceding the filter in the mask, the filter captures particles and vents air backwards away from individuals the wearer may be facing or interacting with.

In at least some embodiments, inhalation and exhalation pressures are inherently close to identical within a mask system. Such embodiments offer advantages such as retarding the migration of particulates and pathogens through a filter system.

Temperature Logging Display

According to some embodiments, a respirator facemask can contain a visible display that indicates how many times the facemask has been sterilized. In some embodiments, the display can indicate the number of times the facemask reached or exceeded a sterilization temperature, maintained that temperature for a complete sterilization cycle, and returned to ambient temperature. In some embodiments the temperature reached and maintained during the sterilization cycle is that of boiling water (i.e.: 100° C./212° F.). In some embodiments, temperatures other than the temperature of boiling water are specified. In some embodiments, the visible display can indicate the number of times the facemask reached or exceeded autoclaving temperatures, maintained autoclaving temperatures during an autoclave sterilization cycle, and returned to ambient temperature. In some embodiments, the autoclave steam-sterilization temperature reached and maintained during the autoclave cycle is between and inclusive of 121° C. or 132° C. In certain embodiments, this visible display will log the aforementioned temperature variations up to the point that a mask assembly reaches a predetermined end-of-use threshold. In some embodiments, the display is numerical. In other embodiments the display is segmented. In other embodiments, the display changes color, or is monochrome going from white-to-black for example, to indicate having reached the end-of-use threshold. In some embodiments, the numerical display changes color or becomes monochrome to obscure or shroud the numbers of the display when the facemask reaches an end-of-use threshold. In some embodiments, the visible display is circular.

In some embodiments, the visible display can count up, indicating the number of sterilization cycles that have been completed.

In some embodiments, the visible display can count down, indicating the number of sterilization cycles remaining.

In some embodiments, the display can be a three segmented barrel rotary design. In some embodiments, the display can be a two segmented split-flap display.

In some embodiments, the display can include three flat concentric rings with the outer ring revolving one complete cycle for every single incremental movement of the inner middle ring. In some embodiments, the outer ring can display combined numeric values counting backwards or forwards. In some embodiments, the inner third ring contains a colored shroud that can obscure double zeros indicating end of life.

The power for such displays can be supplied via a non-rechargeable battery, such as a nuclear or chemical battery, a rechargeable battery whose power is refreshed via a radio frequency-based charger or other wireless charging methods, or thermal-to-mechanical power converters such as bi-metal converters, thermoelectric generator, or other forms of converting thermal energy to mechanical energy. In some embodiments, a respiratory facemask can be configured to supply power to a temperature logging display by harvesting energy from the motion of the facemask wearer. In some embodiments, an energy harvesting system utilizes thin sheets of black phosphorus. In some embodiments, an energy harvesting system utilizes a magnet, coil, diode, and capacitor. In at least some embodiments, the electronic components of a facemask system are sealed within the facemask system. In some embodiments, the power source is surrounded by a temperature insulating sealant.

A facemask assembly as described at least within U.S. Pat. No. 9,457,207 has a design, and elements, which can handle temperatures within common autoclaving processes as well as simply being boiled in water in order to be fully sterilized. The '207 patent is incorporated herein by reference. In some embodiments, methods disclosed within the '207 patent deal with the first of the above issues. Furthermore, the proposed mask system according to some embodiments requires no disassembly/re-assembly for purposes of achieving a fully-sterilized state, resolving the second of the above issues.

At least some of the embodiments described herein provide a solution to the third of the above issues, namely, the qualification or quantification of when such a mask requires disposal.

Figure 42:
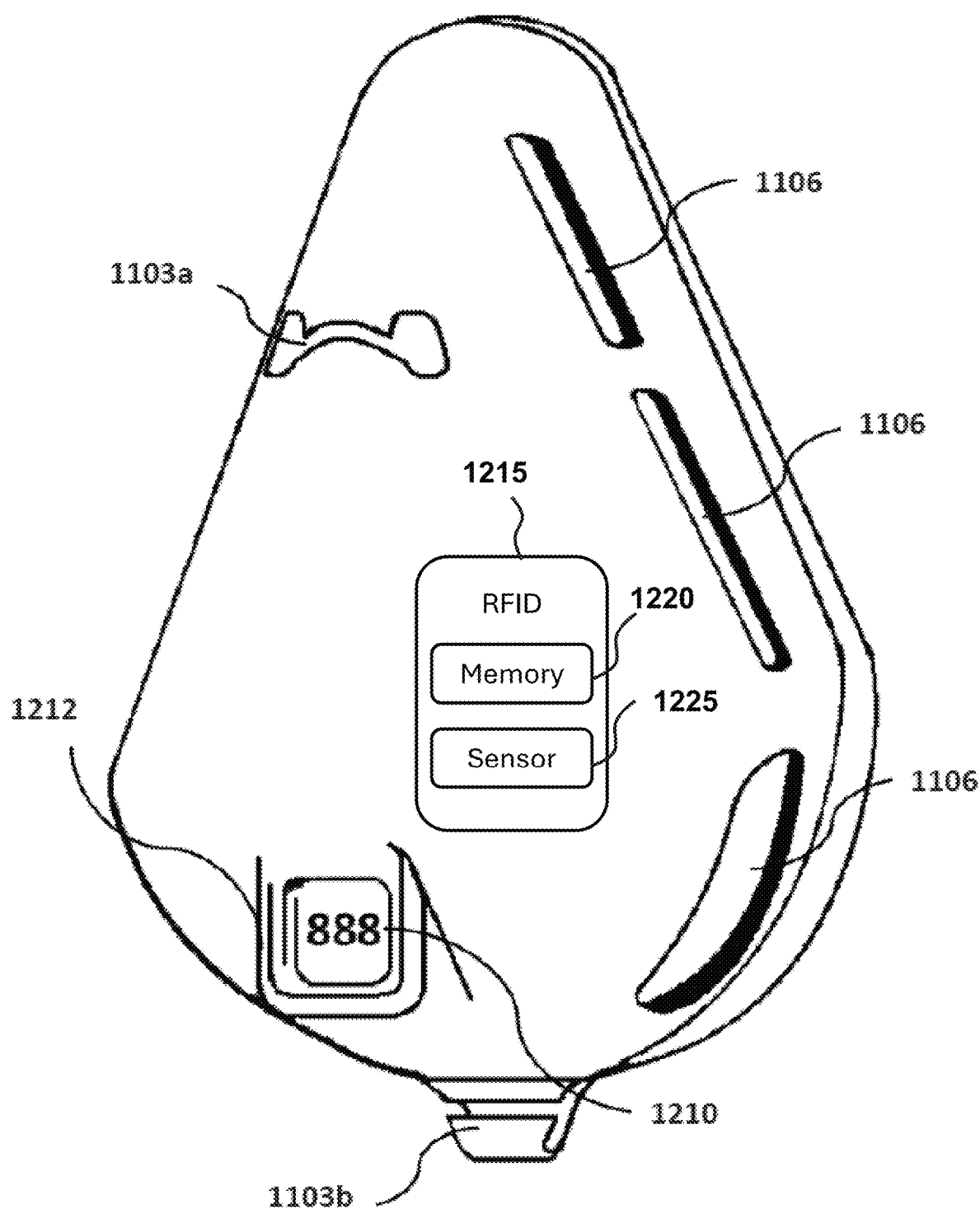
FIG. 42 is a front side view of a mask assembly having a numerical temperature logging display.

As shown in FIG. 42, numeric display 1210 shows how many temperature achieving/exceeding cycles have occurred and is presented within front window 1212. Various internal circuitry, pc board and power sources can also be incorporated into the mask. In some embodiments, the internal circuitry includes a microcontroller or other programmable device. Display 1210 can display 1 to 4 digit cycle counts according to some embodiments. In the embodiment shown in this drawing. 3 digits are provided as an example. In some embodiments, numeric display 1210 can be advanced electrically via a motor, ratchet and pawl mechanism, and/or solenoid. In some embodiments, numeric display 1210 can be advanced thermo-mechanically via a phase change actuator, such as a wax motor, and/or with two-way shape-memory alloys (SMAs), nitinol-based Muscle Wires, and/or Flexinol memory wire.

In some particular embodiments, memory wire can be used to advance a Geneva wheel, logging a sterilization cycle on a facemask.

In some particular embodiments, a phase-change actuator can be used to advance a Geneva wheel, logging a sterilization cycle on a facemask.

Figure 43A:
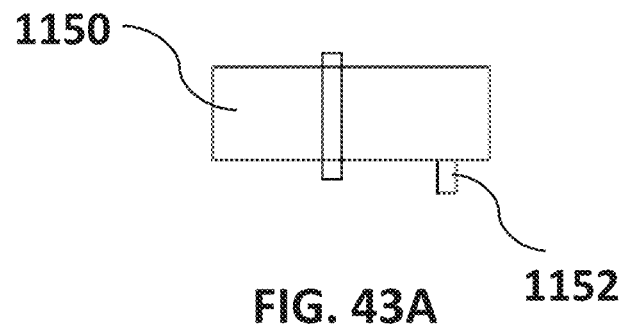
FIG. 43A is a front view of a phase-change actuator.
Figures 43B, 43C:
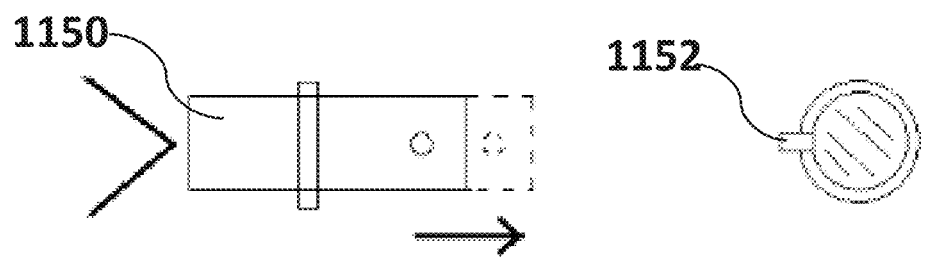
FIG. 43B is a front view of a phase-change actuator creating a stroke or travel.
FIG. 43C is a side view of the phase-change actuator of FIG. 43B.
Figures 43D, 43E:
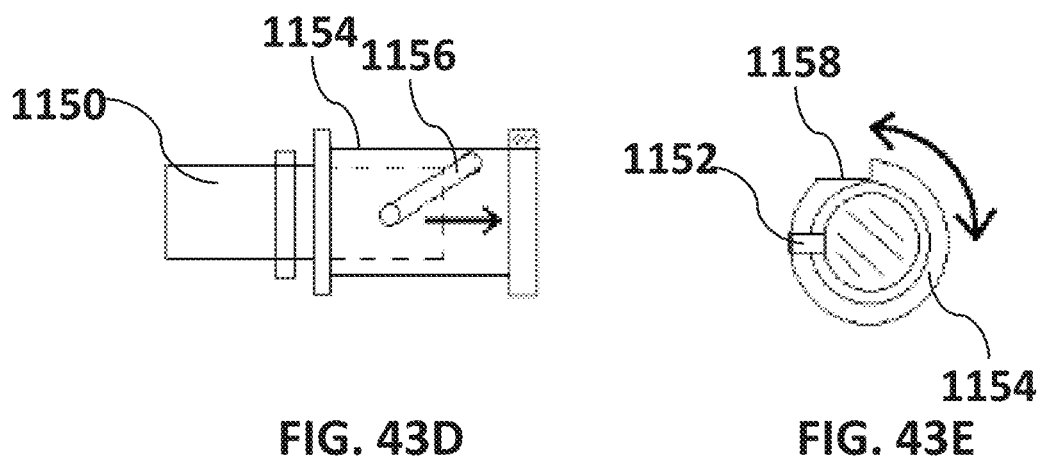
FIG. 43D is a front view of a phase-change actuator rotating an outer sleeve.
FIG. 43E is a side view of the phase-change actuator of FIG. 43D.

FIGS. 43A-43H illustrates an embodiment of a phase-change actuator that actuates and advances a numeric display when heated to a specific temperature. In some embodiments, the phase-change actuator actuates when the phase-change material reaches its melting point and expands. As shown in FIGS. 43A and 43B, when heat is applied to actuator 1150 (heat indicated by a solid arrowhead in FIG. 43B), the actuator expands creating a stroke or travel of post 1152 (indicated by the arrow in FIG. 43B). As shown in FIGS. 43D and 43E, the force and stroke of actuator 1150 and post 1152 causes first sleeve 1154 with diagonal slot 1156 and notch 1158 to rotate (rotation indicated by the double-headed arrow in FIG. 43E).

Figure 43F:
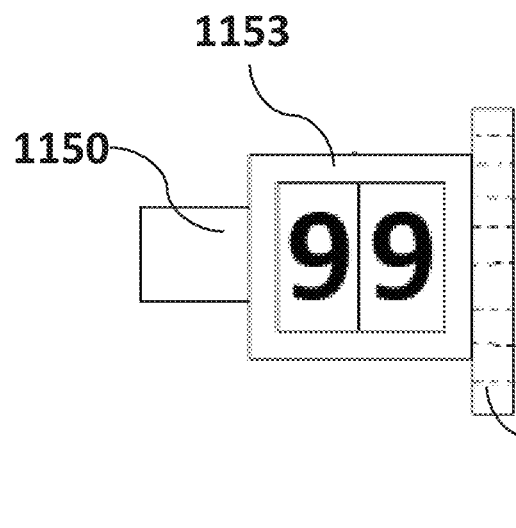
FIG. 43F is a front view of a display with a Geneva wheel.
Figure 43G:
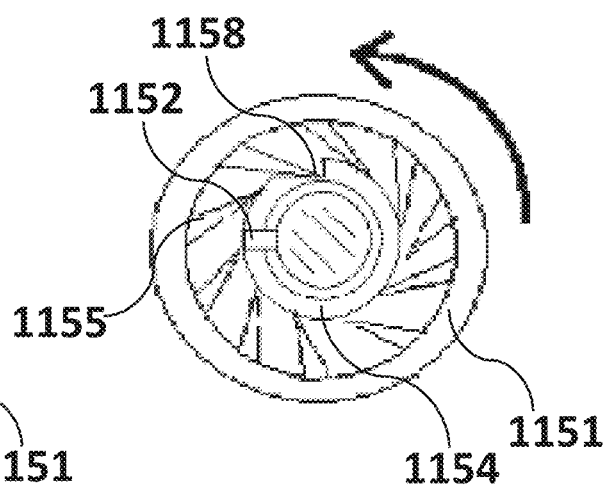
FIG. 43G is a side view of a phase-change actuator rotating the splines of a Geneva wheel.
Figure 43H:
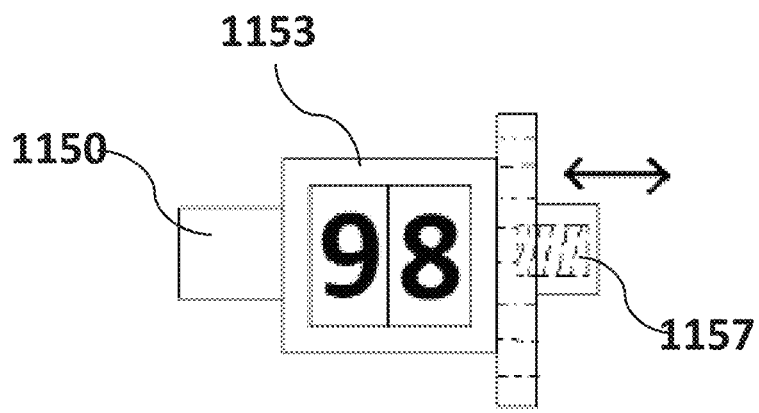
FIG. 43H is a front view of a display with a reset spring.

As shown in FIGS. 43F and 43G, second sleeve 1151 containing Geneva wheel 1153 with flexible splines 1155, is fitted over first sleeve 1154. Notch 1158 pushes on splines 1155 in second sleeve 1151 to rotate Geneva wheel 1153 one numeric segment per sterilization cycle.

After the Geneva wheel rotates one segment and actuator 1150 cools down, spring 1157 returns actuator 1150 to its starting position, resetting notch 1158 in first sleeve 1154 to grab the next sequential spline when heated during the next sterilization cycle.

In some embodiments, the phase-change actuator can be regulated by a thermal electric generator (TEG), battery, and/or solenoid.

Figure 44A:
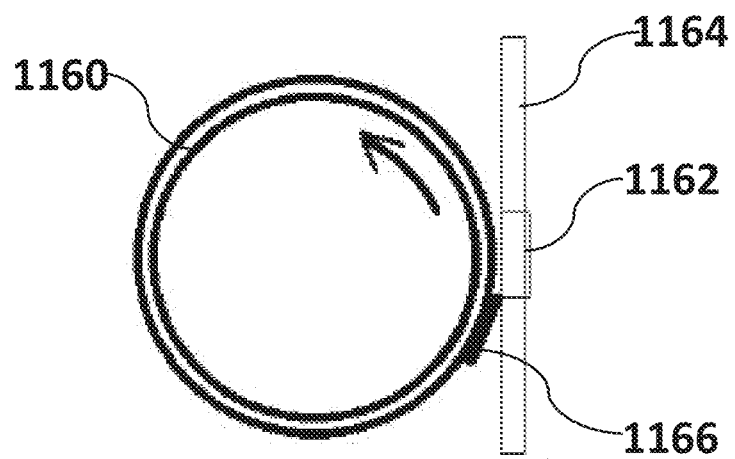
FIG. 44A is a side view of a Geneva drive assembly.
Figure 44B:
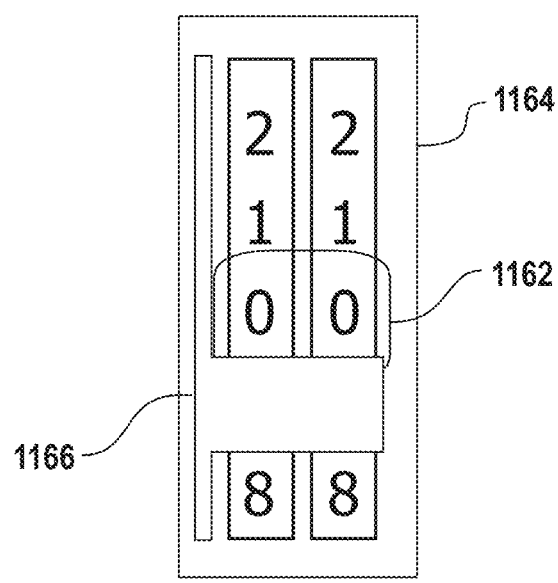
FIG. 44B is an enlarged front view of the display of the Geneva drive assembly of FIG. 44A.
Figure 44C:
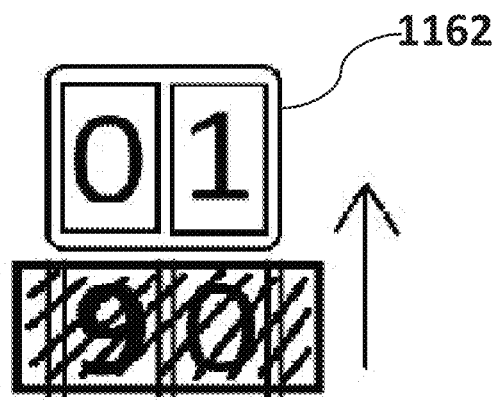
FIG. 44C is an enlarged front view of the display of the Geneva drive assembly of FIG. 44A indicating one sterilization cycle remains.
Figure 44D:
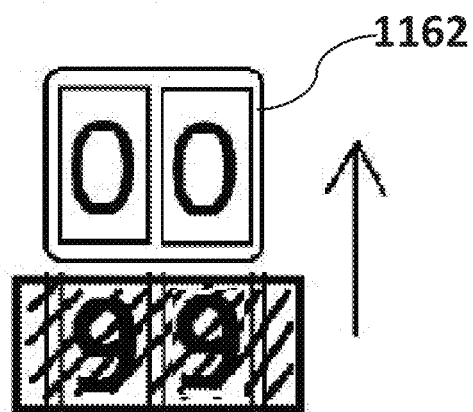
FIG. 44D is an enlarged front view of the display of the Geneva drive assembly of FIG. 44A indicating no sterilization cycles remain.
Figure 44E:
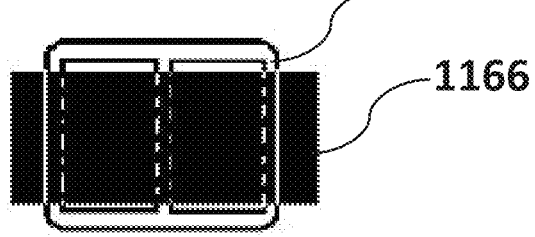
FIG. 44E is an enlarged front view of a tab covering the display of the Geneva drive assembly of FIG. 44A.

FIGS. 44A-44E illustrate an embodiment of Geneva drive assembly that can be used to advance a numeric display in response to a sterilization cycle. In some embodiments, the Geneva drive assembly is coupled for advancement via the phase-change actuator of FIGS. 43A-43G. In at least some embodiments, Geneva drive assembly 1160 includes numbered counter wheels that rotate within display 1164 (upward rotation indicated by the solid arrow in FIG. 44B. The number of remaining sterilization cycles can be viewed via window 1162. In some embodiments, solid tab 1166 can be attached to an additional wheel. In some embodiments, tab 1166 is positioned at the "nine" position. In some embodiments, instead of a "double-nines" indication after one hundred sterilization cycles, tab 1166 can enter window 1162 from below and cover the "99" indicating the mask should not be used. FIG. 44C illustrates window 1162 indicating one sterilization remains. In some embodiments, such as ones in which window 1162 counts down, FIG. 44D illustrates window 1162 indicating the mask is on its final sterilization cycle. FIG. 44E illustrates tab 1166 entering window 1162 indicating the mask has completed its last sterilization cycle, plus one additional sterilization and should not be used.

Figure 45:
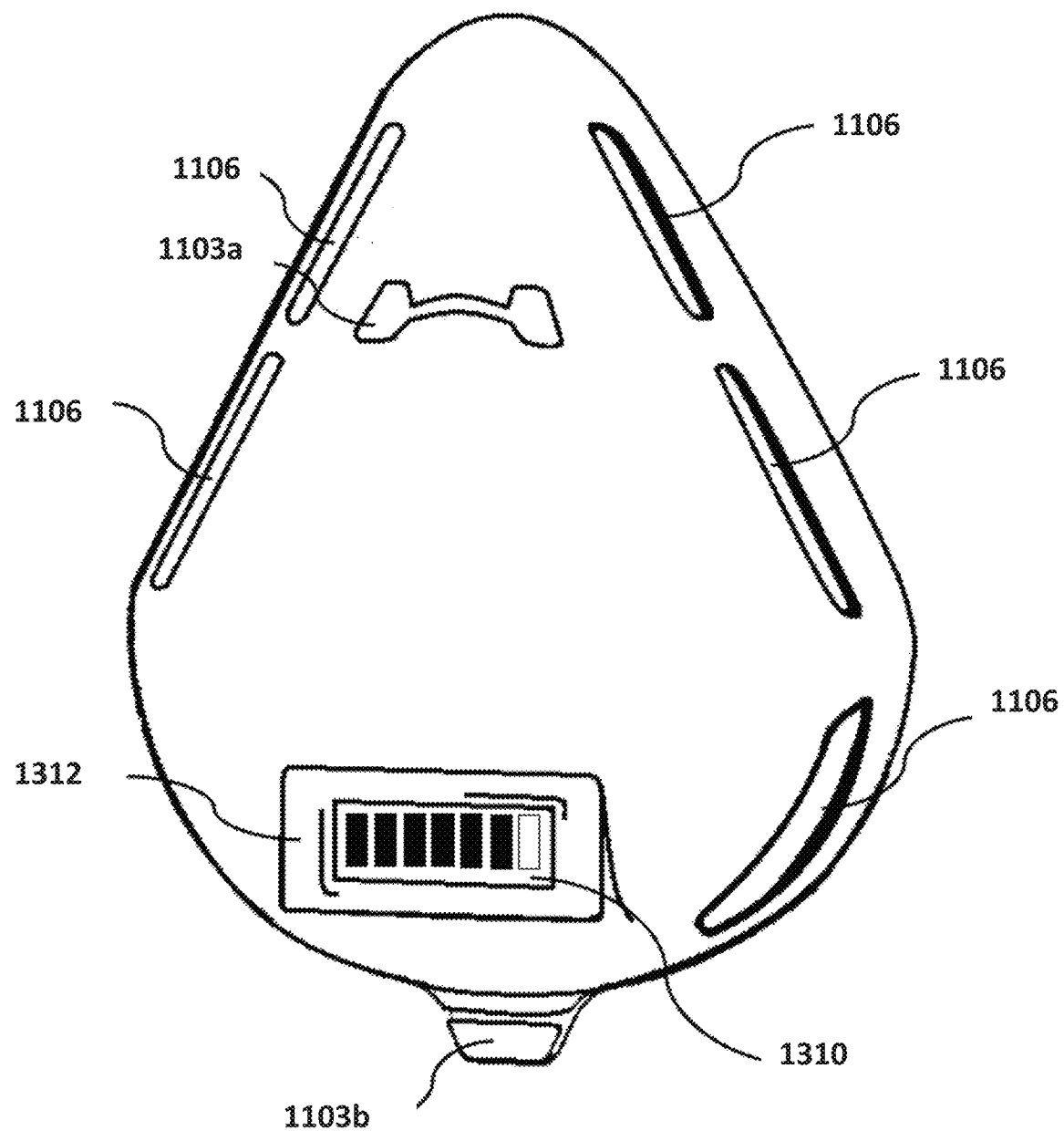
FIG. 45 is a front view of a mask assembly having a segmented temperature logging display.

As shown in FIG. 45, segmented display 1310, showing six of seven display cells indicating heat exposure from complete sterilization cycles, is presented within front window 1312. The quantity of segments within the segmented display can be varied. Internal circuitry, pc board, power source, and other components of such a display are not shown.

Appropriate power sources can include, but are not to be limited to, fully sealed-in, so-called "coin cell", a rechargeable—via RF induction—battery or a bi-metal energy generating source coupled to an electret charge storage element. In some embodiments, segmented display 1310 can be powered by harvesting energy from the motion of the facemask wearer. Embodiments of the mask assembly disclosed herein can comprise known power sources of various kinds, and some embodiments have more than one power source.

Figure 46:
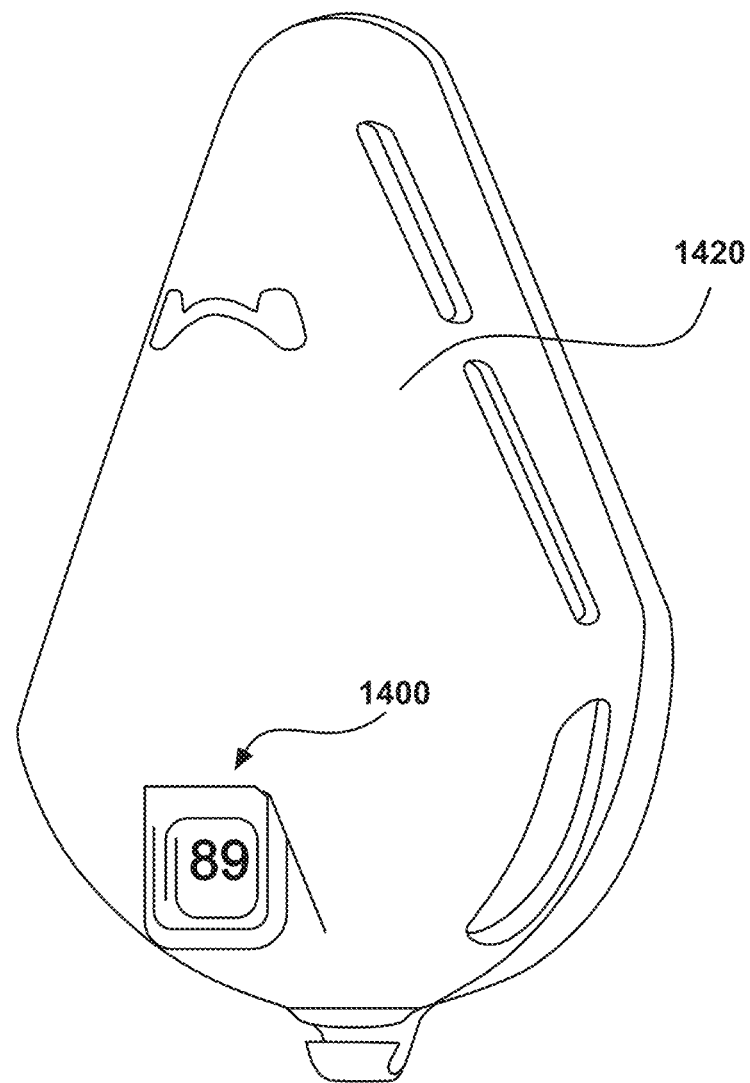
FIG. 46 is a front view of a mask having a numerical temperature logging display.

FIG. 46 illustrates an embodiment of a numerical temperature-logging display. In some embodiments, display 1400 can be disposed on the lower portion of facemask 1420. In some embodiments, display 1400 is digital.

Figure 47:
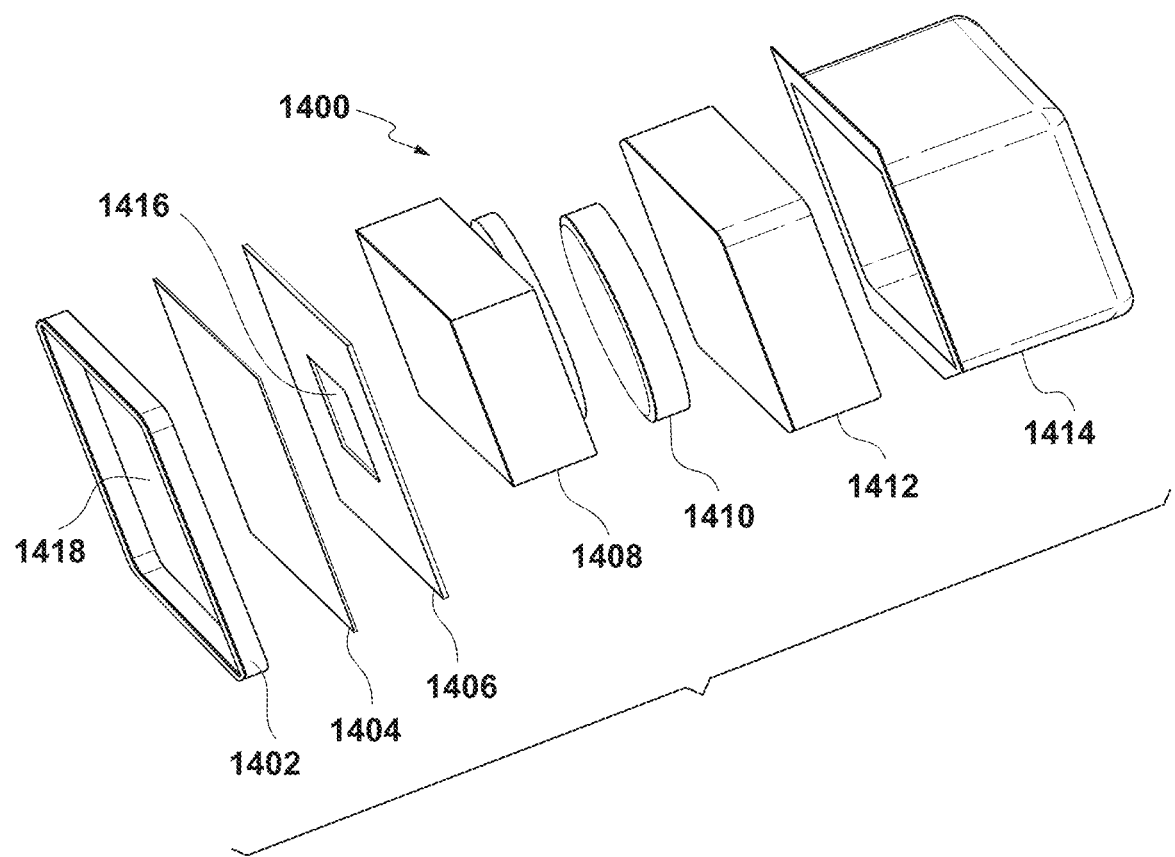
FIG. 47 is an exploded perspective view of a numerical temperature logging display.

As shown in FIG. 47, display 1400 can include front piece 1402 with sealant layer 1418, insulating layer or film 1404, opaque layer or film 1406 with cutout 1416 formed therein, printed circuit board 1408 including a front display and rear power source holder, power source 1410, insulating layer 1412, and enclosure 1414 that houses the assembled display.

In some embodiments, display 1400 can utilize electronic ink (E Ink) to display numeric values, indicating sterilization cycles, and/or other information.

In some embodiments, front section 1402 can be injected with clear, insulating sealant layer 1418.

In some embodiments, insulating layer 1404 can be a thin, clear film.

In some embodiments, power source 1410 can be a coin cell.

In some embodiments, insulating layer 1412 can be an aerogel mat.

Display 1400 indicates the number of times the facemask reaches and maintains a sterilization temperature. In some embodiments, the visible display can count up, indicating the number of sterilization cycles that have been completed. In some embodiments, the visible display can count down, indicating the number of sterilization cycles remaining.

In some embodiments, display 1400 uses LED lights to indicate function. For example, in some embodiments, a flashing red LED light indicates the microprocessor of the display is activated.

In some embodiments, a flashing green LED light indicates the temperature of the facemask has reached a threshold temperature, such as 100° C., 121° C., and/or 132° C., and a sterilization cycle has commenced. In some embodiments, a solid green LED light indicates the sterilization temperature has been maintained for the predetermined amount of time required to complete a sterilization cycle and, therefore, the facemask has been sterilized.

Figure 48:
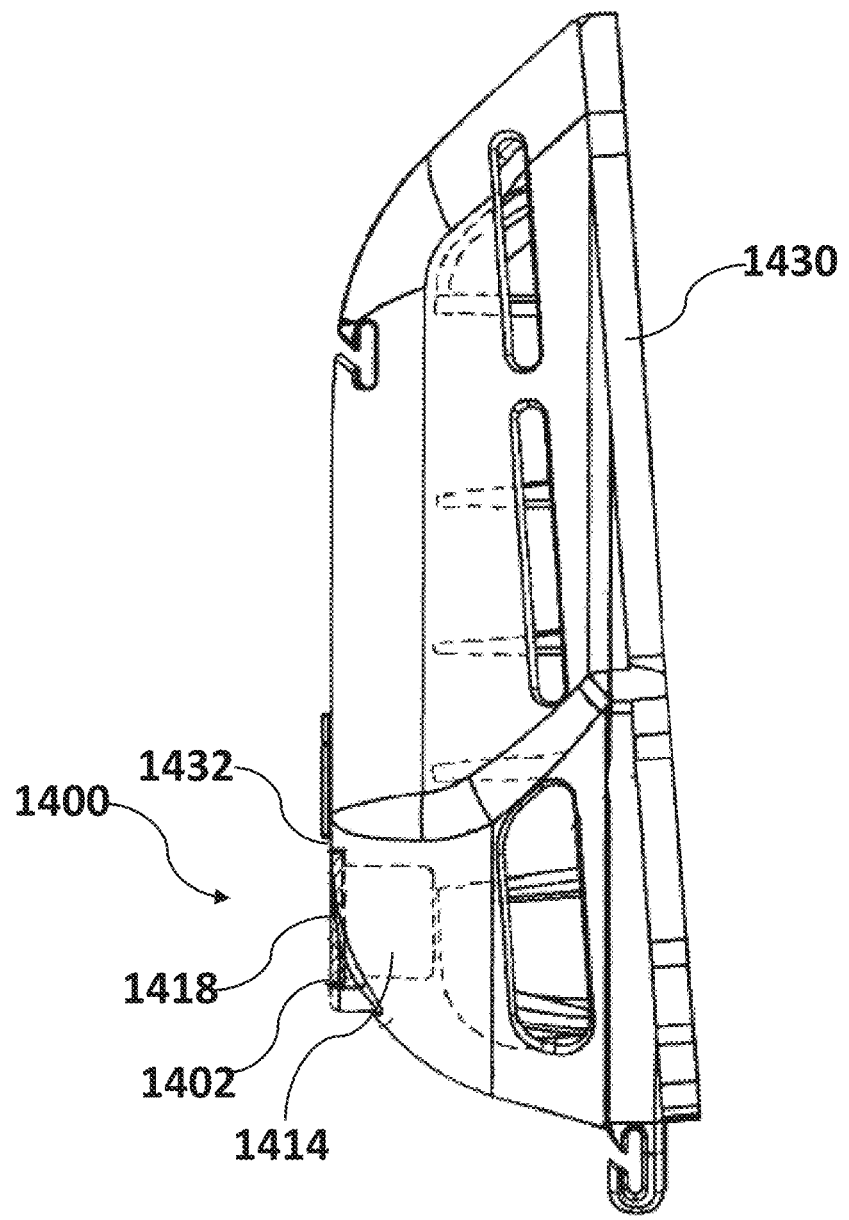
FIG. 48 is a side view of a filter-frame assembly having a numerical temperature logging display.

FIG. 48 is a side view of filter-frame assembly 1430 (filter material not shown) with display 1400. In some embodiments, front piece 1402 of display 1400 can be injected with clear, insulating sealant layer 1418 after display 1400 is mounted in front section 1432 of filter-frame assembly 1430.

Masks Utilizing Automatic Identification and Data Capture to Record and Transmit Information Regarding Temperature Logging According to some embodiments, a respirator facemask can utilize automatic identification and data capture technologies such as radio-frequency identification (RFID) to transmit data about the facemask, such as, but not limited to, how many times the mask has been sanitized to a transceiver/reader. In some embodiments, an RFID device/transponder includes an amount of memory 1220 in which data, including sensor data from a sensor 1225, such a temperature sensor/indicator, can be stored.

In some embodiments, temperature indicators and recorders are utilized to record when the mask has been sanitized. In some embodiments, the mask records the actual time the event by time-stamping the event. In some embodiments, the event is a sanitizing event in which the mask was sanitized.

In some embodiments, this data is transmitted via a RFID device 1215 (such as shown in FIG. 42) such as a RFID LE sticker and is received by a conventional NFC/RFID reader.

In some embodiments, the RFID device utilizes active RFID technology and includes its own power source such as a battery. In some embodiments, the RFID device utilizes passive RFID technology. In some embodiments, the RFID device utilizes semi-active/semi-passive RFID technology.

In some embodiments, the RFID device utilizes low frequencies between 30 KHz to 300 KHz. In some embodiments, the RFID device utilizes high frequencies between 3 to 30 MHz. In some embodiments, the RFID device utilizes ultra-high frequencies between 300 MHz to 3 GHz.

In some embodiments, the RFID device is a commercially available temperature logger NFC.

In some embodiments, the RFID device can communicate with smart devices such as, but not limited to, smartphones and tablets.

In some embodiments, the RFID device is configured to send an alert when a threshold of sterilizations has been reached. In some embodiments, the alert is sent to a system connected to a server. In some embodiments, the alert is sent to a smart device.

In some embodiments, the RFID device is waterproof. In some embodiment, the RFID device can withstand temperatures above 100° C.

While particular elements, embodiments and applications of the present invention have been shown and described, it will be understood, that the invention is not limited thereto since modifications can be made by those skilled in the art without departing from the scope of the present disclosure, particularly in light of the foregoing teachings.

Furthermore, particular elements (such as the chin strap structure, the head mount pad, the nose bridge clip and the like) of the present invention as described in the embodiments above can be incorporated into facemask assemblies in other suitable combinations or arrangements, for example to suit particular applications.

What is claimed is:

1. A mask assembly comprising:
a front section; and
a temperature logging display,
wherein said temperature logging display is configured to indicate a number of times said mask assembly has reached a given temperature, and wherein said temperature logging display is advanced via a Geneva wheel drive assembly.

2. The mask assembly of claim 1 further comprising: a strap.

3. The mask assembly of claim 1 further comprising: a facial skirt.

4. A facemask assembly comprising:
a front section, the front section comprising an electronic temperature logging display configured to indicate a number of times the facemask reached or exceeded a sterilization temperature, a number of times the facemask maintained the sterilization temperature for a complete sterilization cycle, and a number of times the facemask returned to ambient temperature from the sterilization temperature; and
a RFID device with an amount of memory,
wherein said RFID device sends an alert to a system when a threshold of sterilizations has been reached.

5. The facemask assembly of claim 4 further comprising a sensor.

6. The facemask assembly of claim 5 wherein said sensor is configured to detect a temperature.

7. The facemask assembly of claim 6 wherein said RFID device records an actual time said facemask assembly was sanitized by time-stamping a sanitizing event in said amount of memory.

8. The facemask assembly of claim 5 wherein said RFID device records an actual time said facemask assembly was sanitized by time-stamping a sanitizing event in said amount of memory.

9. The facemask assembly of claim 4 wherein said RFID device records an actual time said facemask assembly was sanitized by time-stamping a sanitizing event in said amount of memory.

10. The facemask assembly of claim 4 further comprising: a strap.

11. The facemask assembly of claim 4 further comprising a nasal vent configured to allow an escape of exhaled air above a nostril of a user.

12. The facemask assembly of claim 4 further comprising a lower side vent configured to direct exhaled air away from a front of a user.

13. A facemask assembly comprising:
a front section, the front section comprising an electronic temperature logging display configured to indicate a number of times the facemask reached or exceeded a sterilization temperature, a number of times the facemask maintained the sterilization temperature for a complete sterilization cycle, and a number of times the facemask returned to ambient temperature from the sterilization temperature; and
a RFID device with an amount of memory,
wherein said RFID device records an actual time said facemask assembly was sanitized by time-stamping a sanitizing event in said amount of memory.

14. The facemask assembly of claim 13 further comprising: a strap.

15. The facemask assembly of claim 13 further comprising a nasal vent configured to allow an escape of exhaled air above a nostril of a user.

16. The facemask assembly of claim 13 further comprising a lower side vent configured to direct exhaled air away from a front of a user.

17. The facemask assembly of claim 13 further comprising a sensor.

18. The facemask assembly of claim 17 wherein said sensor is configured to detect a temperature.

* * * * *